(12) United States Patent
Zhang et al.

(10) Patent No.: US 12,547,658 B2
(45) Date of Patent: Feb. 10, 2026

(54) RETRIEVING DIGITAL IMAGES IN RESPONSE TO SEARCH QUERIES FOR SEARCH-DRIVEN IMAGE EDITING

(71) Applicant: Adobe Inc., San Jose, CA (US)

(72) Inventors: Zhifei Zhang, San Jose, CA (US); Zhe Lin, Fremont, CA (US); Zhihong Ding, Fremont, CA (US); Scott Cohen, Sunnyvale, CA (US); Darshan Prasad, San Jose, CA (US)

(73) Assignee: Adobe Inc., San Jose, CA (US)

( * ) Notice: Subject to any disclaimer, the term of this patent is extended or adjusted under 35 U.S.C. 154(b) by 621 days.

(21) Appl. No.: 17/809,781

(22) Filed: Jun. 29, 2022

(65) Prior Publication Data

US 2024/0004924 A1     Jan. 4, 2024

(51) Int. Cl.
*G06F 16/538*     (2019.01)
*G06F 16/532*     (2019.01)
(Continued)

(52) U.S. Cl.
CPC .......... *G06F 16/538* (2019.01); *G06F 16/532* (2019.01); *G06F 16/5838* (2019.01); *G06T 5/50* (2013.01); *G06T 7/11* (2017.01)

(58) Field of Classification Search
CPC ........ G06N 20/00; G06N 3/02; G06V 10/235; G06V 10/761; G06T 2200/24;
(Continued)

(56) References Cited

U.S. PATENT DOCUMENTS 5,915,250 A    6/1999   Jain et al.
6,181,818 B1 *   1/2001   Sato ...................... G06F 16/532
                                                      707/E17.023
(Continued)

FOREIGN PATENT DOCUMENTS

WO    WO-2015178716 A1 *   11/2015   ............. G06F 16/00

OTHER PUBLICATIONS

Liu, Y., Cohen, M., Uyttendaele, M. and Rusinkiewicz, S. (2014), AutoStyle: Automatic Style Transfer from Image Collections to Users' Images. Computer Graphics Forum, 33: 21-31. (Year: 2014).*
(Continued)

*Primary Examiner* — Sumati Lefkowitz
*Assistant Examiner* — Aaron Joseph Sorrin
(74) *Attorney, Agent, or Firm* — Keller Preece PLLC

(57) ABSTRACT

Systems, methods, and non-transitory computer-readable media implements related image search and image modification processes using various search engines and a consolidated graphical user interface. For instance, one or more embodiments involve receiving an input digital image and search input and further modify the input digital image using the image search results retrieved in response to the search input. In some cases, the search input includes a multi-modal search input having multiple queries (e.g., an image query and a text query), and one or more embodiments involve retrieving the image search results utilizing a weighted combination of the queries. Some implementations involve generating an input embedding for the search input (e.g., the multi-modal search input) and retrieving the image search results using the input embedding.

20 Claims, 30 Drawing Sheets

(51) Int. Cl.
    *G06F 16/583*     (2019.01)
    *G06T 5/50*     (2006.01)
    *G06T 7/11*     (2017.01)

(58) Field of Classification Search
    CPC .............. G06T 11/00; G06T 19/20; G06T 2207/20084; G06T 11/60; G06T 2207/20092; G06T 5/50; G06T 7/11; G06T 2207/20081; G06T 2207/20104; G06T 2207/20221; G06T 5/77; G06T 5/94; G06F 16/5846; G06F 16/53; G06F 16/9032; G06F 16/9038; G06F 16/95; G06F 18/256; G06F 16/538; G06F 16/532; G06F 16/5838
See application file for complete search history.

(56) References Cited

U.S. PATENT DOCUMENTS

| | | | |
|---|---|---|---|
| 6,728,752 | B1 | 4/2004 | Chen et al. |
| 10,192,129 | B2 | 1/2019 | Price et al. |
| 10,909,166 | B1 | 2/2021 | Bogazzi |
| 11,055,566 | B1 | 7/2021 | Pham et al. |
| 11,073,975 | B1 | 7/2021 | Mueller et al. |
| 2004/0249774 | A1 | 12/2004 | Caid et al. |
| 2011/0072012 | A1* | 3/2011 | Ah-Pine ............ G06F 16/54 707/723 |
| 2014/0006385 | A1 | 1/2014 | Ebers et al. |
| 2015/0296228 | A1 | 10/2015 | Chen et al. |
| 2016/0148407 | A1* | 5/2016 | Hodges ............. H04L 69/22 382/309 |
| 2016/0225127 | A1* | 8/2016 | Lu ................ G06V 10/751 |
| 2017/0039723 | A1* | 2/2017 | Price ................ G06T 7/174 |
| 2019/0130229 | A1 | 5/2019 | Lu et al. |
| 2020/0020108 | A1 | 1/2020 | Pao et al. |
| 2020/0334501 | A1 | 10/2020 | Lin et al. |
| 2020/0356591 | A1* | 11/2020 | Yada ............... G06F 3/04855 |
| 2020/0380027 | A1 | 12/2020 | Aggarwai et al. |
| 2020/0380403 | A1 | 12/2020 | Aggarwal et al. |
| 2021/0027471 | A1 | 1/2021 | Cohen et al. |
| 2021/0383584 | A1* | 12/2021 | Zhang ................ G06T 3/40 |
| 2022/0164548 | A1 | 5/2022 | Tumuluri |
| 2022/0237799 | A1 | 7/2022 | Price et al. |
| 2023/0306087 | A1 | 9/2023 | Krishnan et al. |
| 2023/0377200 | A1 | 11/2023 | Klein et al. |

OTHER PUBLICATIONS

Apple, "Aperture 3 Exploring Aperture", 2011 (Year: 2011).*
Long Mai, Hailin Jin, Zhe Lin, Chen Fang, Jonathan Brandt, and Feng Liu. "Spatial-semantic image search by visual feature synthesis." In Proceedings of the IEEE Conference on Computer Vision and Pattern Recognition, pp. 4718-4727. 2017.
Jin Ma, Shanmin Pang, Bo Yang, Jihua Zhu, and Yaochen Li. "Spatial-content image search in complex scenes." In Proceedings of the IEEE/CVF Winter Conference on Applications of Computer Vision, pp. 2503-2511. 2020.
Kilickaya, Mert, and Arnold WM Smeulders. "Structured Visual Search via Composition-aware Learning." In Proceedings of the IEEE/CVF Winter Conference on Applications of Computer Vision, pp. 1701-1710. 2021.
Furuta, Ryosuke, Naoto Inoue, and Toshihiko Yamasaki. "Efficient and interactive spatial- semantic image retrieval." Multimedia Tools and Applications 78, No. 13 (2019): 18713-18733.
Ribeiro, Leo Sampaio Ferraz, Tu Bui, John Collomosse, and Moacir Ponti. "Scene Designer: a Unified Model for Scene Search and Synthesis from Sketch." In Proceedings of the IEEE/CVF International Conference on Computer Vision, pp. 2424-2433. 2021.
Dey, Sounak, Anjan Dutta, Suman K. Ghosh, Ernest Valveny, Josep Lladós, and Umapada Pal. "Aligning Salient Objects to Queries: A Multi-modal and Multi-object Image Retrieval Framework." In Asian Conference on Computer Vision, pp. 241-255. Springer, Cham, 2018.
Yuan, Xin, Zhe Lin, Jason Kuen, Jianming Zhang, Yilin Wang, Michael Maire, Ajinkya Kale, and Baldo Faieta. "Multimodal Contrastive Training for Visual Representation Learning." In Proceedings of the IEEE/CVF Conference on Computer Vision and Pattern Recognition, pp. 6995-7004. 2021.
Aggarwal, Pranav, Zhe Lin, Baldo Faieta, and Saeid Motiian. "Multitask text-to-visual embedding with titles and clickthrough data." arXiv preprint arXiv:1905.13339 (2019).
X. An and F. Pellacini. User-controllable color transfer. In CGF, vol. 29, pp. 263-271, 2010.
M. Aubry, S. Paris, S. W. Hasinoff, J. Kautz, and F. Durand. Fast local laplacian filters: Theory and applications. ACM TOG, 33(5):167:1-167:14, Sep. 2014.
S. Bae, S. Paris, and F. Durand. Two-scale tone management for photographic look. ACM TOG (Proc. SIGGRAPH), 25(3):637-645, Jul. 2006.
N. Bonneel, K. Sunkavalli, S. Paris, and H. Pfister. Example-based video color grading. ACM TOG (Proc. SIGGRAPH), 32(4):39:1-39:12, Jul. 2013.
V. Bychkovsky, S. Paris, E. Chan, and F. Durand. Learning photographic global tonal adjustment with a database of input/output image pairs. In CVPR, pp. 97-104, 2011.
J. C. Caicedo, A. Kapoor, and S. B. Kang. Collaborative personalization of image enhancement. In CVPR, pp. 249-256, 2011.
K. Dale, M. K. Johnson, K. Sunkavalli, W. Matusik, and H. Pfister. Image restoration using online photo collections. In ICCV, pp. 2217-2224, 2009.
J. Deng, W. Dong, R. Socher, L.-J. Li, K. Li, and L. Fei-Fei. Imagenet: A large-scale hierarchical image database. In CVPR, pp. 248-255, 2009.
D. Dowson and B. Landau. The fréchet distance between multivariate normal distributions. Journal of Multivariate Analysis, 12(3):450-455, 1982.
H.S. Faridul, T. Pouli, C. Chamaret, J. Stauder, A. Tremeau, E. Reinhard, et al. A survey of color mapping and its applications. In Eurographics, pp. 43-67, 2014.
Y. Ha Cohen, E. Shechtman, D. B. Goldman, and D. Lischinski. Non-rigid dense correspondence with applications for image enhancement. In ACM TOG (Proc. SIGGRAPH), vol. 30, p. 70, 2011.
S. J. Hwang, A. Kapoor, and S. B. Kang. Context-based automatic local image enhancement. In ECCV, vol. 7572, pp. 569-582, 2012.
Y. Hwang, J.-Y. Lee, I. S. Kweon, and S. J. Kim. Color transfer using probabilistic moving least squares. In CVPR, 2014.
Y. Jia. Caffe: An open source convolutional architecture for fast feature embedding. http://caffe.berkeleyvision.org/, 2013.
S. B. Kang, A. Kapoor, and D. Lischinski. Personalization of image enhancement. In CVPR, pp. 1799-1806, 2010.
A. Krizhevsky, I. Sutskever, and G. E. Hinton. Imagenet classification with deep convolutional neural networks. In NIPS, 2012.
Y. Liu, M. Cohen, M. Uyttendaele, and S. Rusinkiewicz. Autostyle: Automatic style transfer from image collections to users' images. In CGF, vol. 33, pp. 21-31, 2014.
F. Pitie and A. Kokaram. The linear monge-kantorovitch linear colour mapping for example-based colour transfer. In CVMP, 2007.
F. Pitie, A. C. Kokaram, and R. Dahyot. N-dimensional probability density function transfer and its application to color transfer. In ICCV, vol. 2, pp. 1434-1439, 2005.
D. Pollard. A user's guide to measure theoretic probability, vol. 8. Cambridge University Press, 2002.
T. Pouli and E. Reinhard. Progressive color transfer for images of arbitrary dynamic range. Comp. & Graph., 35(1):67-80, 2011.
E. Reinhard, M. Ashikhmin, B. Gooch, and P. Shirley. Color transfer between images. CG&A, 21(5):34-41, 2001.
Y. Shih, S. Paris, C. Barnes, W. T. Freeman, and F. Durand. Style transfer for headshot portraits. ACM TOG (Proc. SIGGRAPH), 33(4):148:1-148:14, Jul. 2014.
Y.-W. Tai, J. Jia, and C.-K. Tang. Soft color segmentation and its applications. PAMI, 29(9):1520-1537, 2007.

(56) References Cited

OTHER PUBLICATIONS

B. Wang, Y. Yu, and Y.-Q. Xu. Example-based image color and tone style enhancement. In ACM TOG (Proc. SIGGRAPH), vol. 30, p. 64. ACM, 2011.
W. Xu and J. Mulligan. Performance evaluation of color correction approaches for automatic multi-view image and video stitching. In CVPR, pp. 263-270, 2010.
J. Yan, S. Lin, S. B. Kang, and X. Tang. A learning-to-rank approach for image color enhancement. In CVPR, pp. 2987-2994, 2014.
Z. Yan, H. Zhang, B. Wang, S. Paris, and Y. Yu. Automatic photo adjustment using deep neural networks. CoRR, abs/1412.7725, 2015.
Ning Xu et al., "Deep GrabCut for Object Selection," published Jul. 14, 2017.
Alexey Dosovitskiy et al., An Image is Worth 16×16 Words: Transformers for Image Recognition at Scale, ICLR, 2021, arXiv:2010.11929v2.
Ren, et al., Faster r-cnn: Towards real-time object detection with region proposal networks, NIPS, 2015.
Redmon, et al., You Only Look Once: Unified, Real-Time Object Detection, CVPR 2016.
U.S. Appl. No. 17/809,494, Sep. 27, 2023, Office Action.
U.S. Appl. No. 17/809,494, Feb. 28, 2024, Office Action.
U.S. Appl. No. 17/809,503, Apr. 24, 2024, Office Action.
U.S. Appl. No. 17/809,494, Aug. 1, 2024, Office Action.
U.S. Appl. No. 17/809,503, Jul. 26, 2024, Office Action.
U.S. Appl. No. 17/809,494, Dec. 6, 2024, Notice of Allowance.
U.S. Appl. No. 17/809,503, Oct. 29, 2024, Notice of Allowance.

\* cited by examiner

```
                    ┌──────────────────────────────────────────────────────────┐
                    │ Receiving A Text Query And An Image Query For Conducting An Image │
                    │                        Search 1902                       │
                    └──────────────────────────────────────────────────────────┘
```

```
┌────────────────────────────────────────────────────────────────┐
│          Determining A Weighted Combination Of The Queries 1904│
│   ┌──────────────────────────────────────────────────────────┐ │
│   │ Receiving A Combination Weight For Combining The Queries 1906│
│   └──────────────────────────────────────────────────────────┘ │
│                                                                │
│   ┌──────────────────────────────────────────────────────────┐ │
│   │  Determining The Weighted Combination Using The Received │ │
│   │                 Combination Weight 1908                  │ │
│   └──────────────────────────────────────────────────────────┘ │
└────────────────────────────────────────────────────────────────┘
```

```
        ┌──────────────────────────────────────────────────────────┐
        │ Retrieving Digital Images Using The Weighted Combination Of Queries │
        │                          1910                            │
        └──────────────────────────────────────────────────────────┘
```

RETRIEVING DIGITAL IMAGES IN RESPONSE TO SEARCH QUERIES FOR SEARCH-DRIVEN IMAGE EDITING

BACKGROUND

Recent years have seen significant advancement in hardware and software platforms for modifying digital images. Many existing platforms, for example, enable the modification of one digital image using one or more attributes of another digital image. For instance, many platforms can utilize the tone, color, or texture of a reference image to modify, respectively, the tone, color, or texture of an input image. Thus, under such systems, a user can find inspiration from existing images and incorporate that inspiration into the input image.

SUMMARY

One or more embodiments described herein provide benefits and/or solve one or more problems in the art with systems, methods, and non-transitory computer-readable media that flexibly modify digital images using reference images accurately retrieved in response to search queries. For instance, in one or more embodiments, a system implements search-driven editing using a large-scale visual corpus and one-click editing. The system incorporates multiple large-scale search engines for identifying digital images that are suitable for use in editing an input image. For instance, in some cases, the system utilizes one or more search engines to perform textual-visual searches and/or sketch searches via common embedding spaces. Further, in some implementations, the system utilizes powerful image-editing techniques-such as color transfer, tone transfer, or texture transfer—to modify the input image using attributes of the digital images retrieved via the search engine(s). In this manner, the system flexibly bridges search and editing while retrieving digital images that accurately respond to various types of search queries.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 19 illustrates a flowchart of a series of acts for retrieving a digital image using a weighted combination of a text query and an image query in accordance with one or more embodiments.

DETAILED DESCRIPTION

Figure 1:
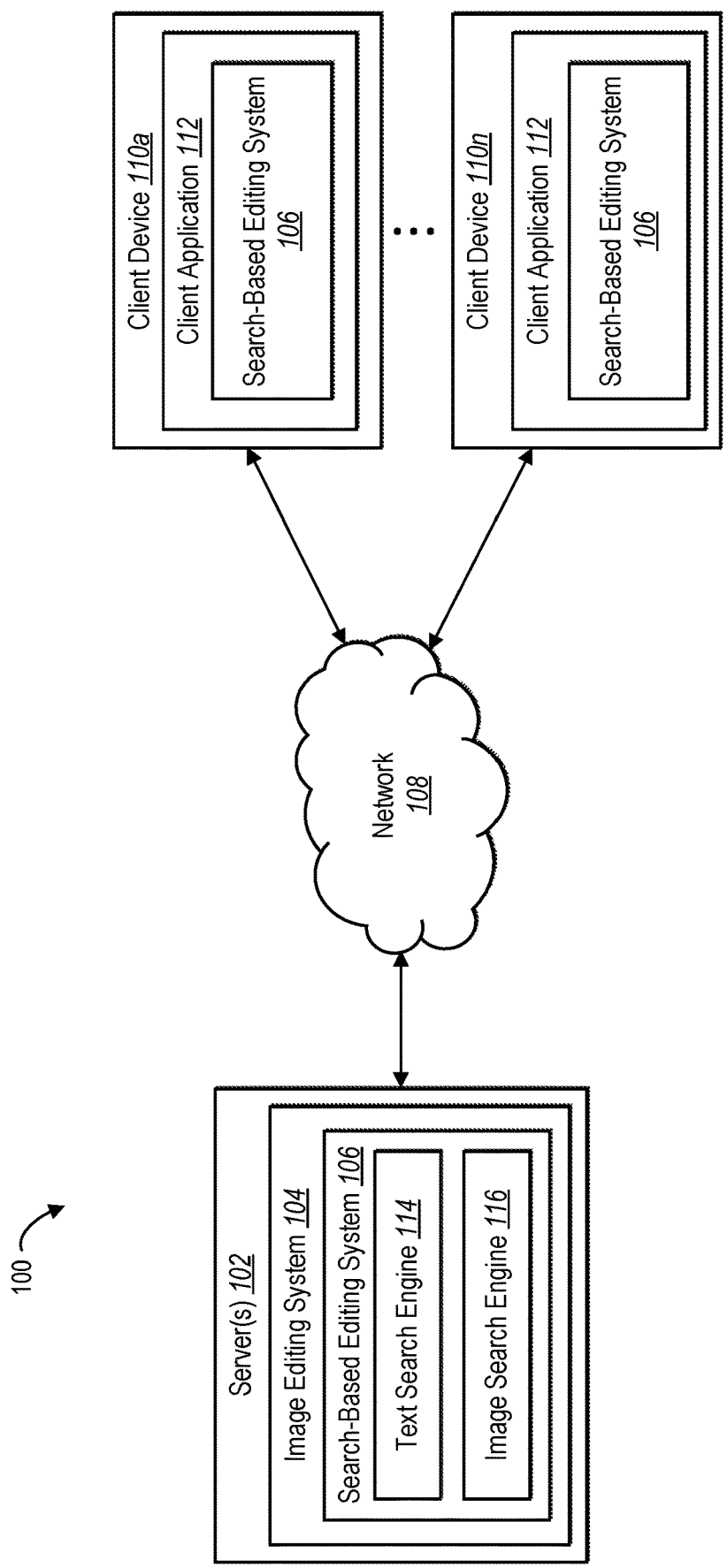
FIG. 1 illustrates an example environment in which a search-based editing system operates in accordance with one or more embodiments.

One or more embodiments described herein include a search-based editing system that implements image editing using flexible and accurate image search results. For example, in one or more embodiments, the search-based editing system utilizes one or more search engines to retrieve digital images in response to various types of search queries. In some cases, the search-based editing system retrieves digital images in response to multi-modal search queries. To illustrate, in some embodiments, the search-based editing system utilizes an image search engine in response to receiving a multi-modal canvas search query. In some instances, the search-based editing system utilizes an image search engine and a text search engine in responses to receiving a search query having textual and visual components. Further, in some implementations, the search-based editing system utilizes the search results to modify one or more attributes-such as color, tone, or texture—of an input digital image, bridging the search and editing processes.

As indicated above, in one or more embodiments, the search-based editing system implements image search and image modification within a single framework. To illustrate, in some embodiments, the search-based editing system receives an input digital image. The search-based editing system further conducts an image search and modifies the input digital image using the search results. For instance, in some implementations, the search-based editing system modifies the input digital image utilizing one or more attributes of a digital image from the search results.

Additionally, as mentioned above, in some embodiments, the search-based editing system conducts the image search using search input. In particular, the search-based editing system utilizes one or more search queries to identify and retrieve the digital images included in the search results. The search-based editing system utilizes search queries of various types in different embodiments. For example, in some implementations, the search-based editing system uses a text query, an image query, a sketch query, or a local query (e.g., a cropped region or a semantic region of a digital image) in retrieving the search results. In some instances, the search-based editing system utilizes a multi-modal search input in retrieving the search results.

As further discussed above, in one or more embodiments, the search-based editing system utilizes one or more search engines to conduct the image search. For instance, in some cases, the search-based editing system utilizes an image search engine and/or a text search engine to conduct the image search. In some cases, the search-based editing system determines the search engine(s) to utilize based on the search input.

In some implementations, the search-based editing system utilizes an embedding-based search engine. For instance, in some cases, the search-based editing system generates one or more input embeddings from the search input and identifies the digital images to return as the search results using the input embedding(s). For example, in some embodiments, the search-based editing system generates the input embedding(s) within an embedding space and identifies digital images for the search results based on distances between embeddings corresponding to the digital images and the input embedding(s) within the embedding space.

In some cases, the search-based editing system generates input embeddings for a multi-modal search input within a common embedding space. To illustrate, in some implementations, the search-based editing system receives a multi-modal search input, such as a search input having a text query and an image query. The search-based editing system generates, within a common embedding space (e.g., a text-image embedding space) a text embedding for the text query and an image embedding for the image query. The search-based editing system further retrieves digital images to return as the search results using the embeddings within the common embedding space. In some cases, the search-based editing system determines a weighted combination of the various components of the multi-modal search input (e.g., a weighted combination of the text query and the image query) and retrieves the search results using the weighted combination.

In some implementations, the search-based editing system generates a unified embedding for a multi-modal search input. In particular, in some cases, the search-based editing system generates a single input embedding that represents the various components of the multi-modal search input. For instance, in some cases, the search-based editing system receives a multi-modal search input that includes sketch input, brush input, text input, and/or image input and generates a single input embedding from the inputs.

To provide an example, in some cases, the search-based editing system receives a multi-modal search input that includes multiple visual (e.g., sketch, brush, or image) and/or textual components that provide semantic and layout information to consider when conducting the image search. The search-based editing system further utilizes a multi-modal embedding neural network to generate an input embedding that represents the semantic and layout information from the multi-modal search input. In some cases, the multi-modal embedding neural network determines segment-level semantic and layout information from the multi-modal search input and generates the input embedding based on this segment-level information.

As further mentioned, in some implementations, the search-based editing system utilizes the search results to modify the input digital image. In particular, in some cases, the search-based editing system utilizes one or more attributes of a digital image from the search results to modify the input digital image. For instance, in some cases, the search-based editing system utilizes a color, texture, or tone of a digital image from the search results to modify the input image. As another example, the search-based editing system combines an object portrayed in a digital image from the search results with the input digital image to generate a composite image. In some cases, the search-based editing system utilizes one or more neural networks to modify the input digital image based on the search results.

In some implementations, the search-based editing system implements the image search and image modification using a graphical user interface. In particular, in some cases, the search-based editing system provides, for display on a client device, a graphical user interface that includes various interactive elements. In some embodiments, the search-based editing system receives search input (e.g., various queries and/or input indicating a weight for combining the various queries) via interactions with the interactive elements. In some instances, the search-based editing system receives user input for modifying the input digital image via the interactive elements. Thus, in some cases, the search-based editing system provides options within a consolidated graphical user interface and performs the image search and modification based on interactions with those options. In some embodiments, the search-based editing system provides a single option for a given image modification and performs the image modification in response to a selection of the single option.

The search-based editing system provides several advantages over conventional system. In particular, conventional systems suffer from several technological shortcomings that result in inflexible and inefficient operation.

For example, many conventional image editing systems are inflexible in that they are limited in the options they provide for modifying a digital image. For instance, some existing systems implement example-based image editing by modifying input images using a reference image. Such systems, however, typically rely on user-provided reference images, failing to provide their own features for identifying or retrieving images for use in the editing process.

By failing to provide their own features for retrieving reference images, conventional systems encourage users to rely on other methods, such as search engines; but many search engines suffer from their own flexibility issues. For example, many search engines limit allowed search input to a single type (e.g., a single modal) of input. As one example, there are existing search engines that allow search input having spatial or other layout information for image searches. These search engines, however, typically limit the search input to a single type, such as a sketch or a bounding box. Accordingly, these engines limit their image searches to the information that can be extracted from the single type of input allowed. While some engines exist that can perform image searches based on text queries and image queries, these engines typically do so by using joint embeddings that have been learned based on a consistency between similar queries. As such, these engines fail to provide control over how the separate input types are used when conducting the image search.

Additionally, conventional image editing systems often fail to operate efficiently. For example, many conventional systems require a significant amount of user interaction to modify a digital image. In particular, to perform a single modification, conventional systems may require a user to interact with multiple menus, sub-menus, and/or windows to select the proper tool, set the desired parameters for the tool, and utilize the tool to implement the modification. As conventional systems often fail to provide their own mean for retrieving a reference image, these systems further require user interactions with an additional application, browser window, or the like to initiate an image search, receive the search results, and select a desired reference image from the search results. Thus, many conventional systems may require users to constantly switch back-and-forth between a search engine application and an image editing application where a satisfactory reference image is not found immediately.

The search-based editing system operates with improved flexibility when compared to conventional systems. For instance, the search-based editing system flexibly provides features for retrieving a reference image to use in modifying an input digital image. Indeed, by retrieving search results in response to a search input and modifying an input digital image using the search results, the search-based editing system flexibly bridges search and editing. Further, the search-based editing system provides more flexible search engines. For instance, the search-based editing system implements search engines that can retrieve search results in response to multi-modal search inputs, such as those providing spatial or other layout information for the image search (e.g., inputs including multiple brush, sketch, or image/crop components). Further, the search-based editing system provides more flexible control over how components of a multi-modal search input are utilized in conducting an image search. Indeed, as previously indicated, some embodiments of the search-based editing system provide an option for selecting a weight to be used in combining the components of a multi-modal search input, such as a text query and an image query. Thus, the search-based editing system flexibly adapts to interactions with the option, potentially retrieving different search results in response to similar text and image query combinations.

Additionally, the search-based editing system operates with improved efficiency. In particular, the search-based editing system implements a graphical user interface that reduces the user interactions required for search and editing. Indeed, as indicated above, in some cases, the search-based editing system provides a consolidated graphical user interface that displays options for search input and editing and further displays the search results and modified digital image resulting from interactions with those options. Further, in some instances, the search-based editing system performs image editing in response to a single selection of a corresponding option. Thus, in many cases, the search-based editing system reduces the user interactions typically required under conventional systems to navigate menus, sub-menus, or other windows in order to select a tool, select its corresponding parameters, and apply the tool to perform the edit. Further, by incorporating search and editing within a consolidated graphical user interface, the search-based editing system reduces the user interactions often needed to switch between different applications or windows to engage in the processes separately.

Additional detail regarding the search-based editing system will now be provided with reference to the figures. For example, FIG. 1 illustrates a schematic diagram of an exemplary system 100 in which a search-based editing system 106 operates. As illustrated in FIG. 1, the system 100 includes a server(s) 102, a network 108, and client devices 110*a*-110*n*.

Although the system 100 of FIG. 1 is depicted as having a particular number of components, the system 100 is capable of having any number of additional or alternative components (e.g., any number of servers, client devices, or other components in communication with the search-based editing system 106 via the network 108). Similarly, although FIG. 1 illustrates a particular arrangement of the server(s) 102, the network 108, and the client devices 110*a*-110*n*, various additional arrangements are possible.

The server(s) 102, the network 108, and the client devices 110*a*-110*n* are communicatively coupled with each other either directly or indirectly (e.g., through the network 108 discussed in greater detail below in relation to FIG. 20). Moreover, the server(s) 102 and the client devices 110*a*-110*n* include one or more of a variety of computing devices (including one or more computing devices as discussed in greater detail with relation to FIG. 20).

As mentioned above, the system 100 includes the server(s) 102. In one or more embodiments, the server(s) 102 generates, stores, receives, and/or transmits data including digital images, search results, and modified digital images. In one or more embodiments, the server(s) 102 comprises a data server. In some implementations, the server(s) 102 comprises a communication server or a web-hosting server.

In one or more embodiments, the image editing system 104 provides functionality by which a client device (e.g., a user of one of the client devices 110*a*-110*n*) generates, edits, manages, and/or stores digital images. For example, in some instances, a client device sends a digital image to the image editing system 104 hosted on the server(s) 102 via the network 108. The image editing system 104 then provides options that the client device may use to edit the digital image, store the digital image, and subsequently search for, access, and view the digital image. For instance, in some cases, the image editing system 104 provides one or more options that the client device may use to replace pixels within the digital image.

In one or more embodiments, the client devices 110a-110n include computing devices that can access, view, modify, store, and/or provide, for display, digital images. For example, the client devices 110a-110n include smartphones, tablets, desktop computers, laptop computers, head-mounted-display devices, or other electronic devices. The client devices 110a-110n include one or more applications (e.g., the client application 112) that can access, view, modify, store, and/or provide, for display, digital images. For example, in one or more embodiments, the client application 112 includes a software application installed on the client devices 110a-110n. Additionally, or alternatively, the client application 112 includes a web browser or other application that accesses a software application hosted on the server(s) 102 (and supported by the image editing system 104).

To provide an example implementation, in some embodiments, the search-based editing system 106 on the server(s) 102 supports the search-based editing system 106 on the client device 110n. For instance, in some cases, the search-based editing system 106 on the server(s) 102 learns parameters for a text search engine 114, an image search engine 116, and/or one or more models for modifying digital images. The search-based editing system 106 then, via the server(s) 102, provides the text search engine 114, the image search engine 116, and/or the one or more models for modifying digital images to the client device 110n. In other words, the client device 110n obtains (e.g., downloads) text search engine 114, the image search engine 116, and/or the one or more models for modifying digital images with the learned parameters from the server(s) 102. Once downloaded, the search-based editing system 106 on the client device 110n utilizes the text search engine 114 and/or the image search engine 116 to search for digital images independent from the server(s) 102. Further, the search-based editing system 106 on the client device 110n utilizes the one or more models for modifying digital images to modify digital images (e.g., those digital images retrieved as part of the search results) independent of the server(s) 102.

In alternative implementations, the search-based editing system 106 includes a web hosting application that allows the client device 110n to interact with content and services hosted on the server(s) 102. To illustrate, in one or more implementations, the client device 110n accesses a software application supported by the server(s) 102. In response, the search-based editing system 106 on the server(s) 102 searches for and modifies digital images. The server(s) 102 then provides the search results and/or the modified digital images to the client device 110n for display.

Indeed, the search-based editing system 106 is able to be implemented in whole, or in part, by the individual elements of the system 100. Indeed, although FIG. 1 illustrates the search-based editing system 106 implemented with regard to the server(s) 102, different components of the search-based editing system 106 are able to be implemented by a variety of devices within the system 100. For example, one or more (or all) components of the search-based editing system 106 are implemented by a different computing device (e.g., one of the client devices 110a-110n) or a separate server from the server(s) 102 hosting the image editing system 104. Indeed, as shown in FIG. 1, the client devices 110a-110n include the search-based editing system 106. Example components of the search-based editing system 106 will be described below with regard to FIG. 16.

Figure 2:
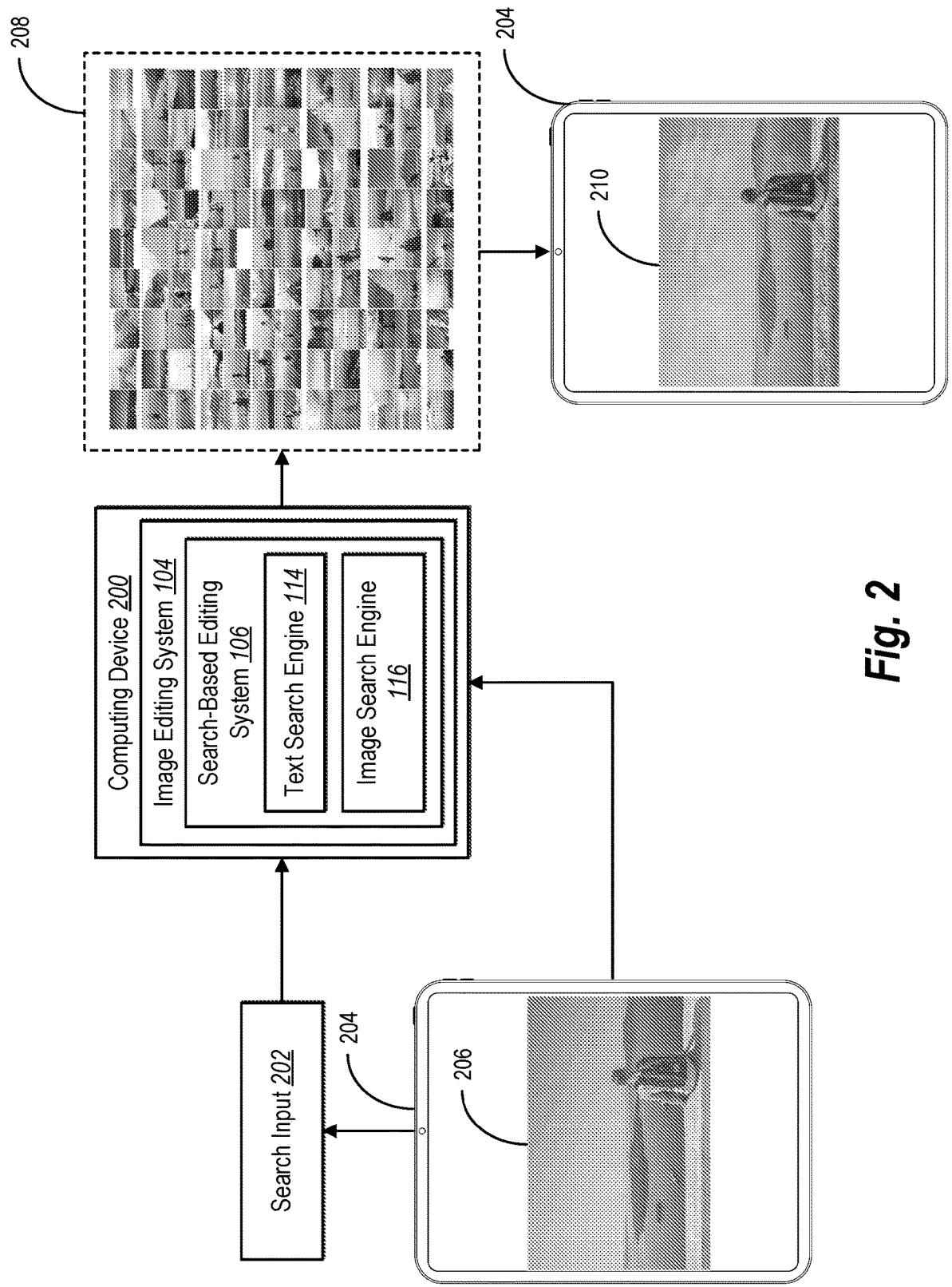
FIG. 2 illustrates an overview diagram of the search-based editing system using image search results to modify an input digital image in accordance with one or more embodiments.

FIG. 2 illustrates an overview diagram of the search-based editing system 106 utilizing search results to modify an input digital image in accordance with one or more embodiments. As shown in FIG. 2, the search-based editing system 106 receives search input 202 from a client device 204. In one or more embodiments, search input broadly includes input received, provided, or otherwise accessed to facilitate a search, such as an image search (e.g., a search for one or more digital images). In particular, in some embodiments, search input includes input providing information or instructions that guide an image search process. For instance, in some cases, search input includes input indicating targeted content to include in the image search results, such as a query indicating one or more visual elements to target. In some implementations, search input includes input indicating one or more parameters for conducting the image search, such as a combination weight for combining multiple queries of the search input. In some cases, search input includes a collection of inputs. Accordingly, the following discussion may refer to the inputs as components of the search input or as separate search inputs.

As indicated, in some cases, search input includes a query. In one or more embodiments, a query (or search query) includes a request for information or data, such as digital images. In particular, as mentioned above, in some embodiments, a query includes a part of a search input that indicates the content or type of content to be retrieved. For instance, in some cases, a query indicates semantic information and/or layout information to include in the image search results (e.g., to include in at least some of the digital images of the image search results). In some implementations, a query includes, but is not limited to, a text query, an image query, a sketch query, or a local query, which will be discussed in more detail below.

As further shown in FIG. 2, the search-based editing system 106 receives an input digital image 206 from the client device 204. In one or more embodiments, an input digital image includes a digital image to be modified. In particular, in some embodiments, an input digital image includes a digital image received, provided, or otherwise selected for modification using image search results retrieved via an image search.

Additionally, as illustrated, the search-based editing system 106 analyzes the search input 202 and provides image search results 208 including one or more digital images based on the analysis. In particular, in some implementations, the search-based editing system 106 utilizes the search input 202 to conduct an image search, retrieves the image search results 208 via the image search, and provides the image search results 208 to the client device 204. To illustrate, as shown in FIG. 2, in some cases, the search-based editing system 106 operates on a computing device 200 (e.g., the server(s) 102 or one of the client devices 110a-110n discussed above with reference to FIG. 1). Accordingly, in some embodiments, the search-based editing system 106 receives the search input 202 (as well as the input digital image 206) from the client device 204 at the computing device 200 and conducts the image search using the search input 202 in response.

In one or more embodiments, the search-based editing system 106 utilizes a text search engine 114 to conduct the image search using the search input 202. In one or more embodiments, a text search engine includes a search engine that conducts an image search using search input that includes text input (e.g., a text query). In particular, in some embodiments, a text search engine includes a search engine that utilizes text input to retrieve image search results. For example, in some cases, a text search engine identifies textual features of a text input and searches for and retrieves digital images that incorporate one or more of those textual features. As will be discussed in more detail below, in some cases, a text search engine conducts the image search using embeddings (e.g., an embedding representing the text input and/or embeddings representing the digital images that are searched).

In some cases, the search-based editing system 106 additionally or alternatively utilizes an image search engine 116 to conduct the image search using the search input 202. In one or more embodiments, an image search engine includes a search engine that conducts an image search using search input that includes visual input (e.g., an image query, a sketch query, or a local query, such as a cropped region or a semantic region of a digital image). For example, in some cases, an image search engine identifies visual features of a visual input and searches for and retrieves digital images that incorporate one or more of those visual features. As will be discussed in more detail below, in some cases, a visual search engine conducts the image search using embeddings (e.g., an embedding representing the visual input and/or embeddings representing the digital images that are searched). As will further be discussed below, in some cases, an image search engine uses text input to conduct the image search (e.g., text input provided in connection with visual input, such as text input provided as part of a multi-modal canvas search query).

As further shown in FIG. 2, the search-based editing system 106 modifies the input digital image 206 utilizing the image search results 208. In particular, the search-based editing system 106 generates a modified digital image 210 from the input digital image 206 utilizing at least one digital image from the image search results 208. For instance, as will be explained in more detail below, in some cases, the search-based editing system 106 receives, from the client device 204, a selection of a digital image from the image search results 208 and further receives a selection of an editing operation. Accordingly, the search-based editing system 106 utilizes the selected digital image to modify the input digital image 206 via the selected editing operation.

Thus, the search-based editing system 106 offers improved flexibility when compared to many conventional systems. Indeed, the search-based editing system 106 flexibly bridges image search and image modification processes. For instance, while many conventional systems require a user to provide a reference image for use in modifying an input digital image, the search-based editing system 106 provides its own features for retrieving digital images. Indeed, the search-based editing system 106 flexibly receives search input and identifies reference images that incorporate information and/or adhere to the parameters of the search input. Thus, the search-based editing system 106 flexibly uses the search-based reference images to modify an input digital image.

Figure 3:
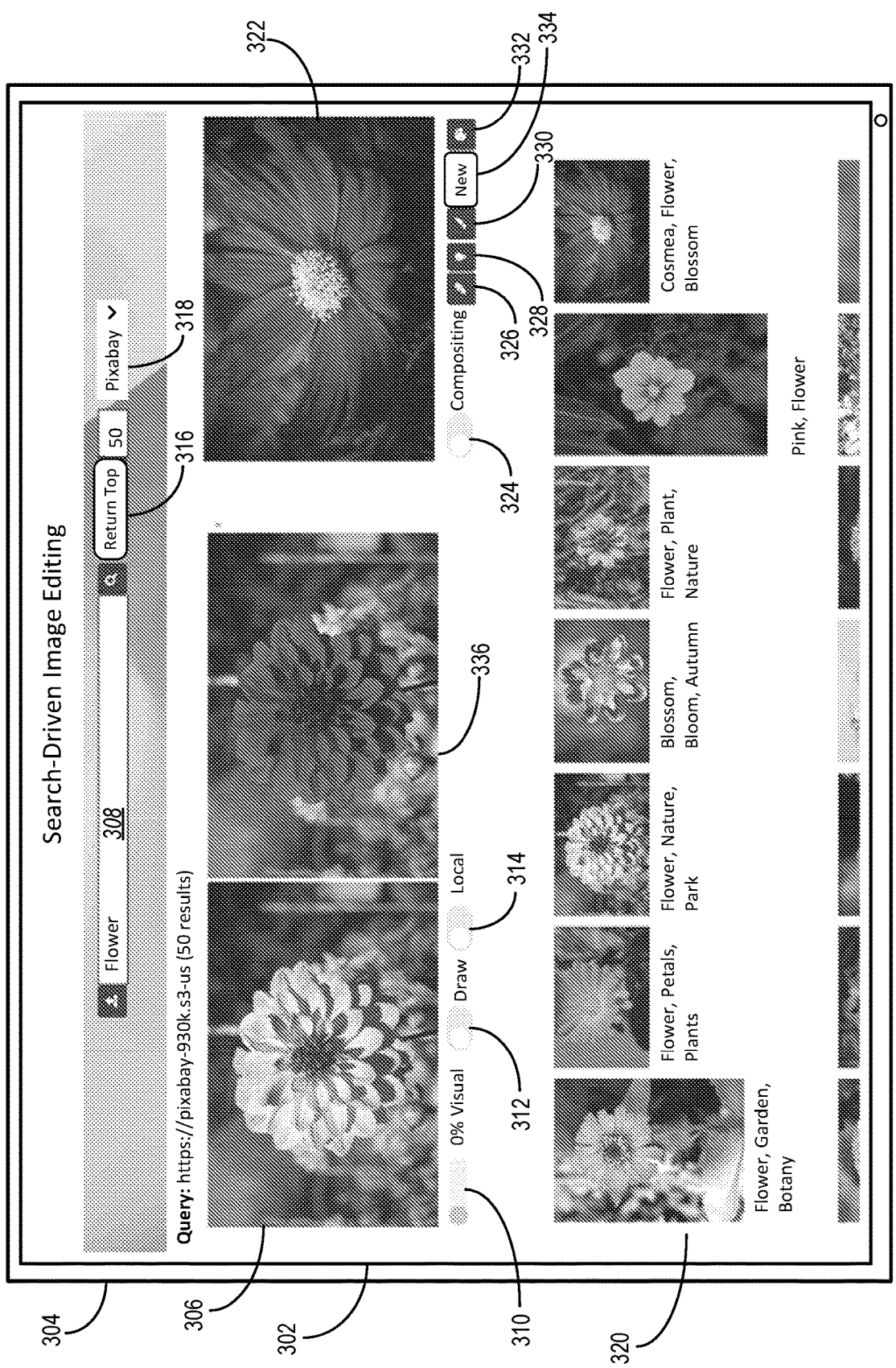
FIG. 3 illustrates a graphical user interface utilized by the search-based editing system to implement image search and image modification in accordance with one or more embodiments.

FIG. 3 illustrates a graphical user interface utilized by the search-based editing system 106 to implement image search and image modification in accordance with one or more embodiments. Indeed, FIG. 3 illustrates an embodiment of the front-end of the search-based editing system 106 that facilitates receiving search input and an input digital image, providing image search results retrieved based on the search input, and modifying the input digital image using the image search results.

In particular, as shown in FIG. 3, the search-based editing system 106 provides a graphical user interface 302 for display on a client device 304. As further shown, the search-based editing system 106 provides an input digital image 306 for display within the graphical user interface 302.

Additionally, as shown in FIG. 3, the search-based editing system 106 provides, for display within the graphical user interface 302, a plurality of interactive elements for facilitating an image search. In some cases, the search-based editing system 106 receives search input based on interactions with the interactive elements. For instance, as shown in FIG. 3, the search-based editing system 106 provides a text box 308 for entry of a text query.

The search-based editing system 106 also provides a slider 310 for indicating a combination weight to be used in combining multiple queries of a search input. In particular, in some cases, the search-based editing system 106 determines a combination weight to use in combining two queries based on a position of the slider 310. To illustrate, in one or more embodiments, the search-based editing system 106 determines a combination weight for combining a text query and an image query, with the position of the slider 310 corresponding to a weight to associated with at least one of the queries. Indeed, though not explicitly shown in FIG. 3, in one or more embodiments, the search-based editing system 106 receives an image query via the graphical user interface 302. For instance, in some embodiments, the search-based editing system 106 utilizes the input digital image 306 as the image query. In some cases, the search-based editing system 106 provides an interactive element for entry of another digital image for use as the image query. Accordingly, the search-based editing system 106 utilizes the graphical user interface 302 to facilitate combining a text query and an image query. More detail regarding combining multiple queries of a search input will be provided below.

Further, the search-based editing system 106 provides a switch 312 for enabling input of a sketch query. For instance, in some embodiments, the search-based editing system 106 enables input that includes one or more drawn or other inputs in response to detecting a selection of the switch 312. To illustrate, in one or more embodiments, in response to detecting an interaction with the switch 312, the search-based editing system 106 provides one or more selectable options (e.g., tools) within the graphical user interface 302 for creating the one or more drawn or other inputs. The search-based editing system 106 can enable the one or more drawn or other inputs to be placed on the input digital image 306 or on a blank canvas. Accordingly, in some cases, in response to detecting an interaction with the switch 312, the search-based editing system 106 provides a blank canvas for display within the graphical user interface 302.

The search-based editing system 106 also provides the switch 314 for enabling input of a local query. For instance, in some embodiments, the search-based editing system 106 enables input that includes one or more local elements of the input digital image 306 (or another digital image) in response to detecting a selection of the switch 314. To illustrate, in one or more embodiments, in response to detecting an interaction with the switch 314, the search-based editing system 106 provides one or more selectable options (e.g., tools) within the graphical user interface 302 for selecting one or more local elements of the input digital image 306 (or another digital image). For instance, in some cases, the search-based editing system 106 provides a selectable option for drawing a bounding box to select a cropped region of the input digital image 306. In some implementations, the search-based editing system 106 provides a selectable option for selecting a semantic region of the input digital image 306. For instance, in some cases, the search-based editing system 106 generates and utilizes one or more segmentation masks corresponding to the input digital image 306 to differentiate between its different semantic regions. Thus, the search-based editing system 106 can identify a semantic region that has been selected.

In one or more embodiments, the search-based editing system 106 further utilizes the switch 314 to enable local edits. For instance, in one or more embodiments, upon a selection of the switch 314, the search-based editing system 106 limits an editing operation (e.g., one of the editing operations discussed below) to a selection region of the input digital image 306. For instance, in some implementations, the search-based editing system 106 detects a selection of the switch 314 and further detects a selection of a region of the input digital image 306. The search-based editing system 106 can detect the selection of the region of the input digital image 306 before or after a reference image and/or an editing operation has been selected. Thus, the search-based editing system 106 modifies the selected region of the input digital image 306 via the selected editing operation without modifying other, unselected regions.

As shown in FIG. 3, the search-based editing system 106 also provides a box 316 for indicating a number of digital images to return from the image search and a drop-down menu 318 for selecting a data source for conducting the image search (e.g., an image database). Other interactive elements not shown can be provided in various other embodiments.

As discussed above, the search-based editing system 106 provides several interactive elements for entry of various queries, such as a text query, an image query, a sketch query, or a local query. In one or more embodiments, a text query includes a query having text that indicates the content or type of content to be retrieved. Similarly, in one or more embodiments, an image query includes a query having a digital image that indicates the content or type of content to be retrieved. For example, in some cases, an image query includes a digital image that portrays an object, landscape, tone, texture, color palette, and/or layout to be included in the image search results. In some embodiments, a sketch query includes a query having one or more inputs positioned on a canvas (whether a digital image used as a canvas or a blank canvas). For example, in some implementations, a sketch query includes one or more drawn inputs, such as a sketch input (e.g., a drawn input created via a sketch tool) or a brush input (e.g., a drawn input created via a brush tool). In some instances, a sketch query includes a text input (e.g., text created within a text box or at some designated location on the canvas). In some cases, a sketch query includes an image input (e.g., a cropped region of a digital image placed on the canvas or the digital image used as the canvas). In one or more embodiments, a local query includes a query involving one or more regions of the input digital image. For instance, in some cases, a local query includes a cropped region of the input digital image as outlined by a bounding box or a selected semantic region of the input digital image.

Additionally, as shown in FIG. 3, the search-based editing system 106 provides image search results 320 for display within the graphical user interface 302. Indeed, in one or more embodiments, the search-based editing system 106 conducts an image search using the search input and provides the one or more digital images retrieved via the image search for display. As further shown in FIG. 3, the search-based editing system 106 utilizes one of the digital images from the image search results 320 as a reference image 322 for modifying the input digital image 306. In particular, in some embodiments, the search-based editing system 106 determines to use, as the reference image 322, a digital image that is selected from the image search results 320 via the graphical user interface 302. As illustrated, the search-based editing system 106 provides the reference image 322 for display within the graphical user interface 302 separately from the image search results 320 to facilitate use of the reference image 322 in modifying the input digital image 306.

As further illustrated in FIG. 3, the search-based editing system 106 provides, for display within the graphical user interface 302, a plurality of interactive elements for facilitating modification of the input digital image 306 using the reference image 322. In some embodiments, the search-based editing system 106 determines one or more editing operations to use in modifying the input digital image 306 based on interactions with the interactive elements. In one or more embodiments, an editing operation includes an operation that modifies a digital image. In particular, in some embodiments, an editing operation includes one or more actions that are performed to apply a modification to a digital image. In some cases, an editing operation also includes parameters for the performed action(s).

For example, as shown in FIG. 3, the search-based editing system 106 provides a selectable option 324 corresponding to a compositing operation, a selectable option 326 corresponding to a color transfer operation, a selectable option 328 corresponding to a tone transfer operation, a selectable option 330 corresponding to a texture transfer operation, and a selectable option 332 corresponding to a whitening and coloring transform (WCT) color transfer operation (e.g., an operation to transfer the color palette from a reference image to an input digital image). As further shown, the search-based editing system 106 provides additional interactive elements (e.g., the selectable option 334) corresponding to additional editing operations.

Further, as shown in FIG. 3, the search-based editing system 106 provides the modified input digital image 336. Indeed, in one or more embodiments, the search-based editing system 106 modifies the input digital image 306 utilizing one or more selected editing operations and provides the modified input digital image for display. In one or more embodiments, the search-based editing system 106 performs a selected editing operation automatically in response to a selection of the corresponding selectable option. In other words, in some cases, the search-based editing system 106 performs a selected editing operation without further user input. For example, as will be discussed below, in some implementations, the search-based editing system 106 utilizes a neural network to perform one or more of the editing operations. Accordingly, in some cases, upon selection of a selectable option, the search-based editing system 106 triggers a neural network to perform the corresponding editing operation.

Thus, in one or more embodiments, the search-based editing system 106 utilizes a consolidated graphical user interface to bridge image search and image modification. In particular, the search-based editing system 106 provides a graphical user interface that consolidates the display of search options, search results, editing options, and editing results. Accordingly, the search-based editing system 106 can initiate image search and image modification based on user interactions with a single graphical user interface. As such, the search-based editing system 106 provides improved efficiency when compared to conventional systems. In particular, the search-based editing system 106 reduces the user interactions typically required under conventional systems for image search and image modification.

Indeed, by utilizing a consolidated graphical user interface, the search-based editing system 106 reduces the need to switch back-and-forth between different windows or applications to access and implement search and modification features. Further, by performing an editing operation in response to selection of a corresponding selectable option (e.g., via a neural network), the search-based editing system 106 reduces the user interactions typically required under conventional systems to navigate multiple menus, sub-menus, and/or windows to select the proper tool, set the desired parameters for the tool, and utilize the tool to implement the modification.

Figure 4:
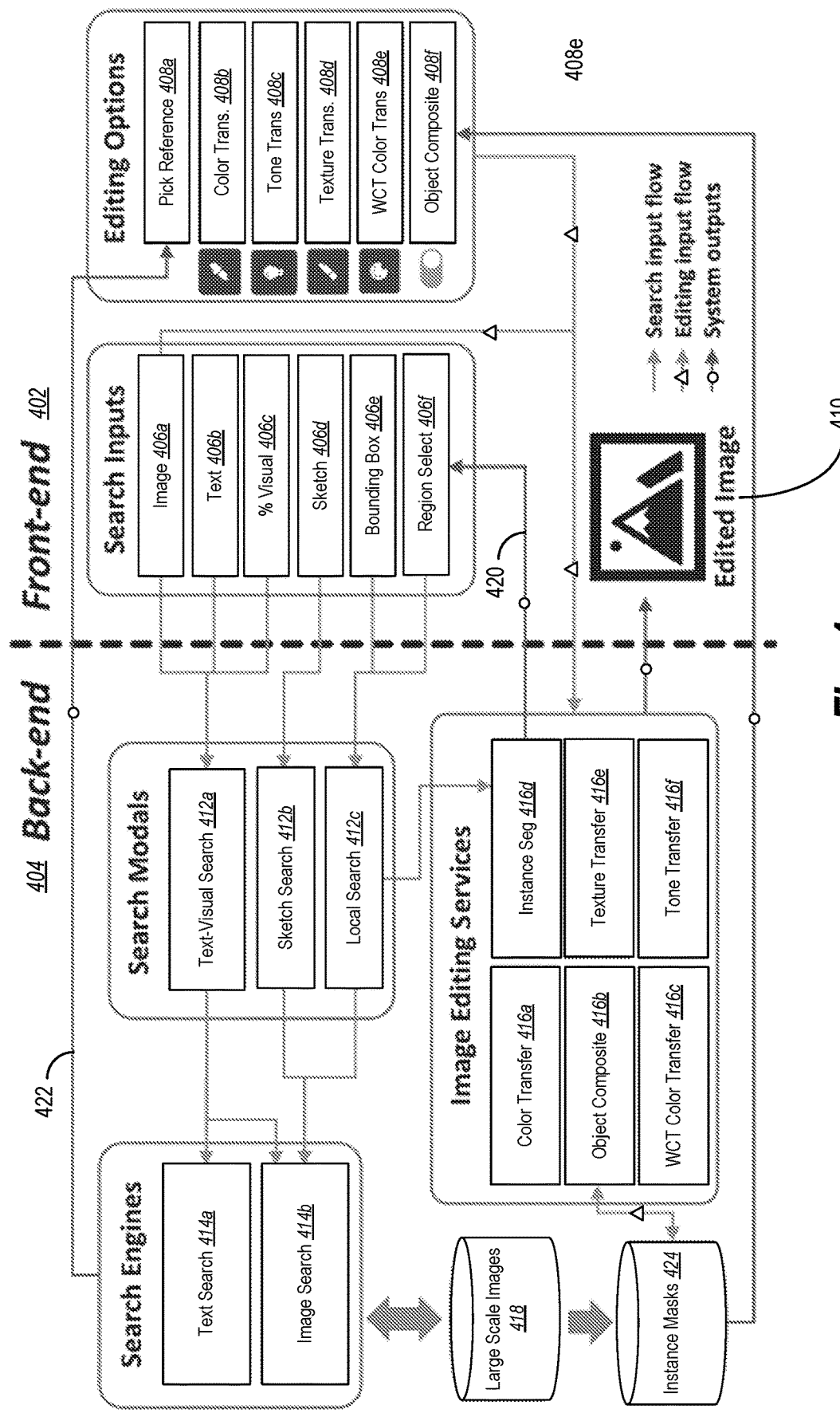
FIG. 4 illustrates a block diagram of architectural components of the search-based editing system in accordance with one or more embodiments.

FIG. 4 illustrates a block diagram of architectural components of the search-based editing system 106 in accordance with one or more embodiments. In particular, FIG. 4 illustrates front-end components 402 and back-end components 404. FIG. 4 further illustrates the search-based editing system 106 utilizing these components to receive search input, provide search results, receive editing input, and provide editing results in accordance with one or more embodiments.

As shown in FIG. 4, the front-end components 402 include search inputs 406a-406f and editing options 408a-408f. As discussed above with reference to FIG. 3, in some embodiments, the search-based editing system 106 provides interactive elements corresponding to the search inputs 406a-406f and editing options 408a-408f for display within a graphical user interface. Further, the search-based editing system 106 determines which search inputs and editing options to use based on user interactions with the interactive elements. As further shown, the front-end components 402 include the modified input digital image 410. For instance, the search-based editing system 106 provides the modified input digital image 410 for display within the graphical user interface simultaneously with the interactive elements corresponding to the search inputs 406a-406f and the editing options 408a-408f.

Additionally, as shown in FIG. 4, the back-end components 404 include search modals 412a-412c. In one or more embodiments, a search modal includes a type or classification of an image search. In particular, in some embodiments, a search modal includes a process for conducting an image search that corresponds to a search input. In some cases, a search modal includes, but is not limited to, a textual-visual search modal, a sketch search modal, or a local search modal.

As shown in FIG. 4, the search-based editing system 106 determines the search modal to use for conducting the image search based on the search input received. For instance, in response to receiving one or more of the search inputs 406a-406c, the search-based editing system 106 determines to use the search modal 412a (i.e., a textual-visual search modal). Additionally, in response to receiving the search input 406d, the search-based editing system 106 determines to use the search modal 412b (i.e., a sketch search modal). Further, in response to receiving one of the search inputs 406e-406f, the search-based editing system 106 determines to use the search modal 412c (i.e., a local search modal).

As further indicated in FIG. 4, the search-based editing system 106 implements a different process for conducting an image search via each search modal. For example, via the search modal 412a, the search-based editing system 106 queries the text search engine 414a and the image search engine 414b. Via the search modal 412b, the search-based editing system 106 queries the image search engine 414b. Similarly, via the search modal 412c, the search-based editing system 106 queries the image search engine 414b and utilizes the editing operation 416d (i.e., a segmentation operation). Indeed, as indicated by FIG. 4 (e.g., the line 420), the search-based editing system 106 utilizes the editing operation 416d to facilitate selection of a semantic region of an input digital image as part of a local query. For instance, in some cases, the search-based editing system 106 utilizes the editing operation 416d to generate one or more segmentation masks for the input digital image (e.g., upon receiving the input digital image or in response to detecting a selection of an interactive element that enables input of a local query). Accordingly, in some implementations, upon detecting a selection of a location of the input digital image, the search-based editing system 106 parses out the corresponding semantic region utilizing the one or more segmentation masks and utilizes the semantic region as search input.

In one or more embodiments, a segmentation mask includes an identification of pixels in an image that represent an object. In particular, in some embodiments, a segmentation mask includes an image filter useful for partitioning a digital image into separate portions. For example, in some cases, a segmentation mask includes a filter that corresponds to a digital image (e.g., a foreground image) that identifies a portion of the digital image (i.e., pixels of the digital image) belonging to a foreground object and a portion of the digital image belonging to a background. For example, in some implementations, a segmentation map includes a map of the digital image that has an indication for each pixel of whether the pixel is part of an object (e.g., foreground object) or not. In such implementations, the indication can comprise a binary indication (a 1 for pixels belonging to the object and a zero for pixels not belonging to the object). In alternative implementations, the indication can comprise a probability (e.g., a number between 1 and 0) that indicates the likelihood that a pixel belongs to the object. In such implementations, the closer the value is to 1, the more likely the pixel belongs to the foreground or object and vice versa.

In one or more embodiments, the search-based editing system 106 utilizes a neural network to implement the editing operation 416d. In one or more embodiments, a neural network includes a type of machine learning model, which can be tuned (e.g., trained) based on inputs to approximate unknown functions used for generating the corresponding outputs. In particular, in some embodiments, a neural network includes a model of interconnected artificial neurons (e.g., organized in layers) that communicate and learn to approximate complex functions and generate outputs based on a plurality of inputs provided to the model. In some instances, a neural network includes one or more machine learning algorithms. Further, in some cases, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a generative adversarial neural network, a graph neural network, or a multi-layer perceptron. In some embodiments, a neural network includes a combination of neural networks or neural network components.

In one or more embodiments, the search-based editing system 106 utilizes, to implement the editing operation 416d, one of the neural network models described in U.S. patent application Ser. No. 17/200,525 filed on Mar. 12, 2021, entitled GENERATING REFINED SEGMENTATION MASKS VIA METICULOUS OBJECT SEGMENTATION or U.S. patent application Ser. No. 17/589,114 filed on Jan. 31, 2022, entitled DETECTING DIGITAL OBJECTS AND GENERATING OBJECT MASKS ON DEVICE, the contents of which are expressly incorporated herein by reference in their entirety. Another embodiment of a neural network utilized to perform a segmentation operation will be discussed in more detail below.

As further shown in FIG. 4, the search-based editing system 106 utilizes the text search engine 414a and/or the image search engine 414b to conduct an image search. In particular, the search-based editing system 106 utilizes the text search engine 414a and/or the image search engine 414b to search through a digital image database 418. For instance, in one or more embodiments, the search-based editing system 106 searches for, identifies, and retrieves one or more digital images from the digital image database 418 in accordance with the received search input. In some cases, each digital image retrieved incorporates all features (e.g., semantic and/or layout features) requested via the search input. In some instances, however, the search-based editing system 106 retrieves a digital image upon determining that it includes at least one of the features requested via the search input. As shown by FIG. 4, the search-based editing system 106 provides the digital images retrieved via the text search engine 414a and/or the image search engine 414b for selection of a reference image (as indicated by the line 422 pointing toward the editing option 408a). Though FIG. 4 shows one digital image database, it should be understood that the search-based editing system 106 can access and/or maintain multiple digital image databases in various embodiments. Accordingly, the search-based editing system 106 can search through one or many digital image databases in response to receiving search input.

Additionally, as shown in FIG. 4, the search-based editing system 106 generates and stores, within a segmentation mask database 424, segmentation masks for the digital images of the digital image database 418. Indeed, in one or more embodiments, the search-based editing system 106 generates one or more segmentation masks for each digital image stored in the digital image database 418. In some cases, the search-based editing system 106 utilizes the editing operation 416d to generate the segmentation masks. In some implementations, the search-based editing system 106 generates the segmentation masks off-line so that they are available for image editing. In some instances, however, the search-based editing system 106 generates a segmentation mask for a digital image when using the digital image to modify the input digital image via a corresponding image editing operation, such as the editing operation 416b (i.e., a compositing operation).

As further shown in FIG. 4, the back-end components 404 includes the editing operations 416a-416f for modifying the input digital image. In one or more embodiments, the search-based editing system 106 determines one or more of the editing operations 416a-416f to use to modify the input digital image based on selections received from among the editing options 408a-408f. As further indicated by FIG. 4, in some cases, the search-based editing system 106 utilizes the search input 406a to implement one or more image editing operations. For instance, where the input digital image is utilized as the image query, the search-based editing system 106 utilizes one or more image editing operations to modify the image query (i.e., the input digital image). Thus, the search-based editing system 106 utilizes one or more of the editing operations 416a-416f to generate the modified input digital image 410.

As previously mentioned, in some embodiments, the search-based editing system 106 utilizes a neural network to implement one or more of the editing operations to modify an input digital image. FIGS. 5A-7B each illustrate a neural network architecture used by the search-based editing system 106 to implement one or more editing operations in accordance with one or more embodiments.

In some embodiments, the search-based editing system 106 modifies an input digital image using one or more image characteristics of another digital image, such as a reference image selected from among image search results. In one or more embodiments, an image characteristic includes a characteristic or attribute of a digital image. In particular, in some embodiments, an image characteristic includes a latent or patent characteristic of a digital image. For instance, in some cases, an image characteristic includes, but is not limited to, a color or color palette, a tone, a texture, or an object portrayed by a digital image.

To illustrate, in one or more embodiments, the search-based editing system 106 determines an editing operation to use in modifying the input digital image (e.g., by receiving a selection of a corresponding interactive element). Additionally, the search-based editing system 106 determines an image characteristic of the reference image that corresponds to the editing operation (e.g., where the editing operation corresponds to a tone transfer operation, the search-based editing system 106 determines the tone of the reference image). The search-based editing system 106 further modifies the input digital image using the image characteristic of the reference image via the editing operation.

Figure 5A:
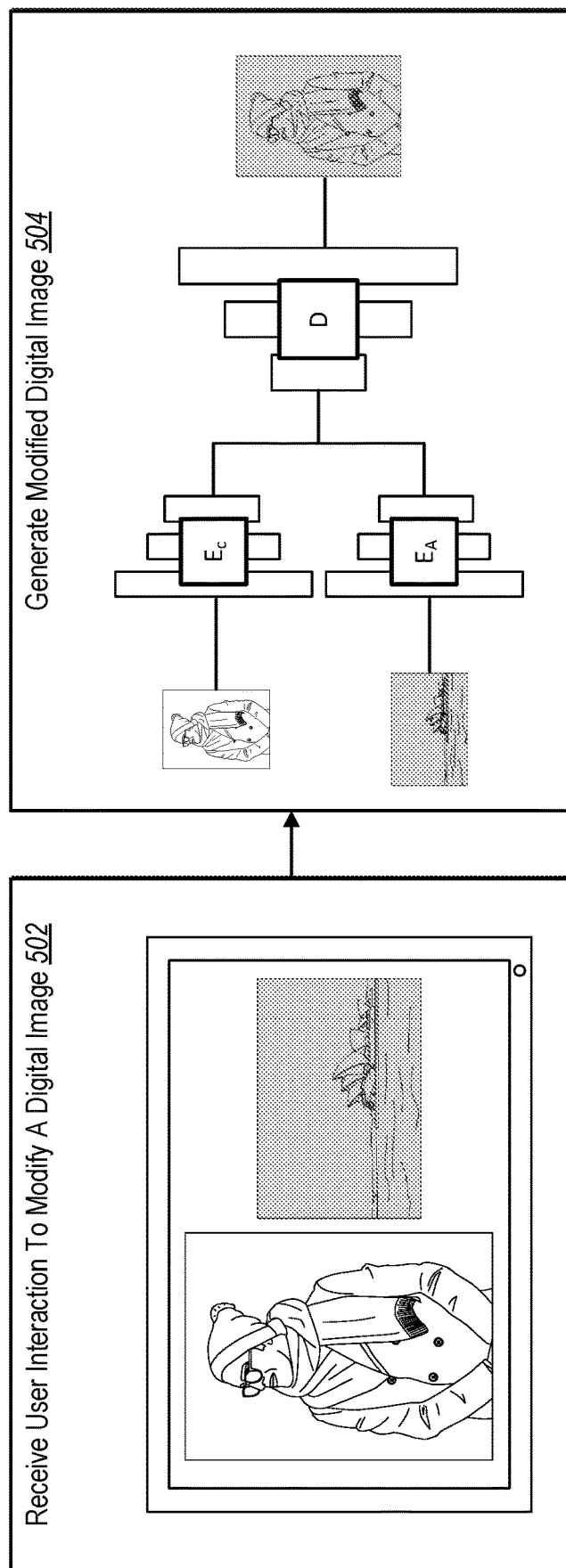
FIG. 5A illustrates an overview of performing a color transfer operation using an image harmonization neural network in accordance with one or more embodiments.

FIG. 5A illustrates an overview of performing a color transfer operation using an image harmonization neural network in accordance with one or more embodiments. In some embodiments, the search-based editing system 106 similarly utilizes the image harmonization neural network to perform a tone transfer operation. FIG. 5A provides a high-level description of the acts involved for utilizing an image harmonization neural network to perform a color transfer operation (or a tone transfer operation). The architecture of the image harmonization neural network implemented by the search-based editing system 106 to perform the acts will be provided below with reference to FIG. 5B.

In one or more embodiments, the search-based editing system 106 utilizes an image harmonization neural network to perform a color transfer operation (or a tone transfer operation) by extracting and combining content codes and appearance codes. For example, in some cases, an image harmonization neural network includes one or more other neural network that make up the image harmonization neural network, such as a neural network content encoder, a neural network appearance encoder, and a neural network decoder. A neural network content encoder can include a neural network that extracts a content code (e.g., one or more latent feature representing content) from a digital image, disentangled from the image's appearance. A neural network appearance encoder can include a neural network that extracts an appearance code (e.g., one or more latent features representing appearance) from a digital image, disentangled from the image's content. A neural network decoder can include a neural network that combines a content code and an appearance code to generate or a modified digital image depicting content corresponding to the content code having an appearance corresponding to the appearance code. For instance, in some cases, the search-based editing system 106 utilizes an image harmonization neural network to modify the content of an input digital image to have the appearance of a reference image (e.g., transfer a color or tone of the reference image to the input digital image).

Indeed, in one or more embodiments, the search-based editing system 106 utilizes a dual-encoder-based harmonization scheme to extract content and appearance (disentangled one from the other) from digital images. In some cases, digital image content (or simply "content") refers to a geometric layout or spatial arrangement of the digital image. For example, content indicates placement, sizes, and shapes of various objects depicted within a digital image. In the same or other embodiments, digital image appearance (or simply "appearance") refers to a visual aesthetic or visual style of a digital image. For example, appearance sometimes refers to one or more visual characteristics of a digital image, such as tone, color, contrast, brightness, and saturation.

In some case, the search-based editing system 106 modifies content before modifying appearance as part of dual data augmentation, while in other embodiments the search-based editing system 106 modifies appearance before modifying content (or modifies content and appearance simultaneously or concurrently). In cases where the search-based editing system 106 modifies content first, the search-based editing system 106 crops the initial digital image and subsequently augments the appearance of the individual digital image crops (e.g., by modifying color or tone) to generate dually augmented digital image crops. Conversely, in cases where the search-based editing system 106 modifies appearance first, the search-based editing system 106 augments color (or tone) of the initial digital image to generate an appearance-augmented digital image. In these cases, the search-based editing system 106 subsequently crops the appearance-augmented digital image to generate a plurality of dually augmented digital image crops.

As mentioned, in some cases, the search-based editing system 106 selects pairs of digital image crops to input into the image harmonization neural network. Within a pair of digital image crops, the search-based editing system 106 selects a content crop (e.g., a crop from an input digital image) and an appearance crop (e.g., a crop from a reference image).

In any event, the search-based editing system 106 inputs the content crop into a neural network content encoder (represented by $E_C$) to extract a content code. In addition, the search-based editing system 106 inputs the appearance crop into a neural network appearance encoder (represented by $E_A$) to extract an appearance code. As shown, the search-based editing system 106 further utilizes a neural network decoder (represented by D) to combine the appearance code and the content code and thereby generate a modified digital image.

As illustrated in FIG. 5A, the search-based editing system 106 performs an act 502 to receive user interaction to modify a digital image (e.g., an input digital image). More specifically, the search-based editing system 106 receives an indication (e.g., from a client device) of a user interaction requesting a color operation (or a tone operation) to generate a modified digital image by combining an input digital image (or a portion of an input digital image) with a reference image. In some cases, the search-based editing system 106 receives an indication in the form of a selection of a selectable element within a graphical user interface (e.g., the graphical user interface 302 of FIG. 3) and/or selection of one or more both of the input digital image and/or the reference image. In certain embodiments, the search-based editing system 106 receives an indication of user selection specifying an input digital image (or a portion of an input digital image) to use as a foreground within a final modified digital image, along with user selection specifying a reference image to use as a background within the final modified digital image. In other embodiments, the input digital image comprises a background, while the reference image comprises a foreground of the modified output.

In any event, as shown in FIG. 5A, the search-based editing system 106 performs an act 504 to generate a modified digital image. To elaborate, the search-based editing system 106 utilizes an image harmonization neural network to generate a modified digital image. For example, the search-based editing system 106 generates a modified digital image by combining the input digital image and the reference image indicated by the user interaction utilizing the image harmonization neural network.

As illustrated, the search-based editing system 106 utilizes the neural network content encoder to extract a content code from the input digital image (e.g., the digital image of the man in glasses, a hat, and a jacket). In addition, the search-based editing system 106 utilizes the neural network appearance encoder to extract an appearance code from the reference image (e.g., the digital image of the Sydney Opera House). Further, the search-based editing system 106 utilizes the neural network decoder to generate the modified digital image (e.g., the digital image of the man with an appearance that matches that of the Sydney Opera House image) by combining the extracted content code and appearance code. Thus, the modified digital image depicts content from the input digital image having an appearance of the reference image.

Figure 5B:
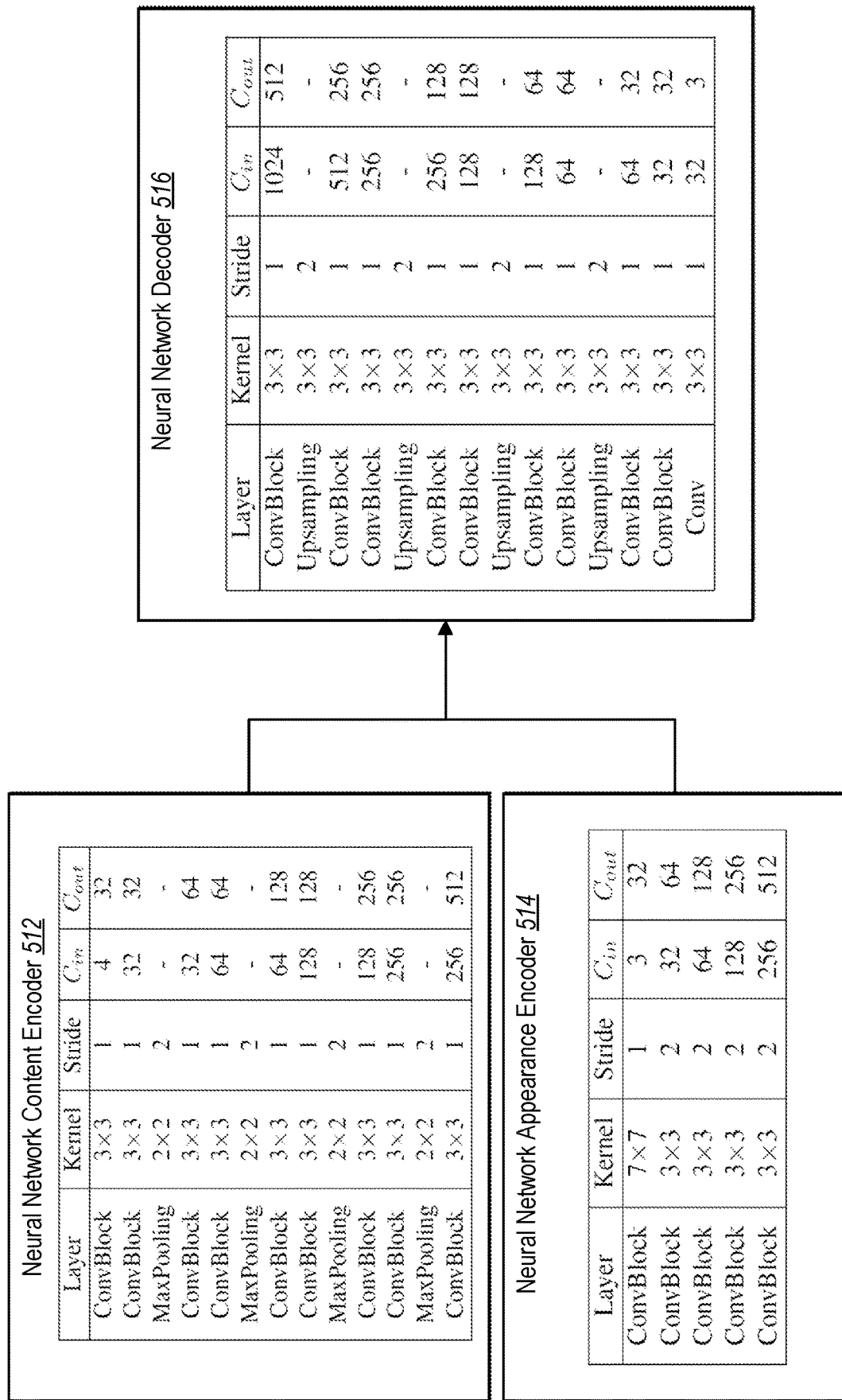
FIG. 5B illustrates an example architecture of an image harmonization neural network utilized to perform a color transfer operation in accordance with one or more embodiments.

FIG. 5B illustrates the various architectures of the neural networks within the image harmonization neural network utilized by the search-based editing system 106 in accordance with one or more embodiments. As illustrated in FIG. 5B, the neural network content encoder 512 includes a number of layers, where each layer is made up of different blocks of respective kernel sizes, strides, and resolutions. For example, the neural network content encoder 512 includes max pooling layers and convolutional layers in a particular arrangement. As shown, the "ConvBlock" term in FIG. 5B represents a convolutional-LeakyReLu-BatchNorm block.

As also illustrated in FIG. 5B, embodiments of the neural network appearance encoder 514 include five layers. For example, the neural network appearance encoder 514 includes a convolutional ConvBlock layer with a 7×7 kernel, in addition to four ConvBlock layers with 3×3 kernels, each with their own respective resolutions for input and output.

Further, the neural network decoder 516 includes a number of layers, including ConvBlock layers, Upsampling layers, and a single convolutional layer. As shown in FIG. 5B, each layer has a 3×3 kernel with different resolutions and strides.

Figure 6:
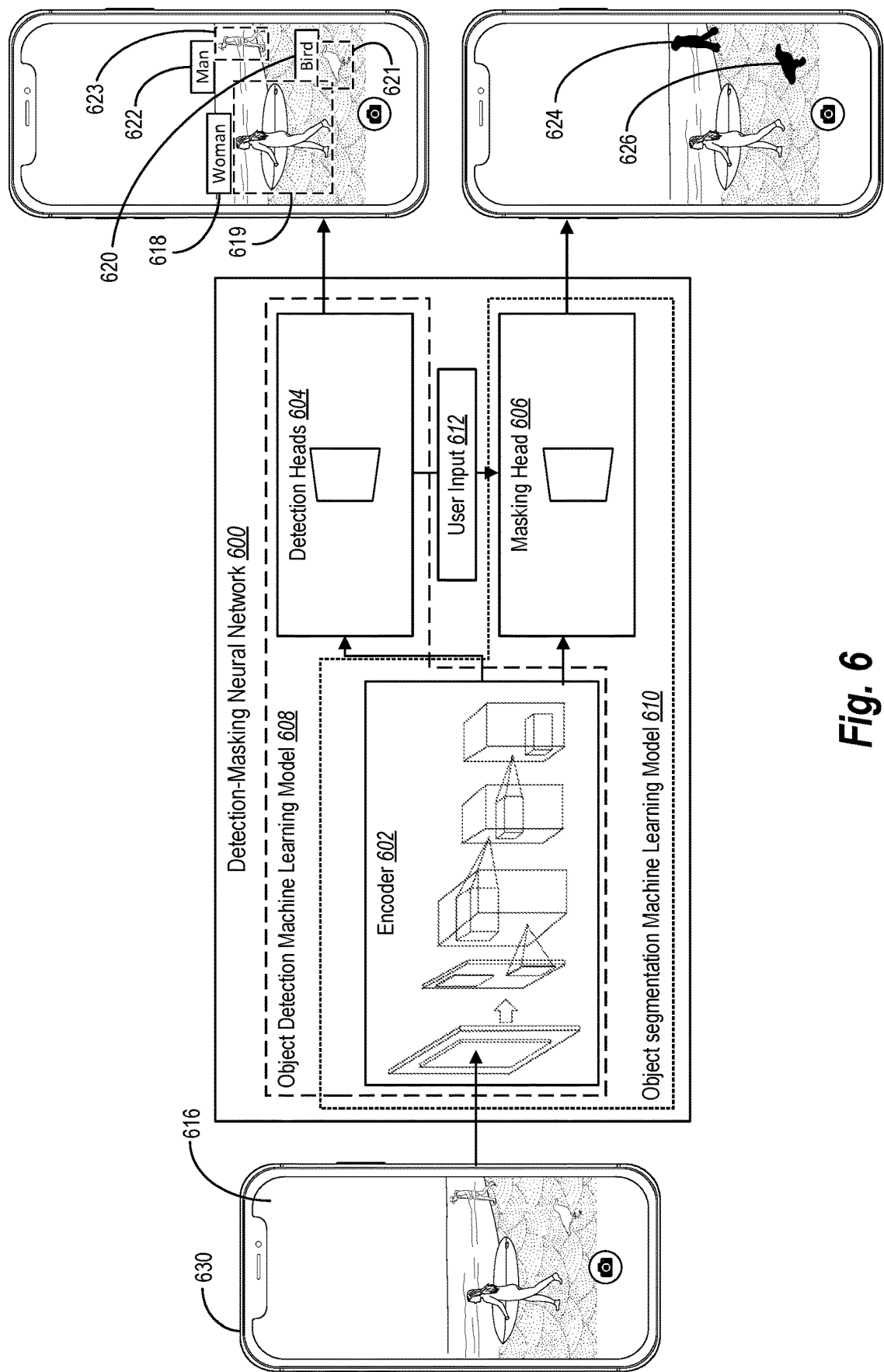
FIG. 6 illustrates the search-based editing system performing a segmentation operation using a detection-masking neural network in accordance with one or more embodiments.

FIG. 6 illustrates the search-based editing system 106 performing a segmentation operation using a detection-masking neural network in accordance with one or more embodiments. Indeed, several exemplary neural networks were provided above with reference to FIG. 4. More detail regarding a neural network used for performing segmentation will now be provided. In some cases, the search-based editing system 106 utilizes the segmentation operation to extract a digital object portrayed in a reference image. In some cases, however, search-based editing system 106 utilizes the segmentation operation to extract a digital object portrayed in an input digital image.

Specifically, FIG. 6 illustrates a detection-masking neural network 600 that comprises both an object detection machine learning model 608 (in the form of an object detection neural network) and an object segmentation machine learning model 610 (in the form of an object segmentation neural network). In some cases, the detection-masking neural network 600 is an implementation of the on-device masking system described in U.S. patent application Ser. No. 17/589,114 discussed above with reference to FIG. 4.

Although FIG. 6 illustrates the search-based editing system 106 utilizing the detection-masking neural network 600, in one or more implementations, the search-based editing system 106 utilizes different machine learning models to detect and/or generate segmentation masks for objects. For instance, in one or more implementations, the search-based editing system 106 utilizes, as the object detection machine learning model, one of the machine learning models or neural networks described in U.S. patent application Ser. No. 17/158,527, entitled "Segmenting Objects In Digital Images Utilizing A Multi-Object Segmentation Model Framework," filed on Jan. 26, 2021; or U.S. patent application Ser. No. 16/388,115, entitled "Robust Training of Large-Scale Object Detectors with Noisy Data," filed on Apr. 8, 2019; or U.S. patent application Ser. No. 16/518,880, entitled "Utilizing Multiple Object Segmentation Models To Automatically Select User-Requested Objects In Images," filed on Jul. 22, 2019; or U.S. patent application Ser. No. 16/817,418, entitled "Utilizing A Large-Scale Object Detector To Automatically Select Objects In Digital Images," filed on Mar. 20, 2020; or Ren, et al., *Faster r-cnn: Towards real-time object detection with region proposal networks*, NIPS, 2015; or Redmon, et al., *You Only Look Once: Unified, Real-Time Object Detection*, CVPR 2016, the contents of each of the foregoing applications and papers are hereby incorporated by reference in their entirety.

Similarly, in one or more implementations, the search-based editing system 106 utilizes, as the object segmentation machine learning model, one of the machine learning models or neural networks described in Ning Xu et al., "Deep GrabCut for Object Selection," published Jul. 14, 2017; or U.S. Patent Application Publication No. 2019/0130229, entitled "Deep Salient Content Neural Networks for Efficient Digital Object Segmentation," filed on Oct. 31, 2017; or U.S. patent application Ser. No. 16/035,410, entitled "Automatic Trimap Generation and Image Segmentation," filed on Jul. 13, 2018; or U.S. Pat. No. 10,192,129, entitled "Utilizing Interactive Deep Learning To Select Objects In Digital Visual Media," filed Nov. 18, 2015, each of which are incorporated herein by reference in their entirety.

Returning now to FIG. 6, in one or more implementations, the search-based editing system 106 utilizes a detection-masking neural network 600 that includes an encoder 602 having a backbone network, detection heads 604 (or neural network decoder head), and a masking head 606 (or neural network decoder head). As shown in FIG. 6, the encoder 602 encodes a digital image and provides the encodings to the detection heads 604 and the masking head 606. The detection heads 604 utilize the encodings to detect one or more digital objects portrayed within a frame of the image stream. The masking head 606 generates at least one segmentation mask for the detected objects.

As just mentioned, the detection-masking neural network 600 includes the object detection machine learning model 608 and the object segmentation machine learning model 610. In one or more implementations, the object detection machine learning model 608 includes both the encoder 602 and the detection heads 604 shown in FIG. 6. While the object segmentation machine learning model 610 includes both the encoder 602 and the masking head 606. Furthermore, the object detection machine learning model 608 and the object segmentation machine learning model 610 are separate machine learning models for processing digital images. FIG. 6 illustrates the encoder 602, detection heads 604, and the masking head 606 as a single model for detecting and segmenting objects of a digital image. For efficiency purposes, the search-based editing system 106 utilizes the network illustrated in FIG. 6 as a single network. The collective network (i.e., the object detection machine learning model 608 and the object segmentation machine learning model 610) is referred to as the detection-masking neural network 600. The following paragraphs describe components relating to the object detection machine learning model 608 of the network (such as the detection heads 604) and transitions to discussing components relating to the object segmentation machine learning model 610.

As just mentioned, in one or more embodiments, the search-based editing system 106 utilizes the object detection machine learning model 608 to detect and identify objects within a digital image 616. FIG. 6 illustrates one implementation of an object detection machine learning model 608 that the search-based editing system 106 utilizes in accordance with at least one embodiment. In particular, FIG. 6 illustrates an object detection machine learning model 608 utilized by the search-based editing system 106 to detect objects. In one or more embodiments, the object detection machine learning model 608 comprises a deep learning convolutional neural network (CNN). For example, in some embodiments, the object detection machine learning model 608 comprises a region-based (R-CNN).

As shown in FIG. 6, the object detection machine learning model 608 includes lower neural network layers and higher neural network layers. In general, the lower neural network layers collectively form the encoder 602 and the higher neural network layers collectively form the detection heads 604 (e.g., decoder). In one or more embodiments, the encoder 602 includes convolutional layers that encodes digital images into feature vectors, which are outputted from the encoder 602 and provided as input to the detection heads 604. In various implementations, the detection heads 604 comprise fully connected layers that analyze the feature vectors and output the detected objects (potentially with approximate boundaries around the objects).

In particular, the encoder 602, in one or more implementations, comprises convolutional layers that generate a feature vector in the form of a feature map. To detect objects within the digital image 616, the object detection machine learning model 608 processes the feature map utilizing a convolutional layer in the form of a small network that is slid across small windows of the feature map. The object detection machine learning model 608 then maps each sliding window to a lower-dimensional feature. The object detection machine learning model 608 then processes this feature using two separate detection heads that are fully connected layers. In particular, the first head can comprise a box-regression layer that generates the detected object and an object-classification layer that generates the object label.

As shown by FIG. 6, the output from the detection heads 604 shows object labels above each of the detected objects. For example, the search-based editing system 106, in response to detecting objects, assigns an object label to each of the detected objects. In particular, as previously discussed, the search-based editing system 106 utilizes object labels based on classifications of the objects. To illustrate, FIG. 6 shows a label 618 for woman, a label 620 for bird, and a label 622 for man.

As mentioned, the object detection machine learning model 608 detects the objects within the digital image 616. In some embodiments, and as illustrated in FIG. 6, the search-based editing system 106 indicates the detected objects utilizing approximate boundaries (e.g., bounding boxes 619, 621, and 623). For example, each of the bounding boxes comprises an area that encompasses an object. In some embodiments, the search-based editing system 106 annotates the bounding boxes with the previously mentioned object labels such as the name of the detected object, the coordinates of the bounding box, and/or the dimension of the bounding box.

As illustrated in FIG. 6, the object detection machine learning model 608 detects several objects for the digital image 616. In some instances, the search-based editing system 106 identifies all objects within the bounding boxes. For example, the bounding boxes comprise the approximate boundary area indicating the detected object. An approximate boundary refers to an indication of an area including an object that is larger and/or less accurate than an object mask. In one or more embodiments, an approximate boundary can include at least a portion of a detected object and portions of the digital image 616 not comprising the detected object. An approximate boundary includes any shape, such as a square, rectangle, circle, oval, or other outline surrounding an object. In one or more embodiments, an approximate boundary comprises a bounding box.

Upon detecting the objects in the digital image 616, the search-based editing system 106 generates segmentation masks for the detected objects. Generally, instead of utilizing coarse bounding boxes during object localization, the search-based editing system 106 generates segmentations masks that better define the boundaries of the object. The following paragraphs provide additional detail with respect to generating segmentation masks for detected objects in accordance with one or more embodiments. In particular, FIG. 6 illustrates the search-based editing system 106 utilizing the object segmentation machine learning model 610 to generate segmented objects in accordance with some embodiments.

As illustrated in FIG. 6, the search-based editing system 106 processes a detected object in a bounding box utilizing an object segmentation machine learning model 610 to generate a segmentation mask, such as segmentation mask 624 and segmentation mask 626. In alternative embodiments, the search-based editing system 106 utilizes the object detection machine learning model 608 itself to generate a segmentation mask of the detected object (e.g., segment the object for selection).

In one or more implementations, prior to generating a segmentation mask of a detected object, the search-based editing system 106 receives user input 612 to determine objects for which to generate segmentation masks. For example, the search-based editing system 106 receives input from a user indicating a selection of one of the detected objects. In particular, the user input 612 includes a user tapping a portion of the graphical user interface of the client device 630 to select one or more of the detected objects. To illustrate, the search-based editing system 106 receives user input 612 of the user selecting bounding boxes 621 and 623.

As mentioned, the search-based editing system 106 processes the bounding boxes of the detected objects in the digital image 616 utilizing the object segmentation machine learning model 610. In some embodiments, the bounding box comprises the output from the object detection machine learning model 608. For example, as illustrated in FIG. 6, the bounding box comprises a rectangular border about the object. Specifically, FIG. 6 shows bounding boxes 619, 621 and 623 which surround the woman, the bird, and the man detected in the digital image 616.

The search-based editing system 106 utilizes the object segmentation machine learning model 610 to generate the segmentation masks for the aforementioned detected objects within the bounding boxes. For example, the object segmentation machine learning model 610 corresponds to one or more deep neural networks or models that select an object based on bounding box parameters corresponding to the object within the digital image 616. In particular, the object segmentation machine learning model 610 generates segmentation masks 624 and 626 for the detected man and bird.

In some embodiments, the search-based editing system 106 selects the object segmentation machine learning model 610 based on the object labels of the object identified by the object detection machine learning model 608. Generally, based on identifying one or more classes of objects associated with the input bounding boxes, the search-based editing system 106 selects an object segmentation machine learning model tuned to generate segmentation masks for objects of the identified one or more classes. To illustrate, in some embodiments, based on determining that the class of one or more of the identified objects comprises a human or person, the search-based editing system 106 utilizes a special human object mask neural network to generate a segmentation mask such as segmentation mask 624 shown in FIG. 6.

As further illustrated in FIG. 6, the search-based editing system 106 receives the segmentation masks 624 and 626 as output from the object segmentation machine learning model 610.

The search-based editing system 106 also detects the objects shown in the digital image 616 on the client device 630 via the collective network, i.e., the detection-masking neural network 600, in the same manner outlined above. For example, the search-based editing system 106 via the detection-masking neural network 600 detects the woman, the man, and the bird within the digital image 616. In particular, the search-based editing system 106 via the detection heads 604 utilizes the feature pyramids and feature maps to identify objects within the digital image 616 and based on user input 612 generates segmentation masks via the masking head 606.

Furthermore, in one or more implementations, although FIG. 6 illustrates generating segmentation masks based on the user input 612, the search-based editing system 106 generates segmentation masks without user input 612. In particular, the search-based editing system 106 generates segmentation masks for all detected objects within the digital image 616. To illustrate, despite not receiving user input 612, the search-based editing system 106 generates a segmentation mask for the woman, the man, and the bird.

Figure 7A:
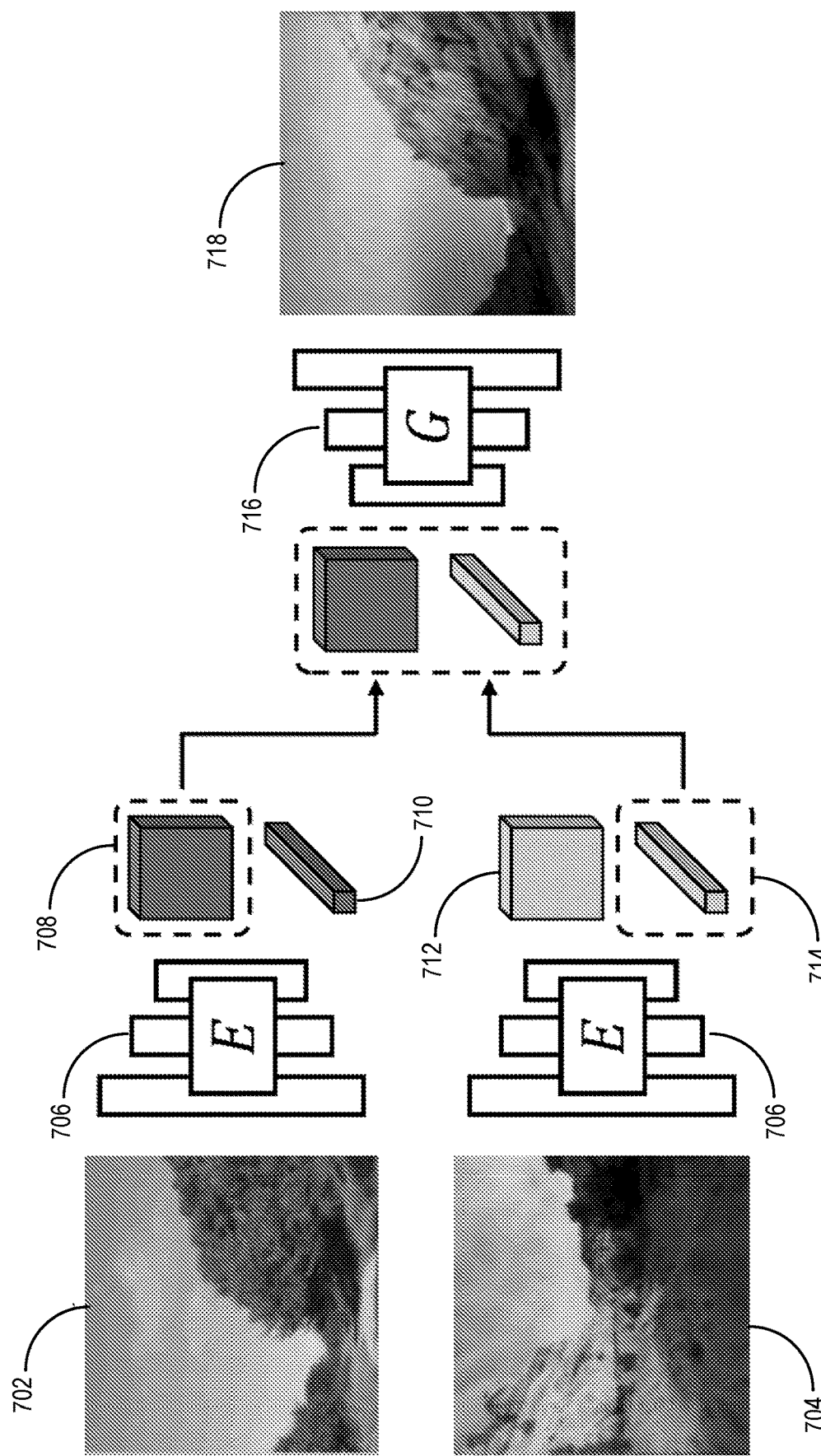
FIG. 7A illustrates the search-based editing system performing a texture transfer operation using a neural network in accordance with one or more embodiments.

FIG. 7A illustrates the search-based editing system 106 performing a texture transfer operation using a neural network in accordance with one or more embodiments. In one or more embodiments, the search-based editing system 106 performs the texture transfer operation by extracting a spatial code and a global code from a digital image (e.g., an input digital image) utilizing an encoder neural network of a global and spatial autoencoder. In addition, the search-based editing system 106 generates a spatial code and a global code from an additional digital image (e.g., a reference image). Further, the search-based editing system 106 generates a modified input digital image by combining or otherwise manipulating latent codes in particular ways. For instance, in some cases, the search-based editing system 106 utilizes a generator neural network to combine a spatial code (e.g., a spatial code from a first digital image) with a global code (e.g., a global code from a second digital image). Thus, the search-based editing system 106 can generate a modified input digital image that depicts the style of a reference image with the geometric layout of an input digital image.

In one or more embodiments, a spatial feature includes a feature corresponding to the geometric layout of a digital image. The search-based editing system 106 can extract spatial features from a digital image to represent the geometric layout of the digital image—i.e., the spatial structure, the relative positioning, and/or the arrangement of various objects or portions of the digital image. Indeed, the search-based editing system 106 can extract a spatial code that includes multiple spatial features and that describes the geometric layout of a digital image as a whole. In some cases, a spatial code includes a vector or a tensor of latent features that, though not necessarily discernable by a human observer, are interpretable by the global and spatial autoencoder to describe the geometric layout of a digital image.

Along similar lines, in one or more embodiments, a global feature includes a feature corresponding to overall image properties or an overall appearance of a digital image. To elaborate, in some instances, a global feature includes an aesthetic of a digital image including a texture, a style, an illumination, a color scheme, a shading, and/or a perspective of a digital image. Indeed, the search-based editing system 106 can extract a global code that includes multiple global features and that describes the overall image properties or the overall appearance of a digital image as a whole. In some implementations, a global code includes a vector or a tensor of latent features that are not necessarily discernable by a human observer, but that are interpretable by the global and spatial autoencoder to describe the overall appearance of a digital image.

Indeed, FIG. 7A illustrates extracting spatial codes and global codes and generating a modified input digital image 718 in accordance with one or more embodiments. As illustrated in FIG. 7A, the search-based editing system 106 utilizes a global and spatial autoencoder that includes the encoder neural network 706 and the generator neural network 716 to generate the modified input digital image 718 from the input digital image 702 and the reference image 704. In particular, the search-based editing system 106 utilizes the encoder neural network 706 to extract a spatial code 708 and a global code 710 from the input digital image 702. Indeed, the search-based editing system 106 applies the encoder neural network 706 to the input digital image 702 to generate spatial features for the spatial code 708 and global features for the global code 710.

In a similar fashion, the search-based editing system 106 utilizes the encoder neural network 706 to extract the spatial code 712 and the global code 714 from the reference image 704. More specifically, the search-based editing system 106 extracts spatial features from the reference image 704 for the spatial code 712. In addition, the search-based editing system 106 extracts global features from the reference image 704 for the global code 714.

As shown in FIG. 7A, the search-based editing system 106 can utilize the same encoder neural network (e.g., the encoder neural network 706) to extract the global and spatial codes from each of the input digital image 702 and the reference image 704. In some embodiments, the search-based editing system 106 utilizes two separate encoders: a spatial encoder neural network to extract the spatial code 708 (and the spatial code 712) and a global encoder neural network to extract the global code 710 (and the global code 714).

In addition to extracting spatial codes and global codes, the search-based editing system 106 generates the modified input digital image 718 by combining or otherwise modifying latent codes (e.g., the spatial and/or global code). For example, the search-based editing system 106 selects an extracted spatial code from one digital image (e.g., the input digital image 702) and an extracted global code from another digital image (e.g., the reference image 704) to combine together. Indeed, the search-based editing system 106 utilizes the generator neural network 716 to combine a first spatial code (e.g., the spatial code 708 from the input digital image 702) with a second global code (e.g., the global code 714 from the reference image 704) to generate the modified input digital image 718.

As a result of utilizing the first spatial code (e.g., the spatial code 708) and the second global code (e.g., the global code 714), the modified input digital image 718 includes the geometric layout of the input digital image 702 with the overall appearance of the reference image 704. Indeed, as shown in FIG. 7A, the modified input digital image 718 portrays a desert cliff scene with the shading and color scheme (with lots of tan and brown colors) of the reference image 704 (from the global code 714) that also illustrates desert cliffs with a large shaded area. In addition, the modified input digital image 718 has the shape or layout of the input digital image 702 (from the spatial code 708) that depicts a large round-shaped tree on the right side with smaller shrubbery on the left, tapering toward the middle of the image. Indeed, as shown, the modified input digital image 718 has the same layout as the input digital image 702 with the rounded shape for the cliffs on the right and the smaller, tapering cliffs to the left.

Figure 7B:
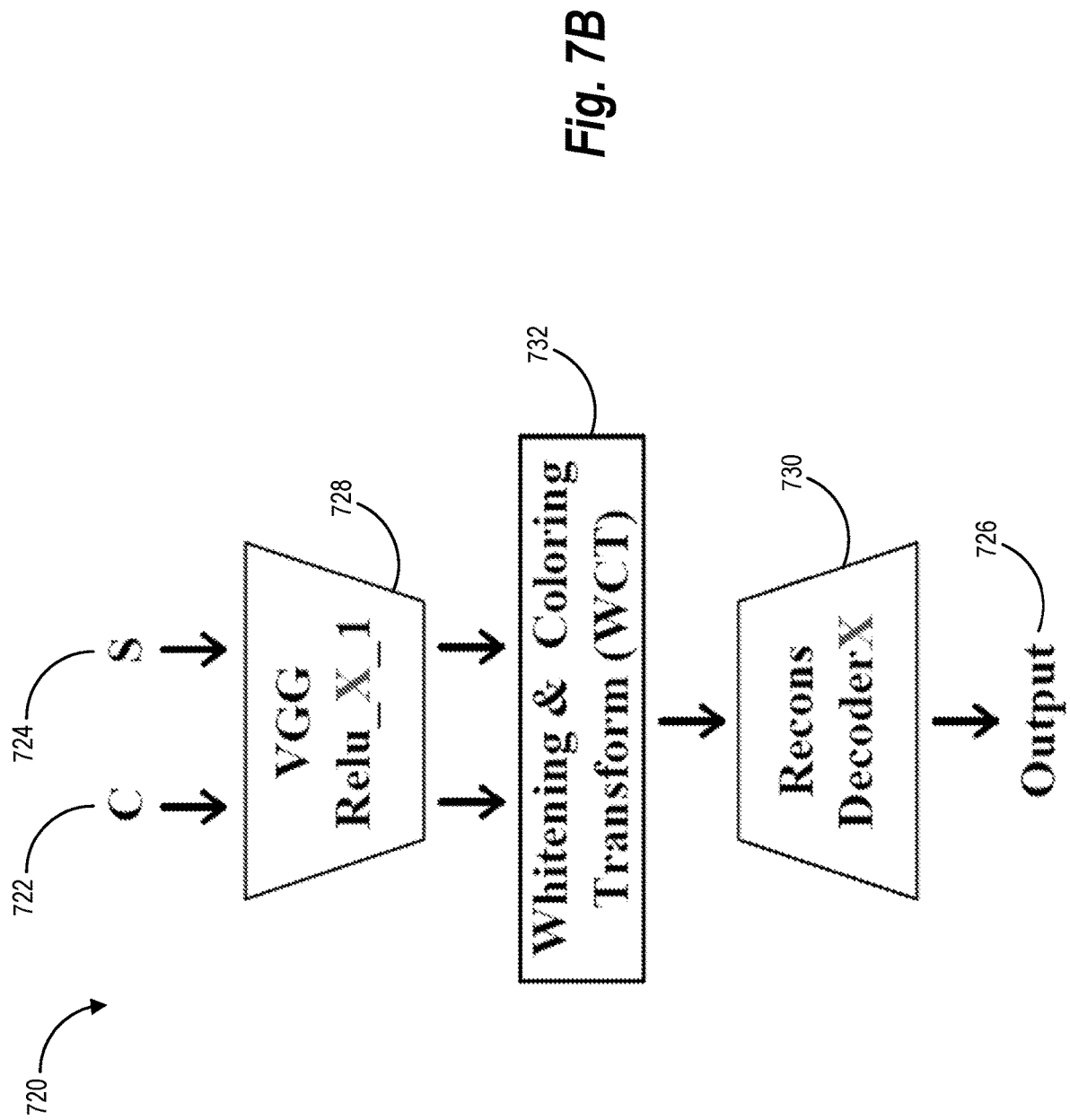
FIG. 7B illustrates the search-based editing system performing a whitening and coloring transformation color transfer operation using a neural network in accordance with one or more embodiments.

FIG. 7B illustrates the search-based editing system 106 performing a WCT color transfer operation using a neural network in accordance with one or more embodiments. As shown in FIG. 7B, the search-based editing system 106 provides a content image 722 (e.g., an input digital image) and a style image 724 (e.g., a reference image) to a neural network 720 to generate an output 726 (e.g., a modified digital image). As indicated in FIG. 7B, in one or more embodiments, the neural network 720 includes an encoder 728. In particular, as shown, in one or more embodiments, the neural network 720 includes a visual geometry group (VGG) neural network, such as a VGG-19 network, as the encoder 728. As further shown in FIG. 7B, the neural network 720 includes a decoder 730. In one or more embodiments, the decoder 730 includes a symmetric decoder that inverts the features of the encoder 728 (e.g., the VGG-19 features) and output the modified digital image.

In one or more embodiments, to perform the WCT color transfer operation, the search-based editing system 106 applies WCT to one layer of content features (shown in box 732) such that its covariance matrix matches that of the corresponding style features. The search-based editing system 106 feeds the transformed features forward into the downstream decoder layers to obtain the modified digital image.

In particular, given a content image 722 and a style image 724, the search-based editing system 106 extracts vectorized VGG feature maps at a certain layer (e.g., Relu_4_1). The search-based editing system 106 then uses a whitening and coloring transform to adjust VGG feature maps for the content image 722 with respect to the statistic of the VGG feature maps for the style image 724. In particular, the search-based editing system 106 utilizes the whitening and coloring transform to transform the VGG feature maps for the content image 722 to match the covariance matrix of the VGG feature maps for the style image 724.

Specifically, the search-based editing system 106 applies a whitening transform and a coloring transform. To perform the whitening transform, the search-based editing system 106 centers VGG feature maps $f_c$ for the content image 722 by subtracting its mean vector $m_c$. The search-based editing system 106 then linearly transforms $f_c$ to generate $\hat{f}_c$ such that the feature maps are uncorrelated according to the algorithm:

$$\hat{f}_c = E_c D_c^{-\frac{1}{2}} E_c^\top f_c$$

where $D_c$ is a diagonal matrix with the eigenvalues of the covariance matrix $f_c f_c^T \in \mathbb{R}^{C \times C}$, and $E_c$ is the corresponding orthogonal matrix of eigenvectors satisfying $f_c f_c^T = E_c D_c E_c^T$.

To perform the coloring transform, the search-based editing system 106 centers VGG feature maps $f_s$ for the content image 724 by subtracting its mean vector $m_s$ and performs a coloring transform that is an inverse of the whitening step to transform $\hat{f}_c$ to obtain $\hat{f}_{cs}$ which has the desired correlations between its feature maps utilizing the algorithm below:

$$\hat{f}_{cs} = E_s D_s^{\frac{1}{2}} E_s^\top \hat{f}_c$$

where $D_s$ is a diagonal matrix with the eigenvalues of the covariance matrix $f_s f_s^T \in \mathbb{R}^{C \times C}$, and $E_s$ is the corresponding orthogonal matrix of eigenvectors. The search-based editing system 106 then re-centers the $\hat{f}_{cs}$ with the mean vector $m_s$ of the style.

After performing the WCT, the search-based editing system 106 may blend $\hat{f}_{cs}$ with the content vector $f_c$ before feeding it to the decoder in order to provide user controls on the strength of the stylization effects.

Figure 8A:
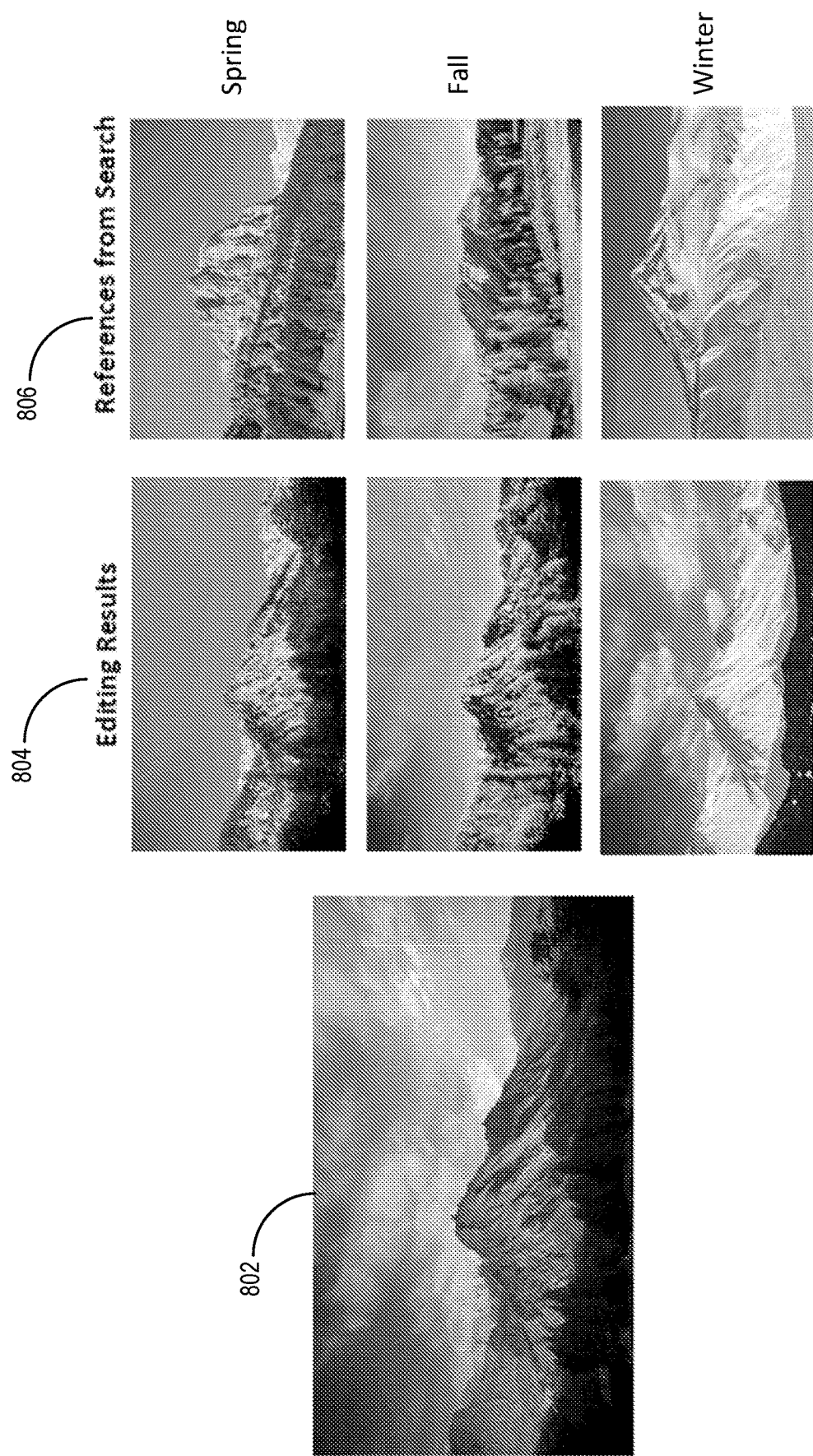
FIGS. 8A-8C illustrate graphical representations reflecting the search-based editing system using image search results to modify an input digital image in accordance with one or more embodiments.
Figure 8B:
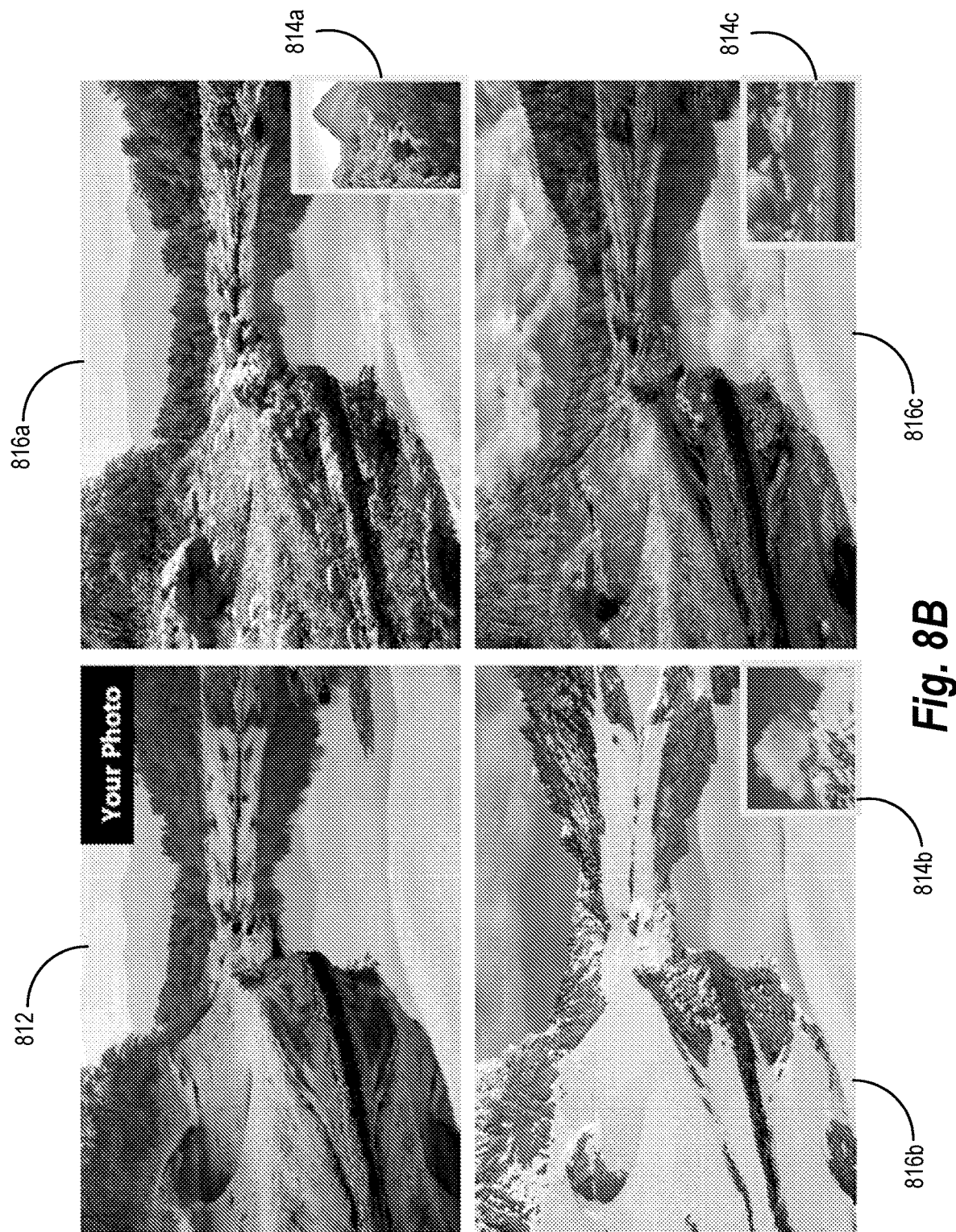
Figure 8C:
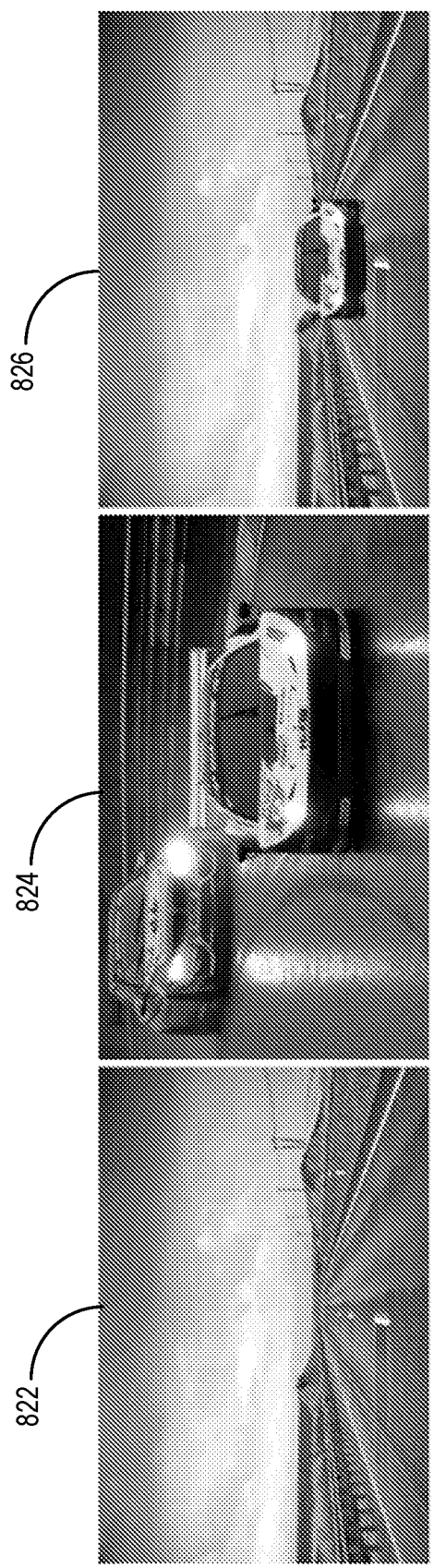

FIGS. 8A-8C illustrate graphical representations reflecting the search-based editing system 106 using image search results to modify an input digital image in accordance with one or more embodiments. In particular, FIG. 8A illustrates an input digital image 802, reference images 806 selected from image search results, and modified input digital images 804 resulting from a texture transfer operation using the reference images 806. Similarly, FIG. 8B illustrates an input digital image 812, reference images 814a-814c selected from image search results, and modified input digital images 816a-816c resulting from a texture transfer operation. Indeed, as shown in FIGS. 8A-8B, the search-based editing system 106 can successfully use image search results to modify an input digital mage via texture transfer (as well as other editing operations).

FIG. 8C illustrates an input digital image 822 and a reference image 824 selected from image search results. In particular, the input digital image 822 portrays a background scene and the reference image 824 portrays multiple foreground objects. As shown in FIG. 8C, the search-based editing system 106 generates a composite image 826 by combining one of the foreground objects from the reference image 824 with the background of the input digital image 822 (e.g., by inserting the foreground object into the input digital image 822). In one or more embodiments, the search-based editing system 106 extracts the foreground object from the reference image 824 utilizing a segmentation mask generated via a segmentation operation and combines the foreground object with the input digital image 822 utilizing a compositing operation.

As previously mentioned, in one or more embodiments, the search-based editing system 106 utilizes an embedding-based search engine to perform an image search. In particular, in one or more embodiments, the search-based editing system 106 utilizes an embedding-based search engine as the text search engine 114 and/or the image search engine 116 discussed above. For instance, in some cases, the search-based editing system 106 utilizes an embedding-based search engine to generate one or more input embeddings from received search input (e.g., where an input embedding includes an embedding that corresponds to a particular query, a component of a query, or other component of search input) and conduct the image search utilizing the input embedding(s).

In some embodiments, the search-based editing system 106 utilizes the embedding-based search engine to conduct an image search after receiving multi-modal search input. In one or more embodiments, multi-modal search input includes search input having multiple components (e.g., multiple queries or query components) where at least two of the components are of a different input modal (e.g., a different type or class of search input). For instance, in some cases, a multi-modal search input includes search input having a text query and an image query. As another example, in some implementations, a multi-modal search input includes a sketch query having multiple component inputs, such as a sketch input, a brush input, a text input, and/or an image input.

In some cases, the search-based editing system 106 utilizes an embedding-based search engine to generate a single input embedding that represents a multi-modal search input. In some cases, however, the search-based editing system 106 generates separate input embeddings for the separate components within a common embedding space. In one or more embodiments, a common embedding space includes a shared embedding space for input embeddings of different modals. In particular, in some embodiments, a common embedding space includes an embedding space for input embeddings that correspond to search input (e.g., queries) of different modals. For instance, as will be discussed below, the search-based editing system 106 generates text embeddings for text queries and image embeddings for image queries within a text-image embedding space in some cases. In some implementations, a common embedding space (as well as other embeddings discussed herein) further includes embeddings representing the digital images considered during the image search.

Figure 9:
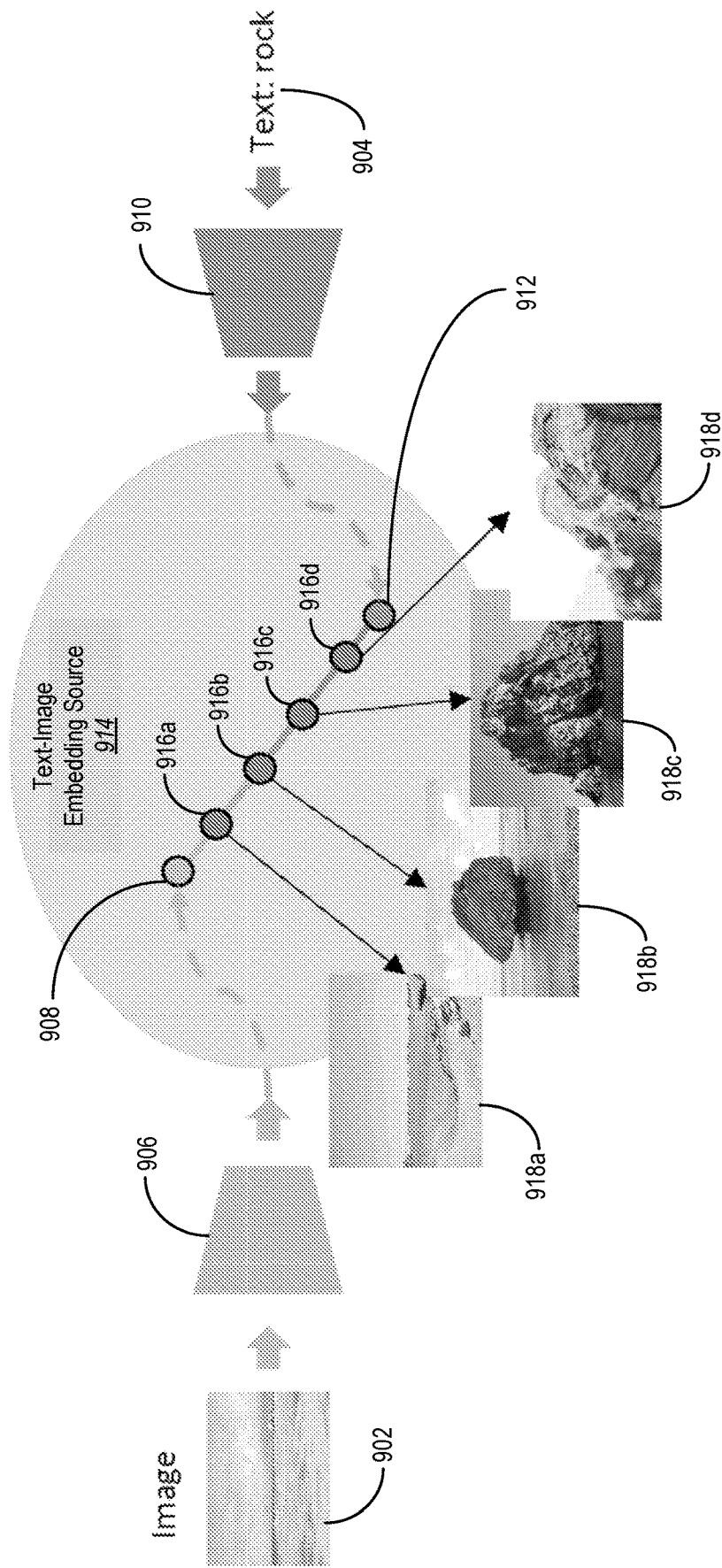
FIG. 9 illustrates a diagram for utilizing an embedding-based search engine to conduct an image search using a multi-modal search input that includes a text query and an image query in accordance with one or more embodiments.
Figure 10A:
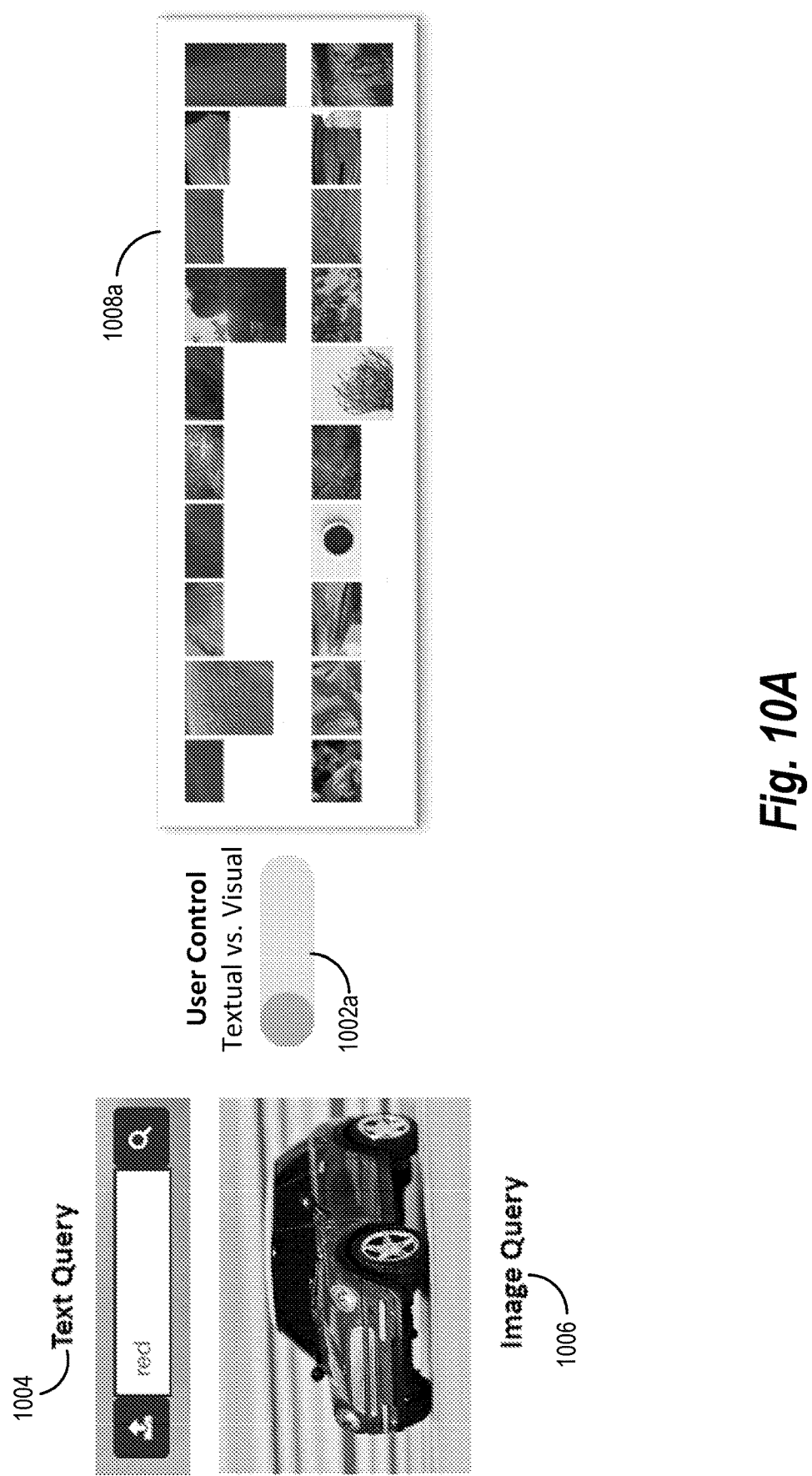
FIGS. 10A-10E each illustrate image search results retrieved in response to weighted combinations of a text query and an image query in accordance with one or more embodiments.
Figure 10B:
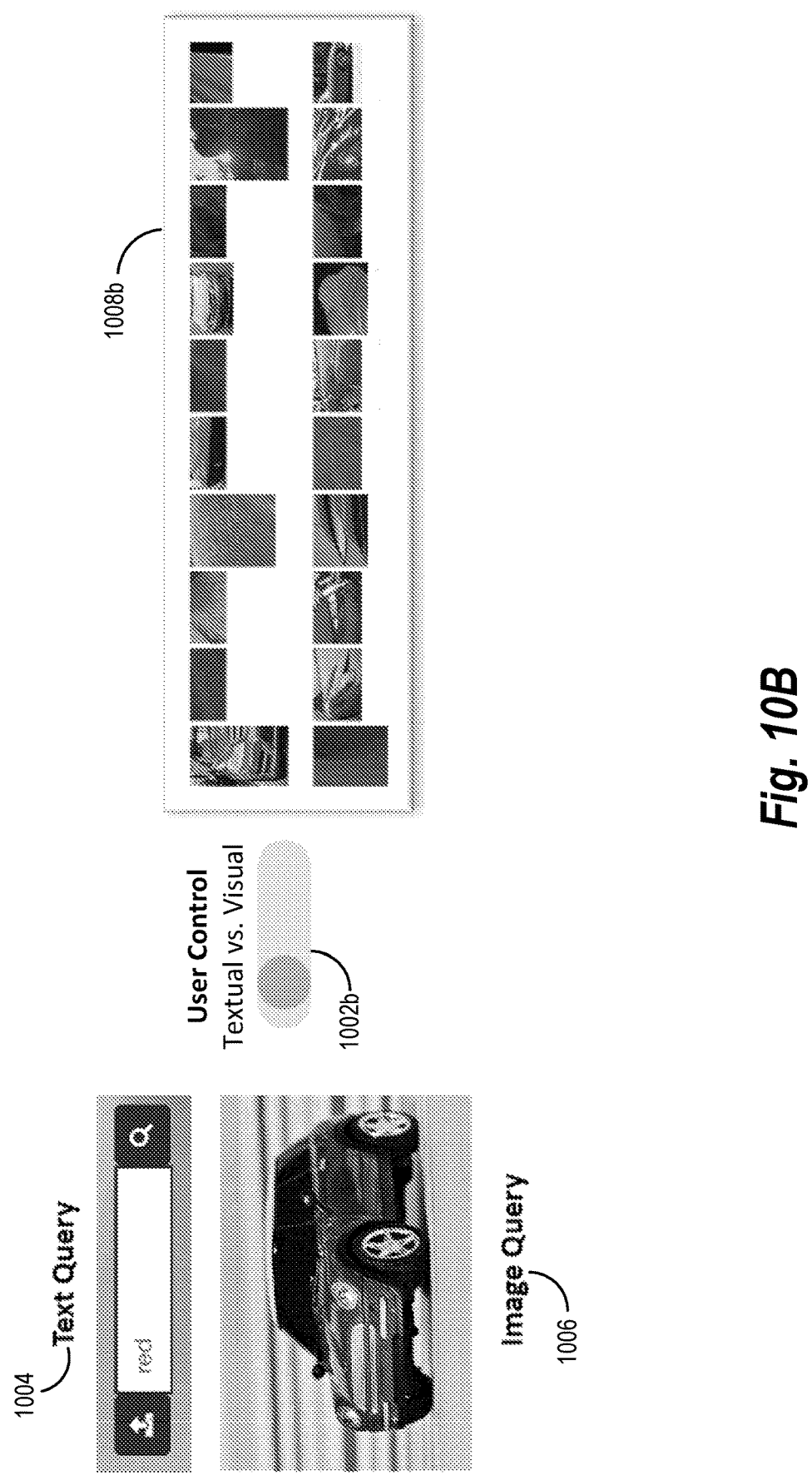
Figure 10C:
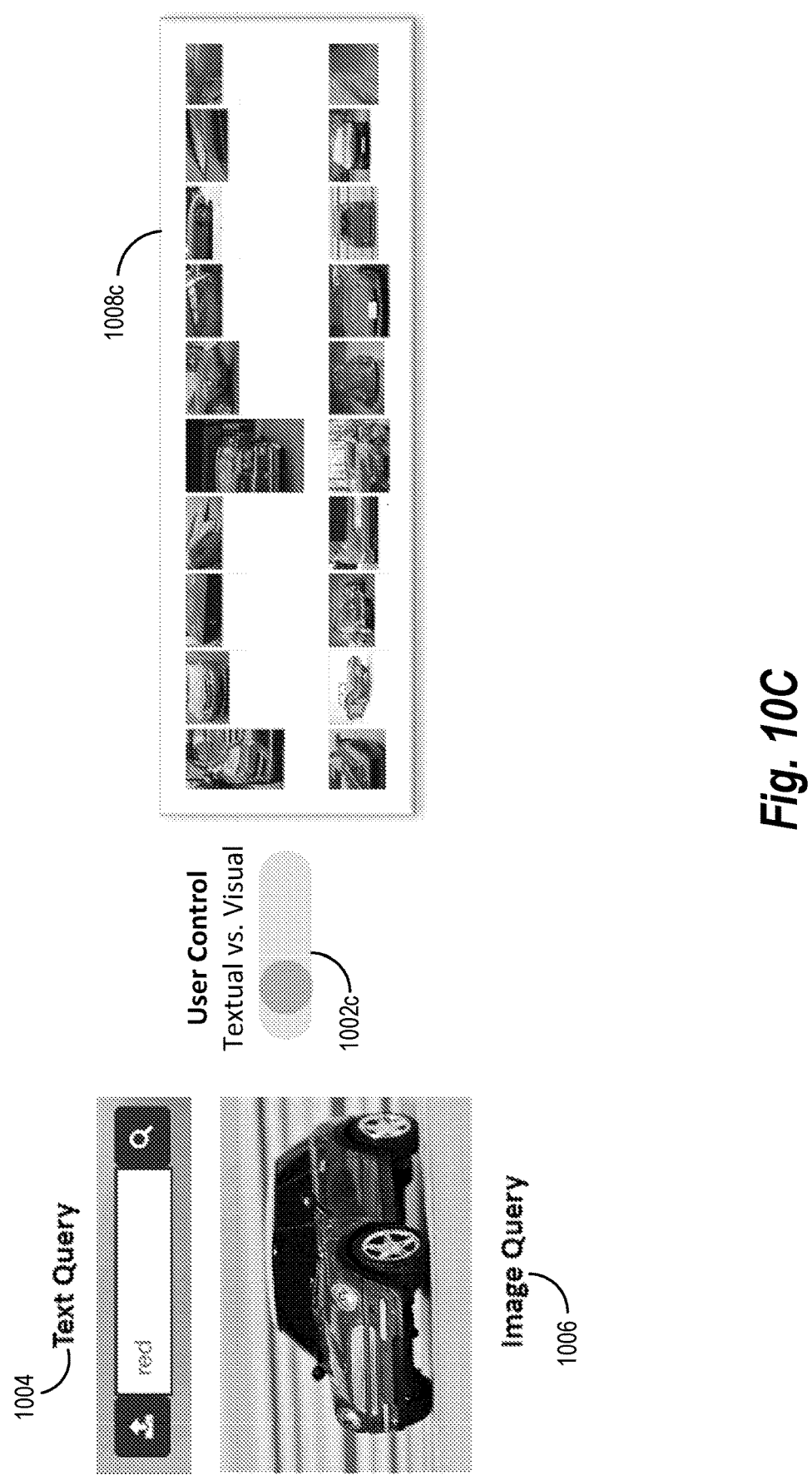
Figure 10D:
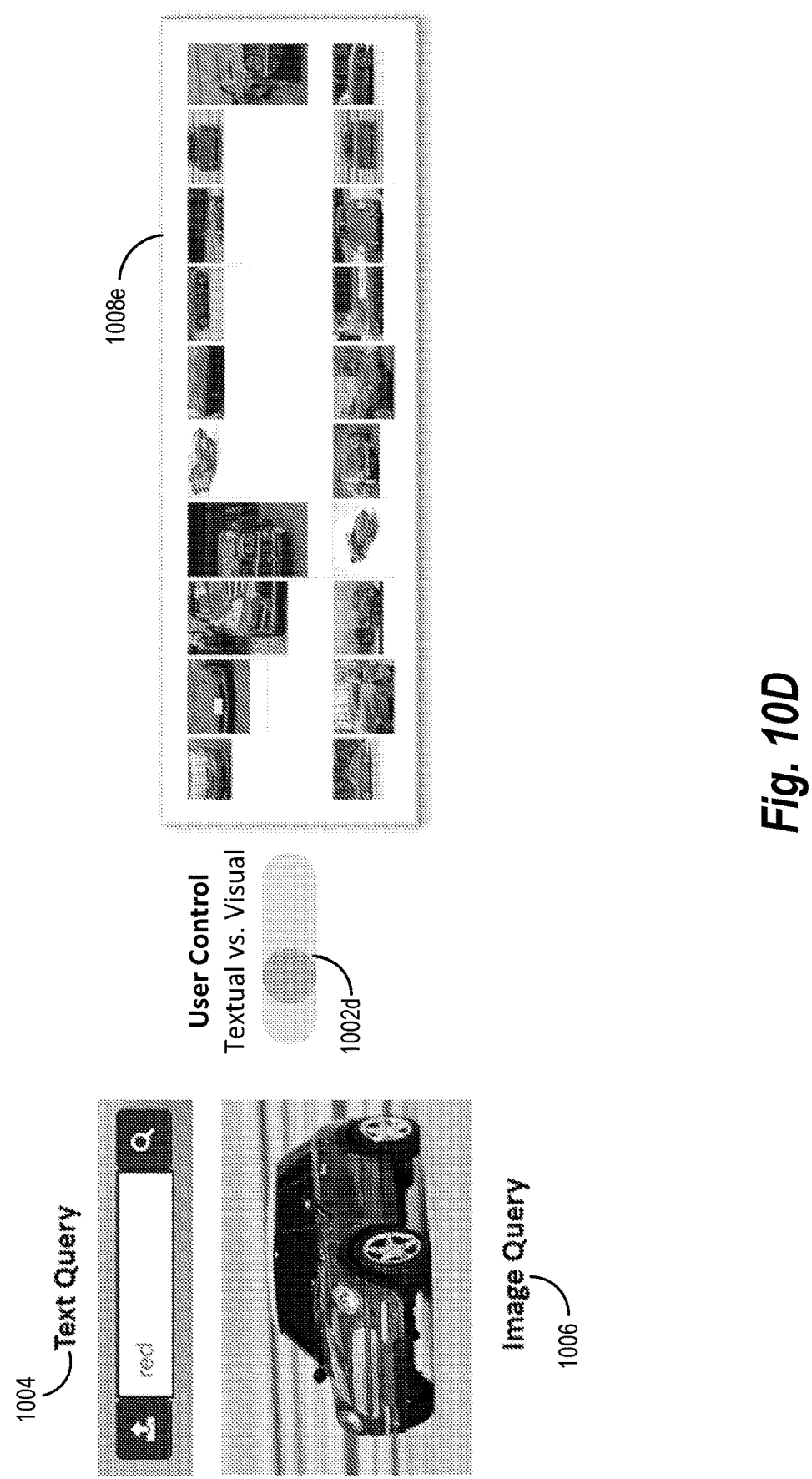
Figure 10E:
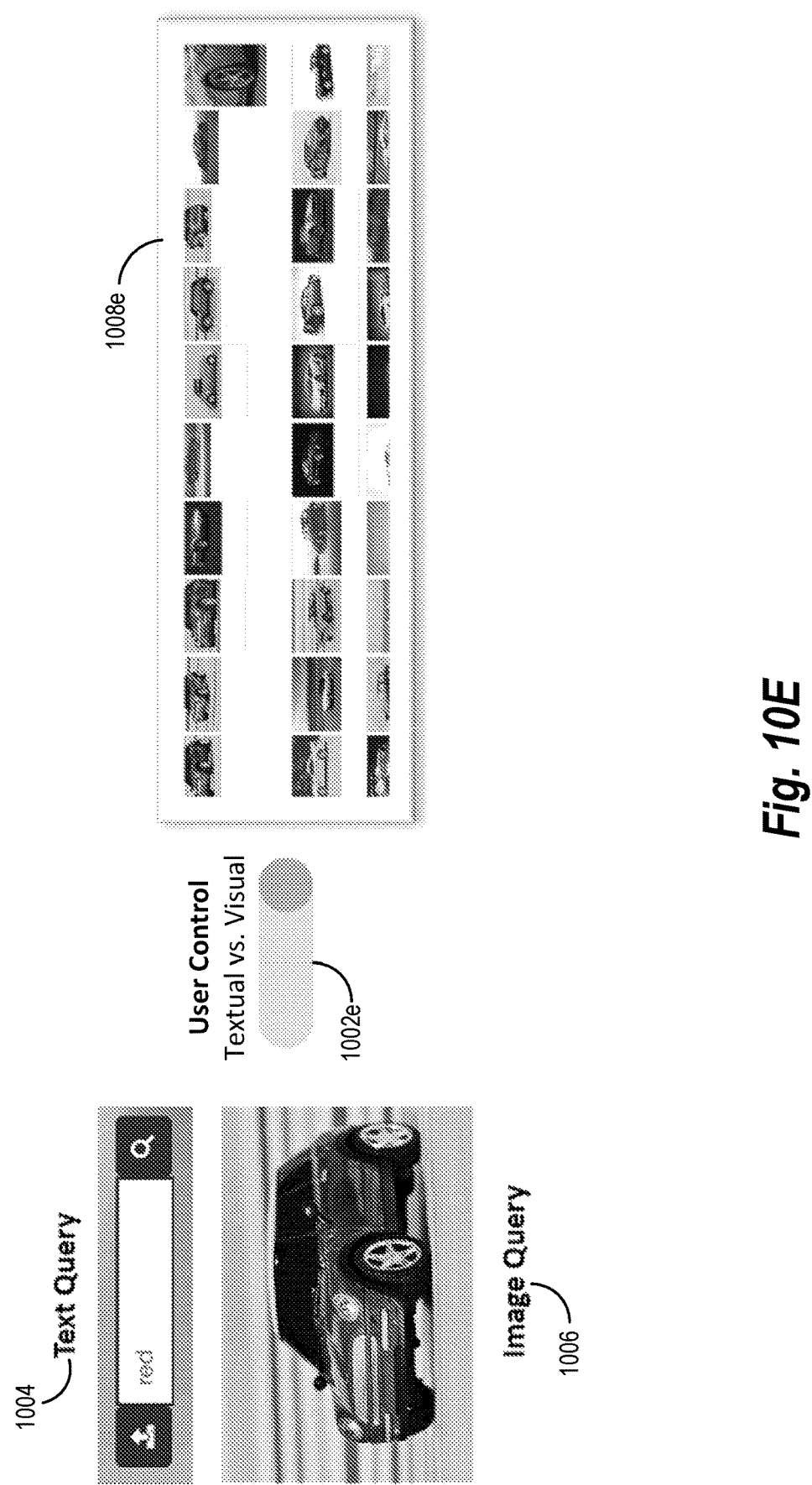

FIGS. 9-10 illustrate diagrams for utilizing an embedding-based search engine to conduct an image search using a multi-modal search input that includes a text query and an image query in accordance with one or more embodiments.

Indeed, as shown in FIG. 9, the search-based editing system 106 receives an image query 902 and a text query 904 (e.g., from a client device). In one or more embodiments, the image query 902 and/or the text query 904 reflect one or more image elements to incorporate within the image search results. For example, in some cases the image query 902 and/or the text query 904 reflect image characteristics, semantic elements, and/or layout elements to incorporate within the image search results. In some cases, the search-based editing system 106 determines to retrieve image search results where each included digital image incorporates at least one of the reflected image elements.

As further shown, the search-based editing system 106 utilizes an image embedding model 906 to generate an image embedding 908 from the image query 902. The image embedding 908 represents one or more visual features from the image query 902 (e.g., image characteristics or other patent or latent features of the image query 902, such as semantic information and/or layout information). Similarly, the search-based editing system 106 utilizes a text embedding model 910 to generate a text embedding 912 from the text query 904. The text embedding 912 represents one or more textual features from the text query 904 (e.g., patent or latent features of the text query 904, such as semantic information and/or layout information represented by the language, words, or structure of the text query 904). In one or more embodiments, the search-based editing system 106 respectively utilizes, as the image embedding model 906 and the text embedding model 910, the image encoder and the text encoder described in U.S. patent application Ser. No. 17/652,390 filed on Feb. 24, 2022, entitled GENERATING ARTISTIC CONTENT FROM A TEXT PROMPT OR A STYLE IMAGE UTILIZING A NEURAL NETWORK MODEL, the contents of which are expressly incorporated herein by reference in their entirety.

As further shown in FIG. 9, the search-based editing system 106 generates the image embedding 908 and the text embedding 912 within a text-image embedding space 914. In one or more embodiments, a text-image embedding space includes a common embedding space for input embeddings that correspond to text queries and image queries (i.e., text embeddings and image embeddings, respectively). Accordingly, in some cases, the search-based editing system 106 positions the image embedding 908 and the text embedding 912 within the text-image embedding space 914 based on their respective image and text features.

Though not explicitly shown in FIG. 9, in some embodiments, the search-based editing system 106 further receives a combination weight (e.g., via a user interaction with the slider 310 discussed above with reference to FIG. 3). In one or more embodiments, a combination weight includes a weight to apply to at least one query when combining multiple queries. For instance, in some cases, a combination weight includes a weight applied to at least one of an image query or a text query when combining the queries. In one or more embodiments, the search-based editing system 106 provides, to a client device, a range of combination weights for combining the queries (e.g., via the slider 310). Thus, the search-based editing system 106 receives the combination weight that is selected from the range of combination weights.

Indeed, in one or more embodiments, the search-based editing system 106 determines a combination of the image query 902 and the text query 904. For instance, in some cases, the search-based editing system 106 determines a linear combination of the image query 902 and the text query 904. As suggested above, in some implementations, the search-based editing system 106 determines a weighted combination (e.g., a weighted linear combination) of the image query 902 and the text query 904. As at least one example, the search-based editing system 106 determines the weighted combination based on a received combination weight in some instances. In some implementations, however, the search-based editing system 106 utilizes a predetermined combination weight.

As shown in FIG. 9, in some embodiments, the search-based editing system 106 determines the weighted combination of the image query 902 and the text query 904 by determining a weighted combination of the image embedding 908 and the text embedding 912. For example, in some cases, the search-based editing system 106 linearly combines the image embedding 908 and the text embedding 912 using the weighted combination. The search-based editing system 106 further determines a position within the text-image embedding space 914 that corresponds to the weighted combination. For instance, FIG. 9 illustrates multiple weighted combinations 916a-916d within the text-image embedding space 914 that correspond to multiple combination weights of the image embedding 908 and the text embedding 912.

To illustrate, the weighted combinations 916a-916d shown in FIG. 9 each include a combination of the visual features of the image query 902 and the textual features of the text query 904. The positions of the weighted combinations 916a-916b being closer to the image embedding 908 than the text embedding 912 indicate that they place higher emphasis on the visual features of the image query 902. In other words, the positions of the weighted combinations 916a-916b indicate that the search-based editing system 106 weighed the image query 902 higher than the text query 904. Similarly, the positions of the weighted combinations 916c-916d being closer to the text embedding 912 than the image embedding 908 indicate that they place higher emphasis on the textual features of the text query 904. In other words, the positions of the weighted combinations 916c-916d indicate that the search-based editing system 106 weighed the text query 904 higher than the image query 902.

As further shown in FIG. 9, the search-based editing system 106 retrieves a digital image using the weighted combination of the image query 902 and the text query 904. In particular, the search-based editing system 106 illustrates the digital images 918a-918d retrieved using the weighted combinations 916a-916d, respectively.

In one or more embodiments, the search-based editing system 106 retrieves a digital image (e.g., for provision to the client device that submitted the image query 902 and the text query 904) based on a proximity of the digital image to the location of the weighted combination within the text-image embedding space 914. For instance, in some cases, the search-based editing system 106 retrieves the digital image 918a rather than the digital image 918d when using the weighted combination 916a upon determining that the embedding for the digital image 918a is closer to the location of the weighted combination 916a.

In some implementations, the search-based editing system 106 determines that a digital image has a higher similarity to a weighted combination if its embedding is closer to the weighted combination when compared to another embedding of another digital image. In other words, the search-based editing system 106 determines that the image elements of the digital image are more similar to the combination of visual and textual features represented by the weighted combination. Accordingly, where a weighted combination represents a higher emphasis on the image query 902 (or text query 904), the search-based editing system 106 determines that digital images having relatively closer embeddings to the weighted combination have a higher similarity to the image query 902 (or text query 904).

In some cases, the search-based editing system 106 retrieves a plurality of digital images in response to the image query 902 and the text query 904. For instance, in some cases, the search-based editing system 106 determines to retrieve a specific number of digital images (e.g., as indicated by the box 316 discussed above with reference to FIG. 3). Accordingly, the search-based editing system 106 can retrieve that number of digital images based on their proximities to the weighted combination within the text-image embedding space 914. In some cases, the search-based editing system 106 retrieves all digital images having embeddings that are within a threshold distance of the weighted combination within the text-image embedding space 914.

FIGS. 10A-10E each illustrate graphical representations reflecting the effectiveness of the search-based editing system 106 in using weighted combinations of a text query 1004 and an image query 1006 to retrieve digital images in accordance with one or more embodiments. Discussing FIGS. 10A-10E together, the search-based editing system 106 retrieves image search results 1008a-1008e using weighted combinations determined based on received combination weights 1002a-1002e, respectively.

As shown in FIGS. 10A-10E, the combination weights 1002a-1002e correspond to different emphases on the text query 1004 and the image query 1006. As such, the image search results 1008a-1008e each include different digital images in accordance with the used combination weight. For instance, based on the combination weight 1002a, the search-based editing system 106 determines a combination that excludes the image query 1006. Accordingly, the search-based editing system 106 utilizes the combination (e.g., uses the text query 1004) to retrieve image search results 1008a having digital images that correspond strongly to the text query 1004. Similarly, based on the combination weight 1002e, the search-based editing system 106 determines a combination that excludes the text query 1004. Accordingly, the search-based editing system 106 utilizes the combination (e.g., uses the image query 1006) to retrieve image search results 1008e having digital images that correspond strongly to the image query 1006.

By using weighted combinations of image queries and text queries to retrieve image search results, the search-based editing system 106 provides more flexibility when compared to conventional search engines. Indeed, the search-based editing system 106 can flexibly combine multiple queries in various ways other than the learned joint embeddings typically relied on by conventional systems. Further, by providing an interactive element withing a graphical user interface to enable user selection of a combination weight, the search-based editing system 106 provides more flexible control over how the queries are combined.

As previously mentioned, in some implementations, a multi-modal search input includes a sketch query having multiple component inputs of various input modals, such as a sketch input, a brush input, a text input, and/or an image input. FIGS. 11A-15 illustrate diagrams of the search-based editing system 106 utilizing a sketch query to retrieve image search results in accordance with one or more embodiments.

In some cases, the search-based editing system 106 receives a multi-modal search input by receiving a canvas that includes one or more sketch query components. In one or more embodiments, a canvas includes a digital element that encompasses a sketch query. In particular, in some embodiments, a canvas includes a graphical user interface element upon which sketch query components can be added or positioned. In some cases, a canvas includes a blank canvas upon which one or more sketch query components can be added. In some implementations, however, a canvas includes a digital image or a portion of a digital image. Indeed, in some cases, the canvas itself is part of the sketch query.

Figure 11A:
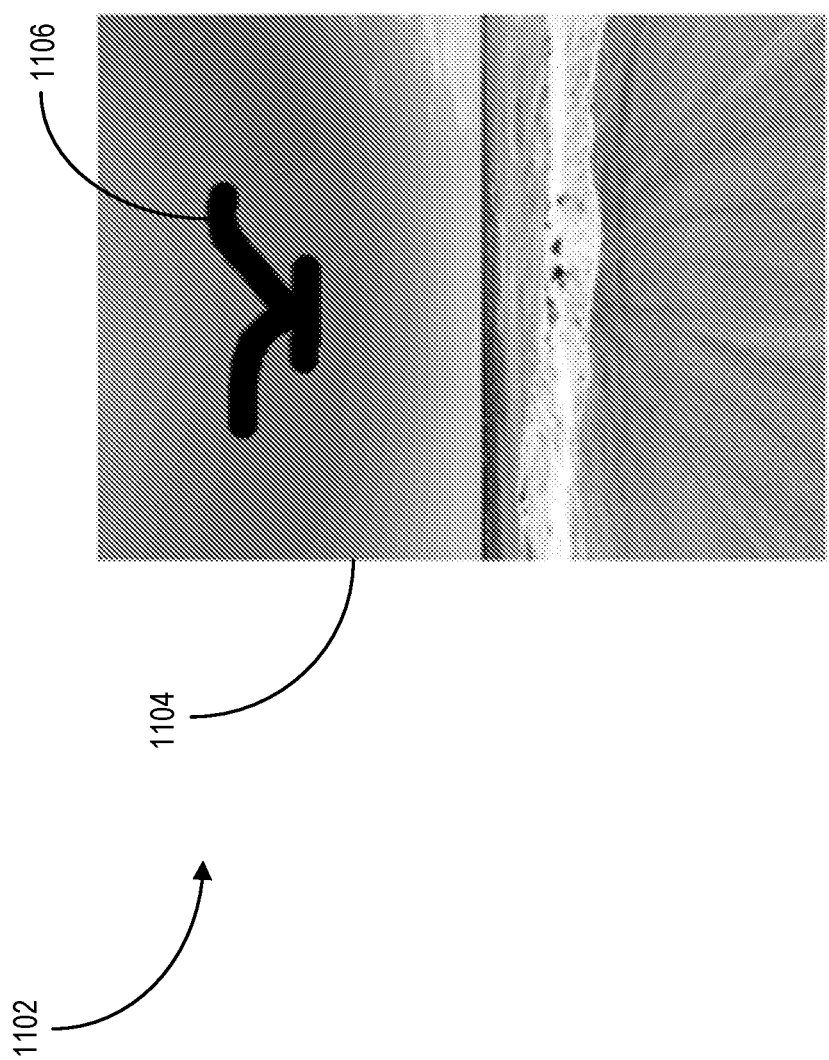
FIGS. 11A-11B illustrate sketch queries having multiple inputs of various input modals in accordance with one or more embodiments.
Figure 11B:
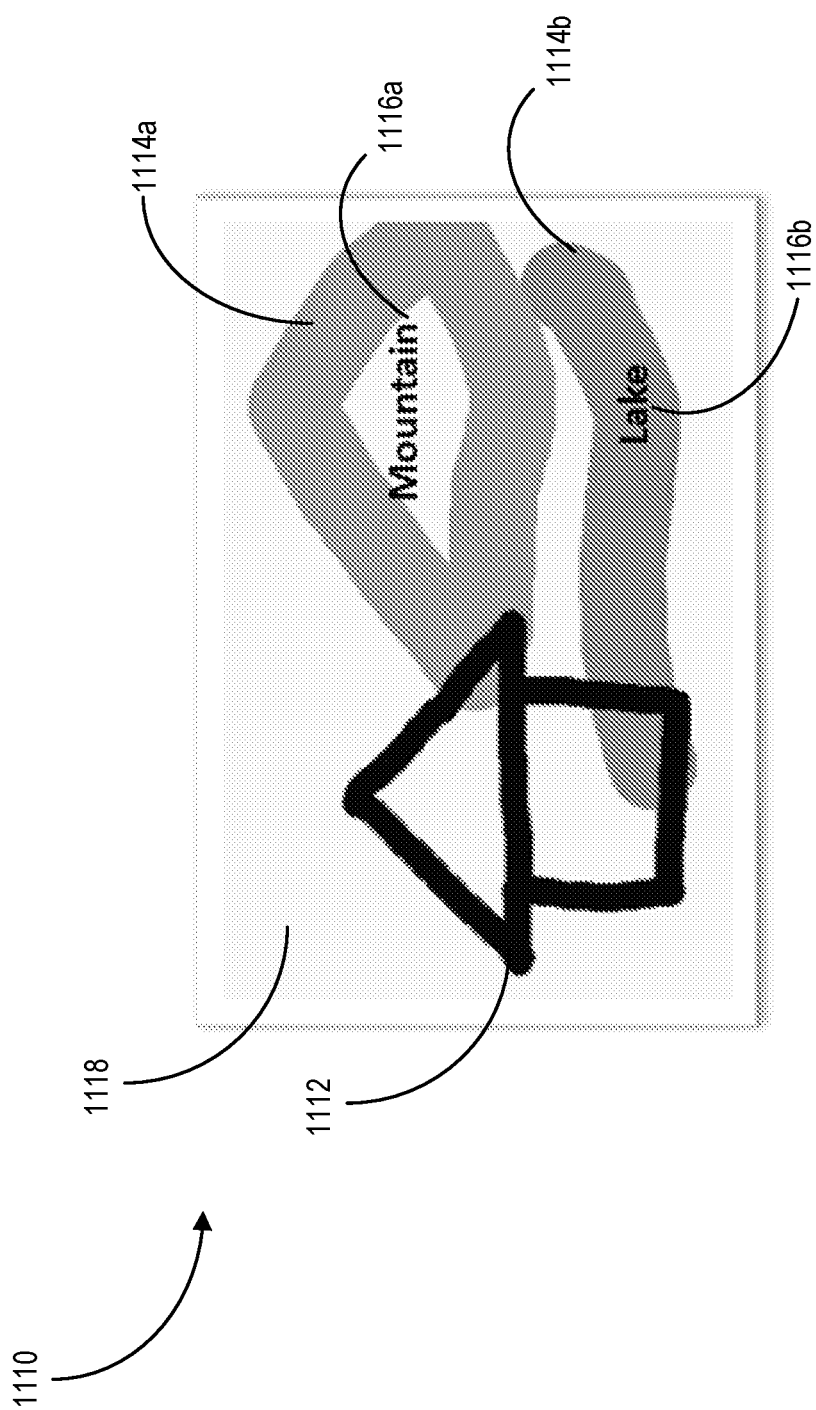

FIGS. 11A-11B illustrate sketch queries having multiple inputs of various input modals in accordance with one or more embodiments. FIG. 11A illustrates a sketch query 1102 that includes an image input 1104 and a sketch input 1106 positioned on the image input 1104. Indeed, as indicated by FIG. 11A, the image input 1104 is used as a canvas. In some cases, the image input 1104 corresponds to an input digital image that is to be modified. In some instances, however, the image input 1104 includes another digital image. In one or more embodiments, the search-based editing system 106 enables other inputs to be positioned on the image input 1104 in response to user input (e.g., a user interaction with the switch 312 discussed above with reference to FIG. 3). For instance, in some cases, the search-based editing system 106 receives the image input 1104 and receives additional user input that enables input of a sketch query. Accordingly, the search-based editing system 106 provides one or more selectable options (e.g., tools) for creating one or more other inputs positioned on the image input 1104 as part of the sketch query.

FIG. 11B illustrates a sketch query 1110 that includes a sketch input 1112, brush inputs 1114a-1114b, and text inputs 1116a-1116b positioned on a blank canvas 1118. Indeed, in some embodiments, the search-based editing system 106 provides a blank canvas for display on a graphical user interface (e.g., in response to a user interaction with the switch 312). The search-based editing system 106 further provides selectable options for creating one or more inputs positioned on the blank canvas. The search-based editing system 106 receives one or more user interactions with the blank canvas via the selectable options, the user interactions providing drawn or other inputs onto the blank canvas. Accordingly, in some cases, the search-based editing system 106 receives a sketch query by receiving a canvas (e.g., a blank canvas or an image input) with one or more drawn or other inputs positioned on the canvas.

As shown in FIGS. 11A-11B, a sketch query can include various types of visual input (e.g., sketch input, brush input, and/or image input) as well as other input (e.g., text input). Further, though FIGS. 11A-11B show particular combinations of inputs for a sketch query, various other combinations are possible. Indeed, the search-based editing system 106 receives various combinations of sketch input, brush input, text input, and/or image input as part of a sketch query in various embodiments. Further, though not explicitly shown in FIGS. 11A-11B, the search-based editing system 106 can receive a cropped region of a digital image as part of a sketch query (e.g., whether placed on a blank canvas or on another digital image).

In one or more embodiments, the search-based editing system 106 determines semantic information and/or layout information from the components of a sketch query. In one or more embodiments, semantic information includes information indicating the semantics of a digital image. In particular, in some embodiments, semantic information includes information regarding the objects and/or scenery portrayed in a digital image. For instance, in some cases, semantic information includes information regarding the types of objects display in a digital image and/or attributes of those objects (e.g., color). In one or more embodiments, layout information includes information regarding the layout or other related attributes of a digital image. For instance, in some cases, layout information (also referred to as spatial information) includes shape information, relative scale information, location information (e.g., positioning of an object within the canvas or positioning of an object relative to another object), geometry information, or lighting information.

To illustrate, in some cases, the search-based editing system 106 determines semantic and layout information from sketch input and/or image input (e.g., a digital image or a cropped region of a digital image). In some embodiments, the search-based editing system 106 further determines layout information from brush input and semantic information from text input. As an example, in some cases, the search-based editing system 106 determines semantic and spatial features from the sketch input 1112 of the sketch query 1110, such as shape, scale, and location. The search-based editing system 106 further determines shape and location from the brush inputs 1114a-1114b and semantic information from the text inputs 1116a-1116b submitted in association with the brush inputs 1114a-1114b.

Figure 12A:
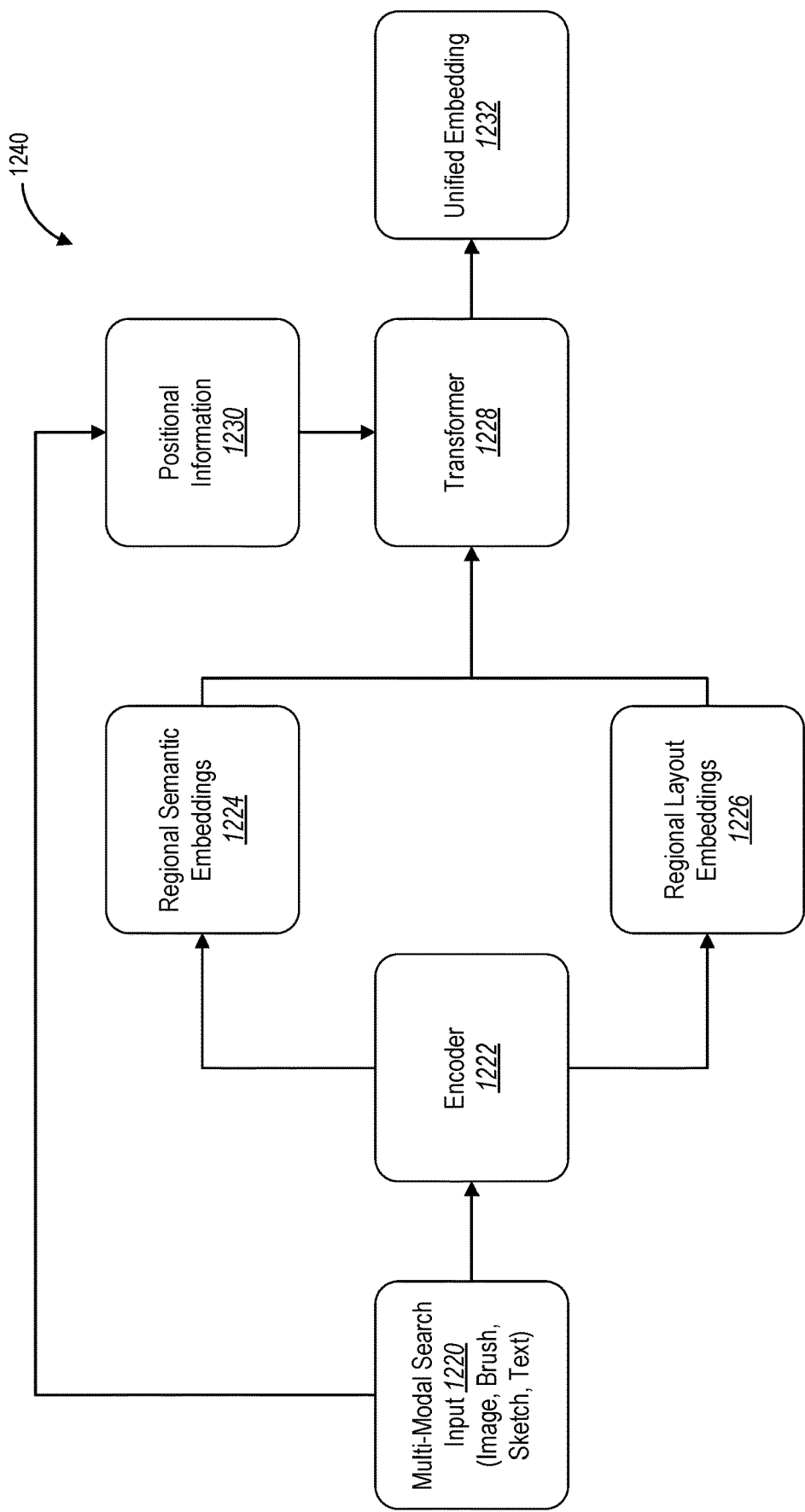
FIGS. 12A-12B each illustrate the search-based editing system utilizing a multi-modal embedding neural network to generate an input embedding for a sketch query in accordance with one or more embodiments.
Figure 12B:
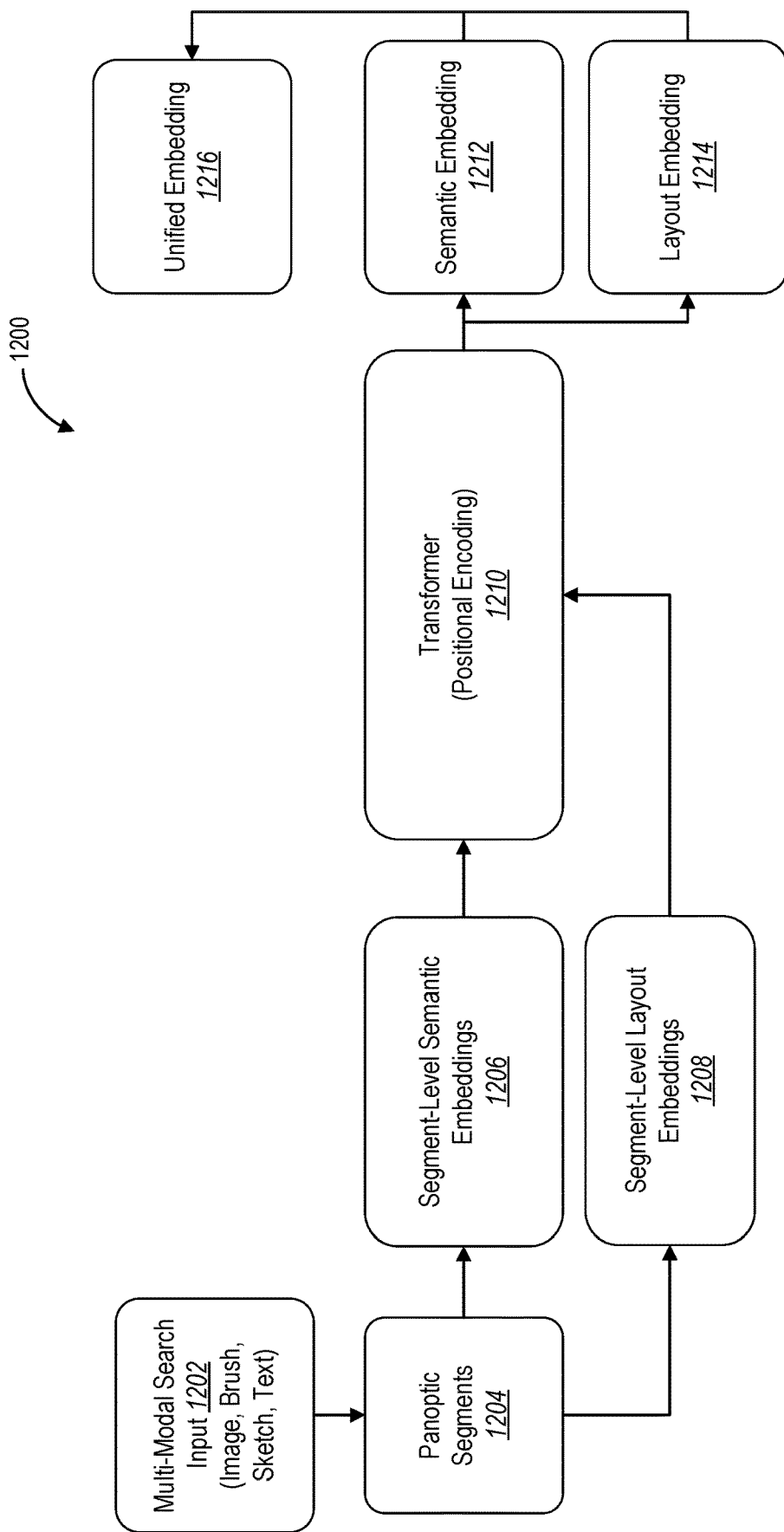

In one or more embodiments, the search-based editing system 106 utilizes a multi-modal embedding neural network to generate an input embedding for a sketch query and utilizes the input embedding to retrieve image search results. FIGS. 12A-12B each illustrate the search-based editing system 106 utilizing a multi-modal embedding neural network to generate an input embedding for a sketch query in accordance with one or more embodiments.

In one or more embodiments, a multi-modal embedding neural network includes a computer-implemented neural network that generates an input embedding for a multi-modal search input. In particular, in some embodiments, a multi-modal embedding neural network includes a computer-implemented neural network that generates a unified input embedding that represents the various input modals of a multi-modal search input. For instance, in some cases, a multi-modal embedding neural network generates a single input embedding that represents semantic information and/or layout information associated with a multi-modal search input. Though the following discusses using a multi-modal embedding neural network to generate an input embedding for a sketch query, the search-based editing system 106 can utilize the multi-modal embedding neural network to generate input embeddings for other multi-modal search inputs, such as a multi-modal search input that includes a text query and an image query.

As shown in FIG. 12A, the search-based editing system 106 provides a multi-modal search input 1220 to a multi-modal embedding neural network 1240. In particular, the search-based editing system 106 provides the multi-modal search input 1220 to an encoder 1222 of the multi-modal embedding neural network 1240. As indicated, the multi-modal search input 1220 can include image input (including a crop of an image), brush input, sketch input, and/or text input (such as is represented in FIGS. 11A-11B). For instance, in some embodiments, the multi-modal search input 1220 includes at least two of the above modals of inputs. Further, in some cases, the multi-modal search input 1220 includes a canvas. For instance, in some implementations, the multi-modal search input 1220 includes inputs on a blank canvas. In some embodiments, however, the multi-modal search input 1220 includes inputs on a digital image. In other words, the search-based editing system 106 utilizes the digital image as a canvas upon which to position other input. Accordingly, in some instances, the canvas is included as part of the multi-modal search input 1220 (e.g., providing semantic and/or layout information).

Additionally, as shown in FIG. 12A, the search-based editing system 106 utilizes the encoder 1222 to generate regional semantic embeddings 1224 and regional layout embeddings 1226 from the multi-modal search input 1220. In one or more embodiments, a regional embedding includes an embedding generated from a particular region of an input, such as a multi-modal search input. For instance, in some cases, the search-based editing system 106 utilizes the encoder 1222 to generate the regional embeddings (i.e., the regional semantic embeddings 1224 and the regional layout embeddings 1226) from patches of the multi-modal search input 1220. In some cases, the search-based editing system 106 utilizes the encoder 1222 to generate the regional embeddings from semantic segments of the multi-modal search input 1220 (as will be discussed in more detail below with reference to FIG. 12B).

By generating the regional semantic embeddings 1224 and the regional layout embeddings 1226, the search-based editing system 106 separately encodes semantic information and layout information from the multi-modal search input 1220. More particularly, the search-based editing system 106 separately encodes semantic information and layout information for distinct portions (e.g., patches or semantic segments) of the multi-modal search input 1220.

As shown in FIG. 12A, the search-based editing system 106 provides the regional semantic embeddings 1224 and the regional layout embeddings 1226 to a transformer neural network 1228 of the multi-modal embedding neural network 1240. Further, the search-based editing system 106 provides positional information 1230 to the transformer neural network 1228. In one or more embodiments, positional information includes information regarding the positioning of one or more inputs of a multi-modal search input within an input space. For instance, in some cases, positional information includes information regarding the positioning of one or more inputs on a canvas of a multi-modal search input. As shown in FIG. 12A, in some cases, the positional information 1230 is a separate input to the transformer neural network 1228 (e.g., a coordinate of each pixel or coordinates of the boundary of an object portrayed in the multi-modal search input 1220). In some implementations, however, the positional information 1230 is encoded within the regional layout embeddings 1226 generated from the multi-modal search input 1220. By considering the positional information 1230, the search-based editing system 106 can ensure that the retrieved digital images include objects portrayed in the multi-modal search input 1220 in positionings portrayed within the multi-modal search input 1220.

Further, as shown in FIG. 12A, the search-based editing system 106 utilizes the transformer neural network 1228 to generate a unified embedding 1232 from the regional semantic embeddings 1224, the regional layout embeddings 1226, and the positional information 1230. In one or more embodiments, the unified embedding 1232 includes a single embedding that represents the multi-modal search input 1220. In particular, in some embodiments, the unified embedding 1232 represents the information encoded in the regional semantic embeddings 1224 and the regional layout embeddings 1226 as well as the positional information 1230 (if separate from the regional layout embeddings 1226). By using the unified embedding 1232, the search-based editing system 106 represents the multi-modal search input 1220 within a common embedding space (e.g., an embedding space that encompasses representations for the various search modals).

In one or more embodiments, the search-based editing system 106 utilizes the unified embedding 1232 to search for and retrieve digital images in response to the multi-modal search input 1220. For instance, as previously discussed, in some cases, the search-based editing system 106 stores digital images in a digital image database (e.g., the digital image database 418 of FIG. 4) and retrieves one or more of the stored digital images to provide as search results in response to receiving a search input. In some embodiments, the search-based editing system 106 generates embeddings for the stored digital images within the same embedding space as the unified embedding 1232. Accordingly, in some implementations, the search-based editing system 106 retrieves one or more of the stored digital images based on their embeddings and the unified embedding 1232.

For example, in some cases, the search-based editing system 106 retrieves one or more stored digital images based on a proximity of their corresponding embeddings to the unified embedding 1232 within the embedding space. In some cases, the search-based editing system 106 utilizes a cosine distance to determine the proximity of the embeddings within the embedding space. In some implementations, the search-based editing system 106 retrieves an n number of digital images (e.g., the top n digital images) based on the proximity of their embeddings to the unified embedding 1232. In some instances, the search-based editing system 106 retrieves digital images having an embedding that satisfies a threshold proximity (e.g., a threshold cosine distance). Thus, the search-based editing system 106 can provide search results in response to the multi-modal search input 1220.

FIG. 12B illustrates the search-based editing system 106 utilizing a multi-modal embedding neural network that generates a unified embedding from semantic-level embeddings of a multi-modal search input in accordance with one or more embodiments. As shown in FIG. 12B, the search-based editing system 106 provides a multi-modal search input 1202 (e.g., a sketch query) to a multi-modal embedding neural network 1200. As further shown in FIG. 12B, the search-based editing system 106 utilizes the multi-modal embedding neural network 1200 to determine a plurality of segments 1204 (e.g., panoptic segments) of the multi-modal search input 1202. In some cases, the search-based editing system 106 utilizes a segmentation neural network of the multi-modal embedding neural network 1200 (e.g., one of the segmentation neural networks discussed above) to determine the segments 1204.

As further shown in FIG. 12B, the search-based editing system 106 utilizes the multi-modal embedding neural network 1200 to generate segment-level embeddings for the segments 1204. In one or more embodiments, a segment-level embedding includes an embedding that corresponds to a segment (e.g., a panoptic segment) of a sketch query or digital image. In particular, in some embodiments, a segment-level embedding includes an embedding that represents attributes or features of a corresponding segment of a sketch query or digital image. For example, in some cases, a segment-level embedding includes an embedding that represents semantic information and/or layout information associated with a corresponding segment of a sketch query or digital image.

Indeed, as shown in FIG. 12B, the search-based editing system 106 utilizes the multi-modal embedding neural network 1200 to generate a plurality of segment-level semantic embeddings 1206 (e.g., segment-level embeddings representing semantic information) and a plurality of segment-level layout embeddings 1208 (e.g., segment-level embeddings representing layout information) for the segments 1204. In particular, in some cases, the search-based editing system 106 generates, for each segment of the segments 1204, one or more segment-level semantic embeddings and one or more segment-level layout embeddings. In some implementations, the search-based editing system 106 utilizes the text encoder and/or the image encoder described in U.S. patent application Ser. No. 17/652,390 to generate the segment-level semantic embeddings 1206 and the segment-level layout embeddings 1208.

As further shown in FIG. 12B, the search-based editing system 106 utilizes a transformer neural network 1210 of the multi-modal embedding neural network 1200 to generate a semantic embedding 1212 and a layout embedding 1214 from the segment-level semantic embeddings 1206 and the segment-level layout embeddings 1208. For instance, in some cases, the search-based editing system 106 utilizes the transformer neural network 1210 to generate the semantic embedding 1212 from the segment-level semantic embeddings 1206 and generate the layout embedding 1214 from the segment-level layout embeddings 1208. In one or more embodiments, the search-based editing system 106 utilizes, as the transformer neural network 1210, the vision transformer model described by Alexey Dosovitskiy et al., *An Image is Worth* 16×16 *Words: Transformers for Image Recognition at Scale*, ICLR, 2021, arXiv:2010.11929v2, which is incorporated herein by reference in its entirety. In some cases, rather than using the transformer neural network 1210, the search-based editing system 106 utilizes a convolutional neural network to generate the semantic embedding 1212 and the layout embedding 1214.

Additionally, as shown in FIG. 12B, the search-based editing system 106 utilizes the multi-modal embedding neural network 1200 to generate a unified embedding 1216 from the semantic embedding 1212 and the layout embedding 1214. For instance, in one or more embodiments, the search-based editing system 106 combines (e.g., concatenates) the semantic embedding 1212 and the layout embedding 1214 to generate the unified embedding 1216. In some cases, the search-based editing system 106 determines a weighted combination to generates the unified embedding 1216. Further, in some cases, the search-based editing system 106 varies the weighting that is applied for different multi-modal search inputs (e.g., based on user input). Thus, the search-based editing system 106 allows for control over the significance of the semantics or the layout of a multi-modal search input when conducting an image search.

Indeed, in some cases, the search-based editing system 106 utilizes the unified embedding 1216 to retrieve image search results in response to the multi-modal search input 1202. For example, in some implementations, the search-based editing system 106 includes digital images in the image search results based on proximities of their corresponding embeddings to the input embedding within the embedding space. The search-based editing system 106 can provide the retrieved digital images to the client device that submitted the multi-modal search input 1202.

In one or more embodiments, rather than generating the unified embedding 1216, the search-based editing system 106 utilizes the semantic embedding 1212 and/or the layout embedding 1214 to retrieve image search results. As discussed above, however, combining those embeddings into a single input embedding allows for control over the emphasis placed on the represented semantic information and layout information.

By searching for and retrieving digital images in response to multi-modal search input as discussed above, the search-based editing system 106 operates with improved flexibility when compared to many conventional systems. For instance, by utilizing a multi-modal embedding neural network to generate an input embedding for a multi-modal search input, the search-based editing system 106 can flexibly utilize search inputs having multiple input modals. In particular, the search-based editing system 106 can flexibly utilize search inputs having multiple visual inputs (e.g., image inputs, sketch inputs, and/or brush inputs) where conventional systems are typically limited to visual inputs of one type.

Figure 13:
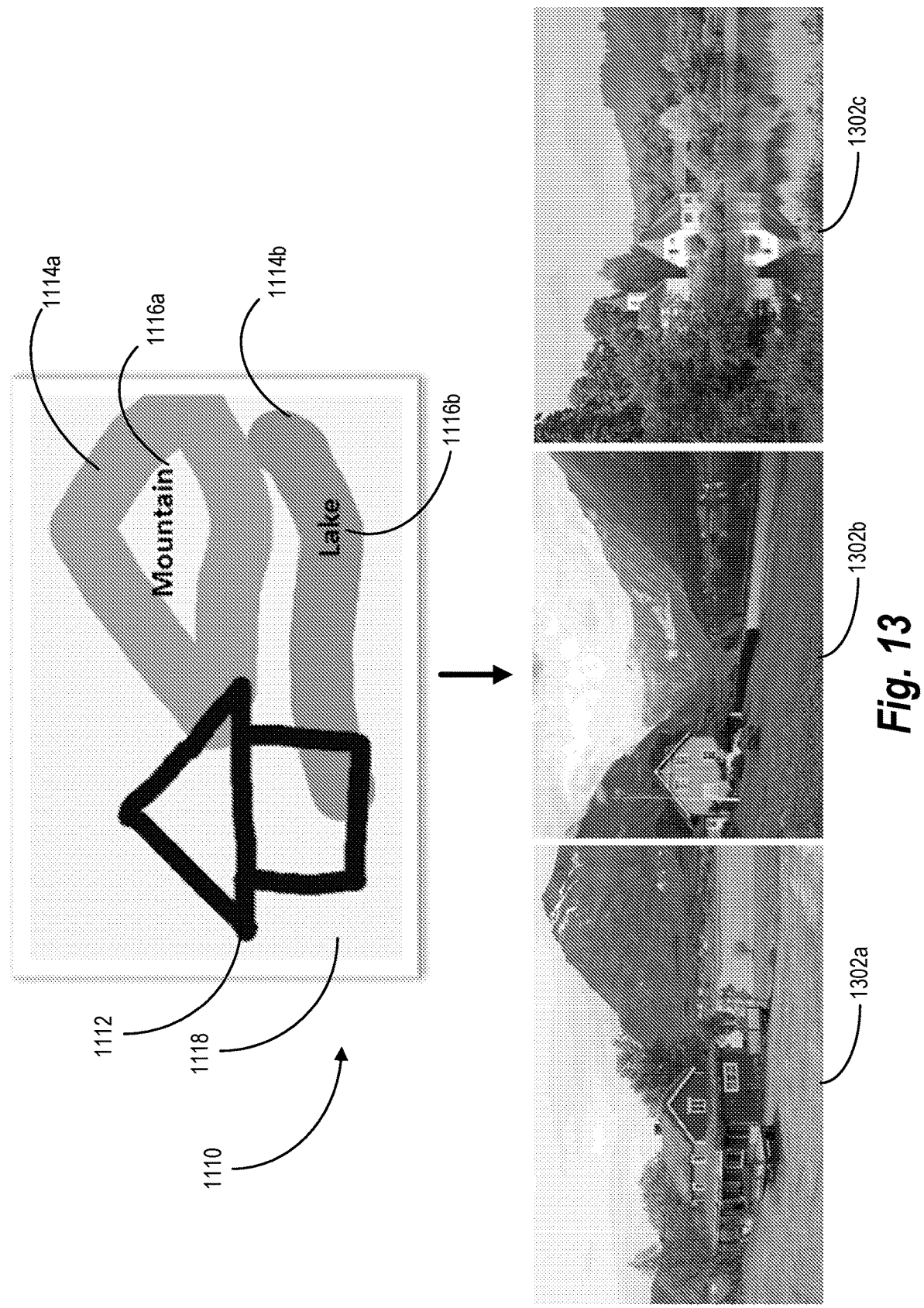
FIG. 13 illustrates image search results retrieved by the search-based editing system using a sketch query in accordance with one or more embodiments.

FIG. 13 illustrates image search results retrieved by the search-based editing system 106 using a sketch query in accordance with one or more embodiments. In particular, FIG. 13 illustrates image search results retrieved in response to the sketch query 1110 discussed above with reference to FIG. 11B. As shown in FIG. 13, the search-based editing system 106 retrieves the digital images 1302a-1302c in response to receiving the sketch query 1110 (e.g., utilizing an input embedding generated from the sketch query 1110. As further shown in FIG. 13, each of the digital images 1302a-1302c incorporate the semantic information and the layout information associated with the sketch query 1110. Accordingly, each of the digital images 1302a-1302c includes a visual layout that corresponds to a visual layout of the sketch query 1110.

Figure 14:
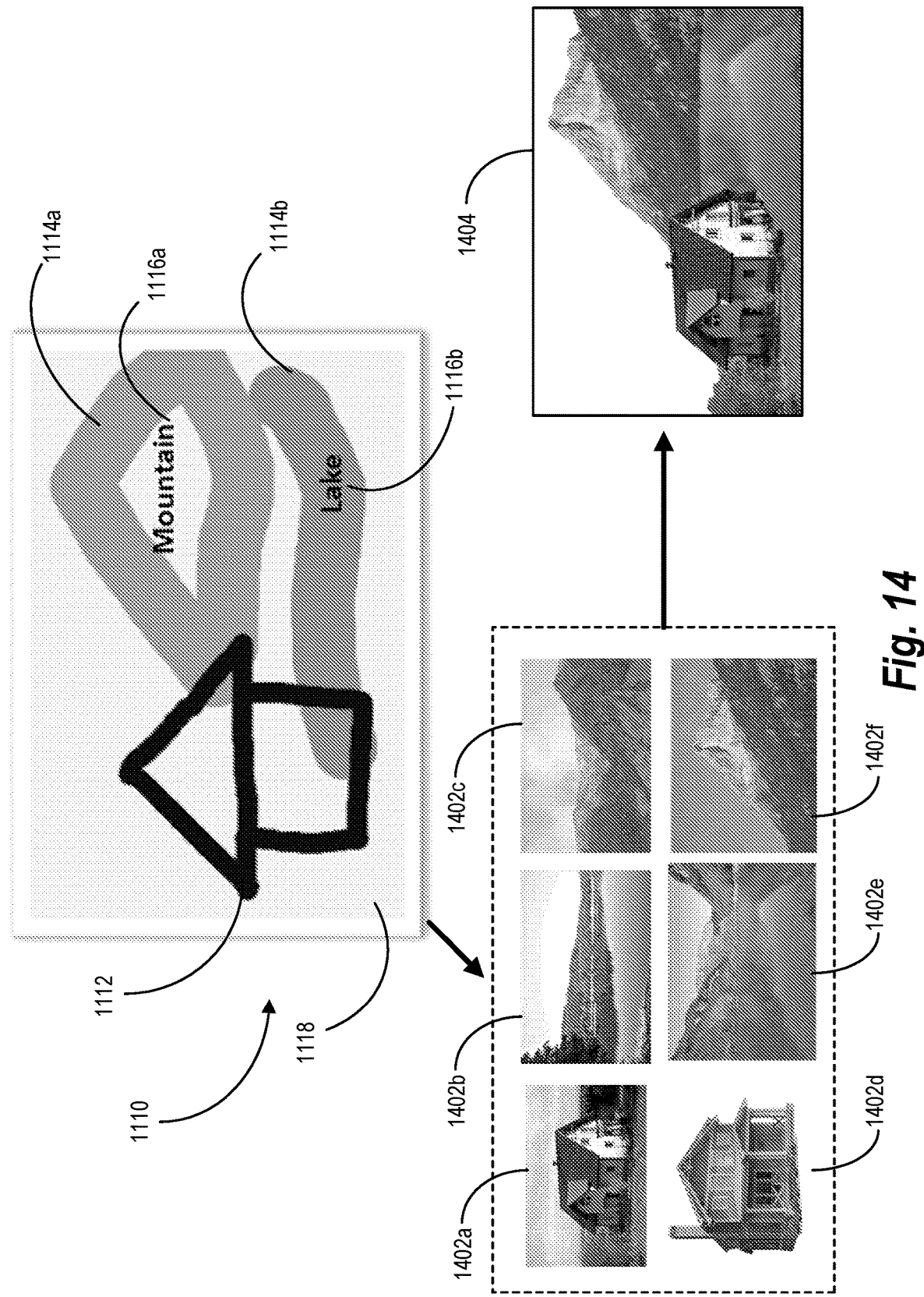
FIG. 14 illustrates image search results that include digital images for generating a composite image that corresponds to a sketch query in accordance with one or more embodiments.

In some implementations, the search-based editing system 106 additionally or alternatively provides digital images that can be used to generate a composite image that incorporates the semantic information and the layout information associated with a multi-modal search input. FIG. 14 illustrates image search results that include digital images for generating a composite image that corresponds to a sketch query in accordance with one or more embodiments. In particular, FIG. 14 illustrates digital images 1402a-1402f retrieved in response to receiving the sketch query 1110. As shown, the digital images 1402a-1402f differ from the digital images 1302a-1302c of FIG. 13 in that they don't each incorporate all of the semantic and/or layout information of the sketch query 1110 alone.

As further shown in FIG. 14, however, the search-based editing system 106 generates a composite image 1404 using the digital images 1402a-1402f of the image search results. To illustrate, in one or more embodiments, the search-based editing system 106 provides the digital images 1402a-1402f to the client device that submitted the sketch query 1110 (e.g., for display on a graphical user interface). The search-based editing system 106 further receives a selection of several of the digital images 1402a-1402f (e.g., the digital images 1402a and 1402e-1402f). In response, the search-based editing system 106 generates the composite image 1404. As indicated in FIG. 14, the composite image 1404 includes a visual layout that corresponds to the visual layout of the sketch query 1110.

In some implementations, the search-based editing system 106 can utilize the composite image 1404 to conduct another search query. For example, in some cases, the search-based editing system 106 receives the composite image 1404 as search input and conducts another image search in response. The search-based editing system 106 can retrieve digital images that have a similar visual layout to the composite image 1404 and additionally or alternatively retrieve digital images that can be used to generate another composite image having a similar visual layout to the composite image 1404. In some cases, the search-based editing system 106 further modifies the composite image 1404 (e.g., in response to user input). For instance, the search-based editing system 106 can modify the composite image 1404 to better blend its individual components.

Figure 15:
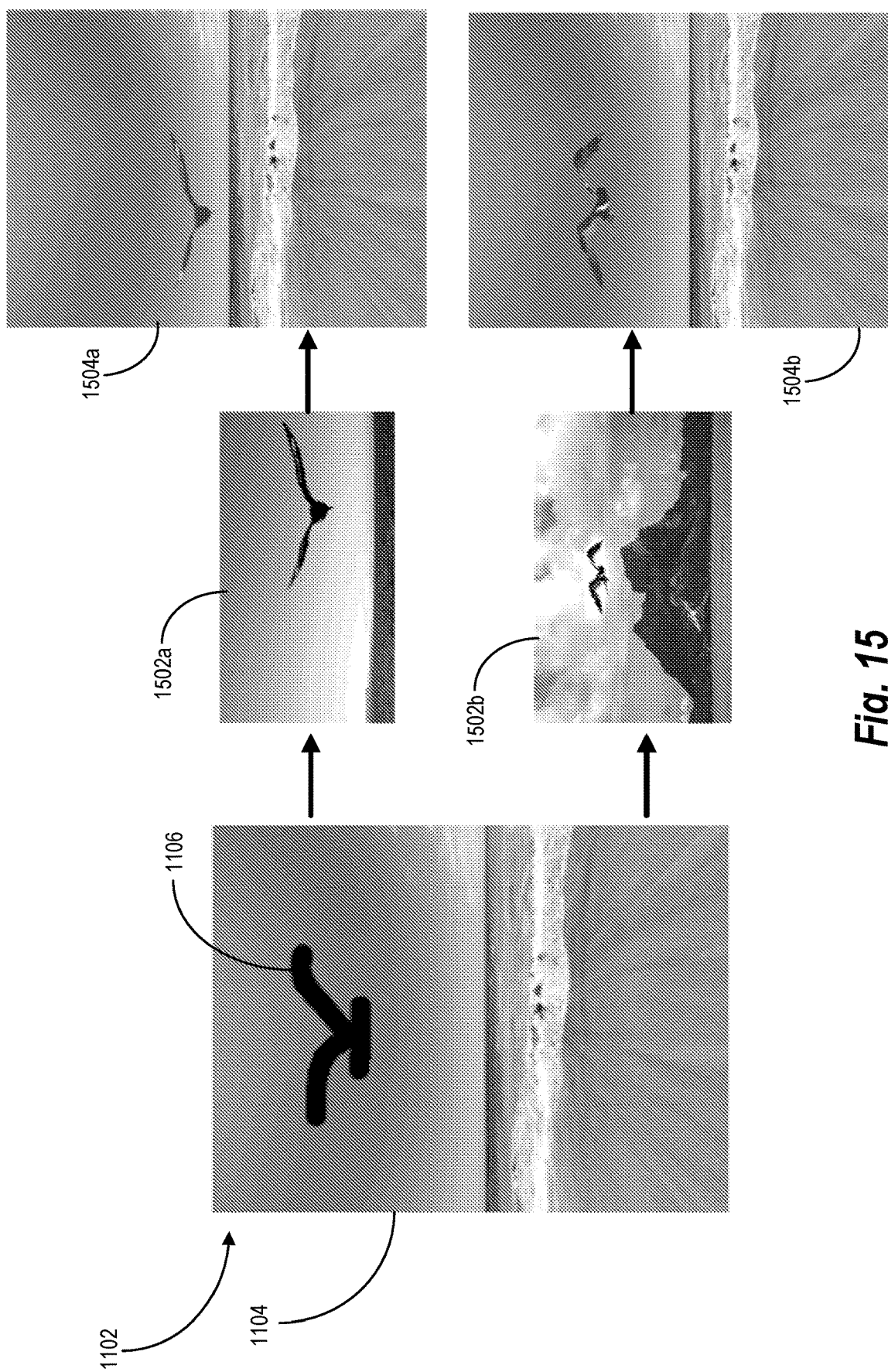
FIG. 15 illustrates additional image search results that include digital images for generating a composite image that corresponds to a sketch query in accordance with one or more embodiments.

FIG. 15 also illustrates image search results that include digital images for generating a composite image that corresponds to a sketch query in accordance with one or more embodiments. In particular, FIG. 15 illustrates digital images 1502a-1502b retrieved in response to receiving the sketch query 1102, which includes the sketch input 1106 positioned on the image input 1104. As shown in FIG. 15, each of the digital images 1502a-1502b incorporate semantic and/or layout information associated with the sketch input 1106. In particular, each of the digital images 1502a-1502b portray a digital object (e.g., a bird in flight) having a scale that generally corresponds to the sketch input 1106 of the sketch query 1102.

Additionally, as shown in FIG. 15, the search-based editing system 106 generates composite images 1504a-1504b using the digital images 1502a-1502b respectively. In particular, the search-based editing system 106 generates each of the composite images 1504a-1504b by combining, respectively, each of the digital images 1502a-1502b with the image input 1104 from the sketch query 1102. For instance, to generate the composite image 1504a, the search-based editing system 106 extracts the digital object portrayed in the digital image 1502a (e.g., the bird) and combines it with the image input 1104. As shown, the search-based editing system 106 positions the digital object proximate to the position of the sketch input 1106.

Figure 16:
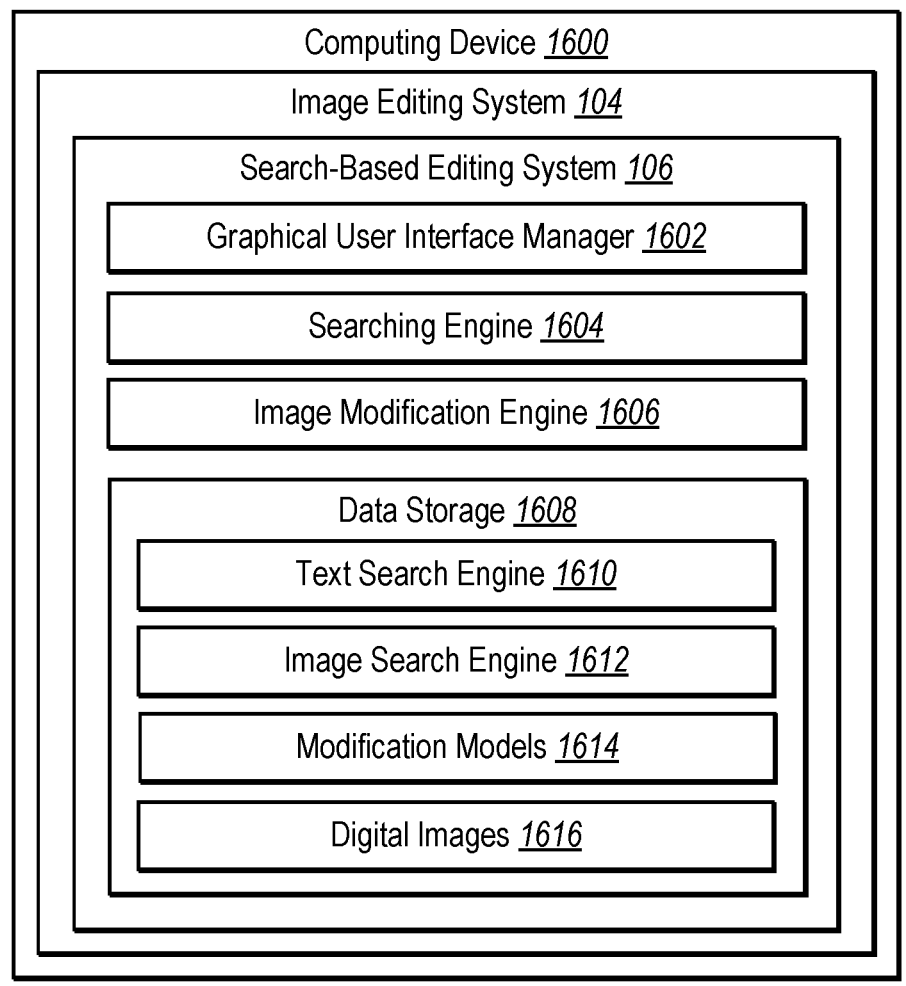
FIG. 16 illustrates an example schematic diagram of a search-based editing system in accordance with one or more embodiments.

Turning to FIG. 16, additional detail will now be provided regarding various components and capabilities of the search-based editing system 106. In particular, FIG. 16 shows the search-based editing system 106 implemented by the computing device 1600 (e.g., the server(s) 102 and/or one of the client devices 110a-110n discussed above with reference to FIG. 1). Additionally, the search-based editing system 106 is also part of the image editing system 104. As shown, in one or more embodiments, the search-based editing system 106 includes, but is not limited to, a graphical user interface manager 1602, a searching engine 1604, an image modification engine 1606, and data storage 1608 (which includes a text search engine 1610, an image search engine 1612, modification models 1614, and digital images 1616).

As just mentioned, and as illustrated in FIG. 16, the search-based editing system 106 includes the graphical user interface manager 1602. In one or more embodiments, the graphical user interface manager 1602 causes the graphical user interface of a client device to display a plurality of interactive elements for providing search input and/or selections of editing operations. Further, in some embodiments, the graphical user interface manager 1602 causes the graphical user interface to display image search results and a modified input digital image that results from one or more selected editing operations. Accordingly, in some implementations, the graphical user interface manager 1602 provides a consolidated graphical user interface that simultaneously displays options and results generated based on the selections of those options.

Additionally, as shown in FIG. 16, the search-based editing system 106 includes the searching engine 1604. In one or more embodiments, the searching engine 1604 utilizes a search engine to retrieve image search results in response to receiving search input. For instance, in some embodiments, the searching engine 1604 utilizes an image search engine to retrieve digital images in response to receiving an image query. Similarly, in some cases, the searching engine 1604 utilizes a text search engine to retrieve digital images in response to receiving a text query. In some embodiments, the searching engine 1604 utilizes an embedding-based search engine that generates an input embedding from the search input and retrieves digital images based on proximities of their corresponding embeddings to the input embedding.

As shown in FIG. 16, the search-based editing system 106 further includes the image modification engine 1606. In one or more embodiments, the image modification engine 1606 modifies an input digital image via one or more editing operations. For instance, in some cases, the image modification engine 1606 detects a selection of an interactive element display on a client device and performs the corresponding editing operation to modify an input digital image. In some implementations, the image modification engine 1606 utilizes one or more neural networks to perform the editing operation.

Further, as shown in FIG. 16, the search-based editing system 106 includes data storage 1608. In particular, data storage 1608 includes the text search engine 1610, the image search engine 1612, modification models 1614 (for applying editing operations to an input digital image), and digital images 1616. In some cases, the text search engine 1610 and/or the image search engine 1612 include one of the embedding-based search engines discussed above.

Each of the components 1602-1616 of the search-based editing system 106 can include software, hardware, or both. For example, the components 1602-1616 can include one or more instructions stored on a computer-readable storage medium and executable by processors of one or more computing devices, such as a client device or server device. When executed by the one or more processors, the computer-executable instructions of the search-based editing system 106 can cause the computing device(s) to perform the methods described herein. Alternatively, the components 1602-1616 can include hardware, such as a special-purpose processing device to perform a certain function or group of functions. Alternatively, the components 1602-1616 of the search-based editing system 106 can include a combination of computer-executable instructions and hardware.

Furthermore, the components 1602-1616 of the search-based editing system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1602-1616 of the search-based editing system 106 may be implemented as a stand-alone application, such as a desktop or mobile application. Furthermore, the components 1602-1616 of the search-based editing system 106 may be implemented as one or more web-based applications hosted on a remote server. Alternatively, or additionally, the components 1602-1616 of the search-based editing system 106 may be implemented in a suite of mobile device applications or "apps." For example, in one or more embodiments, the search-based editing system 106 can comprise or operate in connection with digital software applications such as ADOBE® PHOTOSHOP®, ADOBE® INDESIGN®, or ADOBE® ILLUSTRATOR®. "ADOBE," "PHOTOSHOP," "INDESIGN," and "ILLUSTRATOR" are either registered trademarks or trademarks of Adobe Inc. in the United States and/or other countries.

Figure 17:
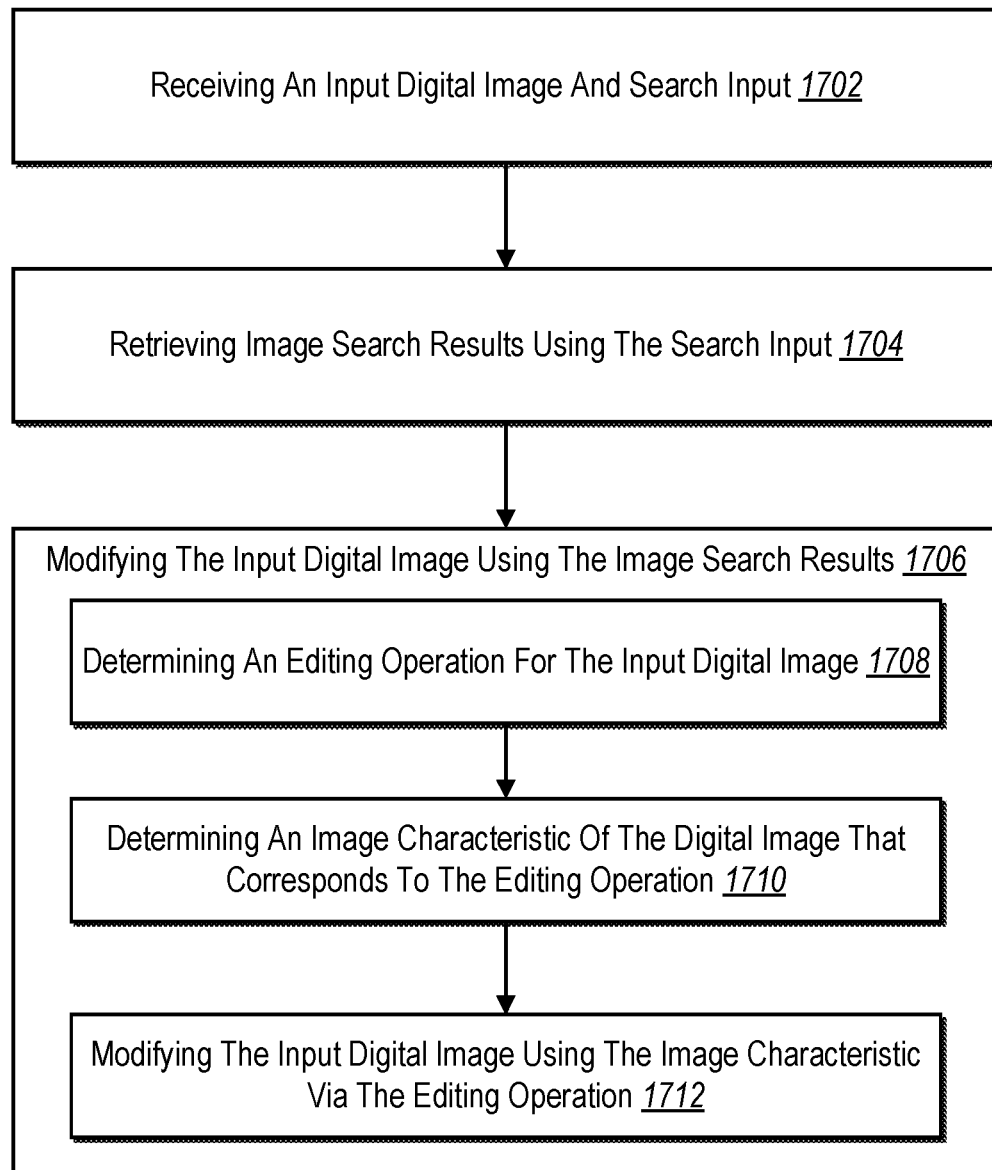
FIG. 17 illustrates a flowchart of a series of acts for modifying an input digital image utilizing image search results in accordance with one or more embodiments.
Figure 18:
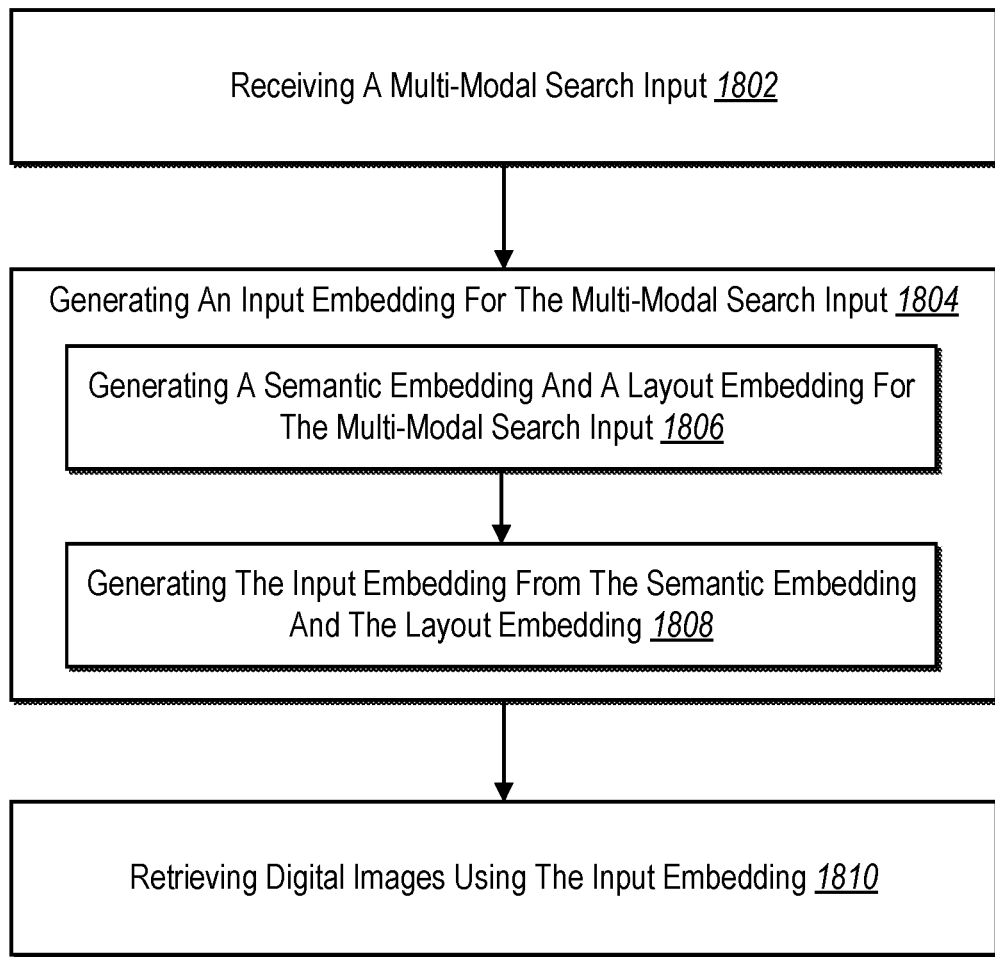
FIG. 18 illustrates a flowchart of a series of acts for retrieving a digital image in response to a multi-modal search input in accordance with one or more embodiments.

FIGS. 1-16, the corresponding text, and the examples provide a number of different methods, systems, devices, and non-transitory computer-readable media of the search-based editing system 106. In addition to the foregoing, one or more embodiments can also be described in terms of flowcharts comprising acts for accomplishing the particular result, as shown in FIGS. 17-19. FIGS. 17-19 may be performed with more or fewer acts. Further, the acts may be performed in different orders. Additionally, the acts described herein may be repeated or performed in parallel with one another or in parallel with different instances of the same or similar acts.

FIG. 17 illustrates a flowchart of a series of acts 1700 for modifying an input digital image utilizing image search results in accordance with one or more embodiments. FIG. 17 illustrates acts according to one embodiment, alternative embodiments may omit, add to, reorder, and/or modify any of the acts shown in FIG. 17. In some implementations, the acts of FIG. 17 are performed as part of a method. For example, in some embodiments, the acts of FIG. 17 are performed as part of a computer-implemented method. Alternatively, a non-transitory computer-readable medium can store instructions thereon that, when executed by at least one processor, cause the at least one processor to perform operations comprising the acts of FIG. 17. In some embodiments, a system performs the acts of FIG. 17. For example, in some embodiments, a system includes at least one memory device comprising one or more search engines. The system further includes at least one processor configured to cause the system to perform the acts of FIG. 17.

The series of acts 1700 includes an act 1702 of receiving an input digital image and search input. For example, in one or more embodiments, the act 1702 involves receiving, from a client device, an input digital image and search input for conducting an image search.

The series of acts 1700 also includes an act 1704 of retrieving image search results using the search input. For instance, in some cases, the act 1704 involves retrieving, utilizing one or more search engines and the search input, image search results comprising a digital image for modifying the input digital image. In some cases, retrieving, utilizing the one or more search engines, the image search results comprises retrieving the image search results utilizing a text search engine and an image search engine.

In one or more embodiments, retrieving the image search results comprising the digital image comprises retrieving a plurality of digital images as the image search results. Accordingly, in some cases, the search-based editing system 106 receives a selection of the digital image from the plurality of digital images for modifying the input digital image.

In some embodiments, the search-based editing system 106 determines, based on the search input, a search modal for conducting the image search; and determines at least one search engine from the one or more search engines that corresponds to the search modal. Accordingly, in some cases, retrieving the image search results utilizing the one or more search engines comprises retrieving the image search results utilizing the at least one search engine that corresponds to the search modal. In some instances, determining the search modal for conducting the image search comprises determining one of a textual-visual search modal, a sketch search modal, or a local search modal.

In some implementations, retrieving the image search results comprising the digital image utilizing the one or more search engines and the search input comprises: generating, utilizing a search engine comprising a neural network, an input embedding for the search input; and retrieving the digital image by determining, utilizing the search engine, a proximity of an embedding for the digital image to the input embedding for the search input. Further, in some cases, receiving the search input for conducting the image search comprises receiving a plurality of search inputs; and generating the input embedding for the search input comprises generating a plurality of input embeddings for the plurality of search inputs within a common embedding space.

Further, the series of acts 1700 includes an act 1706 of modifying the input digital image using the image search results. To illustrate, in some implementations, the act 1706 involves modifying the input digital image utilizing the digital image from the image search results.

As shown in FIG. 17, the act 1706 includes a sub-act 1708 for determining an editing operation for the input digital image. Additionally, the act 1706 includes a sub-act 1710 for determining an image characteristic of the digital image that corresponds to the editing operation. The act 1706 further includes a sub-act 1712 for modifying the input digital image using the image characteristic via the editing operation. To illustrate, in one or more embodiments, the search-based editing system 106 determines an editing operation for modifying the input digital image and determines one or more image characteristics of the digital image from the image search results that correspond to the editing operation. Accordingly, modifying the input digital image utilizing the digital image from the image search results comprises modifying the input digital image utilizing the one or more image characteristics via the editing operation.

In one or more implementations, determining the editing operation comprises determining a compositing operation; and determining the one or more image characteristics of the digital image that correspond to the editing operation comprises extracting a digital object portrayed in the digital image from the image search results using a corresponding segmentation mask.

To provide an illustration, in one or more embodiments, the search-based editing system 106 receives an input digital image and search input for conducting an image search; retrieves, in response to receiving the search input, image search results comprising a digital image for modifying the input digital image utilizing at least one of a text search engine or an image search engine; determines an image characteristic of the digital image from the image search results to apply to the input digital image; and modifies the input digital image utilizing the image characteristic of the digital image.

In some cases, receiving the search input comprises receiving an image query and a text query; and retrieving the image search results utilizing the at least one of the text search engine or the image search engine comprises retrieving the image search results utilizing the text search engine and the image search engine. In some embodiments, the search-based editing system 106 determines an editing operation for modifying the input digital image. Accordingly, in such embodiments, the search-based editing system 106 modifies the input digital image by modifying the input digital image utilizing a neural network that corresponds to the editing operation.

In some instances, determining the image characteristic of the digital image from the image search results comprises determining a digital object portrayed in the digital image, at least one color portrayed in the digital image, a tone portrayed in the digital image, or a texture portrayed in the digital image. Further, in some cases, receiving the search input for conducting the image search comprises receiving a bounding box for the input digital image or a selection of a semantic segment of the input digital image; and retrieving the image search results comprises retrieving the image search results using the bounding box or the semantic segment. In some cases, the search-based editing system 106 further generates, for a plurality of digital images searched via image searches using the at least one of the text search engine or the image search engine, a plurality of segmentation masks; and stores the plurality of segmentation masks for retrieval in response to determining that a corresponding editing operation is selected to modify input digital images.

To provide another illustration, in one or more embodiments, the search-based editing system 106 receives an input digital image and search input for conducting an image search; determines a search modal associated with the search input; retrieves, utilizing the search input and a search engine from the one or more search engines that corresponds to the search modal, image search results comprising a digital image for modifying the input digital image; and modifies the input digital image utilizing the digital image from the image search results.

In some instances, the search-based editing system 106 determines the search modal associated with the search input by determining that the search input is associated with textual-visual search modal; and retrieves, utilizing the search input and the search engine that corresponds to the search modal, the image search results by retrieving the image search results utilizing the search input, a text search engine, and an image search engine. Further, in some cases, the search-based editing system 106 retrieves the image search results comprising the digital image by retrieving the image search results comprising a plurality of digital images that include the digital image; and modifies the input digital image utilizing the digital image from the image search results by modifying the input digital image via a first editing operation using the digital image from the image search results. In some implementations, the search-based editing system 106 further modifies the input digital image via a second editing operation using an additional digital image from the image search results. Additionally, in some embodiments, the search-based editing system 106 modifies the input digital image utilizing the digital image from the image search results by combining the input digital image with the digital image from the image search results to generate a composite image.

FIG. 18 illustrates a flowchart of a series of acts 1800 for retrieving a digital image in response to a multi-modal search input in accordance with one or more embodiments. FIG. 18 illustrates acts according to one embodiment, alternative embodiments may omit, add to, reorder, and/or modify any of the acts shown in FIG. 18. In some implementations, the acts of FIG. 18 are performed as part of a method. For example, in some embodiments, the acts of FIG. 18 are performed as part of a computer-implemented method. Alternatively, a non-transitory computer-readable medium can store instructions thereon that, when executed by at least one processor, cause the at least one processor to perform operations comprising the acts of FIG. 18. In some embodiments, a system performs the acts of FIG. 18. For example, in some embodiments, a system includes at least one memory device comprising a multi-modal embedding neural network. The system further includes at least one processor configured to cause the system to perform the acts of FIG. 18.

The series of acts 1800 includes an act 1802 for receiving a multi-modal search input. For instance, in some cases, the act 1802 involves receiving, from a client device, a multi-modal search input for conducting an image search. In one or more embodiments, receiving the multi-modal search input comprises receiving visual input comprising at least two of a sketch input, a brush input, a text input, or an image input. In some embodiments, receiving the sketch input, the brush input, or the text input comprises receiving the sketch input, the brush input, or the text input positioned on the image input.

The series of acts 1800 also includes an act 1804 for generating an input embedding for the multi-modal search input. For example, in one or more embodiments, the act 1804 involves generating an input embedding for the multi-modal search input utilizing a multi-modal embedding neural network.

As shown in FIG. 18, the act 1804 includes a sub-act 1806 for generating a semantic embedding and a layout embedding for the multi-modal search input. Further, the act 1804 includes a sub-act 1808 for generating the input embedding from the semantic embedding and the layout embedding. Indeed, in one or more embodiments, the search-based editing system 106 generates a semantic embedding and a layout embedding for the multi-modal search input utilizing the multi-modal embedding neural network. Accordingly, generating the input embedding comprises generating the input embedding from the semantic embedding and the layout embedding. In one or more embodiments, the search-based editing system 106 generates the input embedding from the semantic embedding and the layout embedding by generating the input embedding by combining the semantic embedding and the layout embedding.

In some embodiments, the search-based editing system 106 generates a plurality of segment-level embeddings for segments of the multi-modal search input utilizing the multi-modal embedding neural network. Accordingly, in such embodiments, the search-based editing system 106 generates the semantic embedding and the layout embedding for the multi-modal search input by generating the semantic embedding and the layout embedding from the plurality of segment-level embeddings.

The series of acts 1800 further includes an act 1810 for retrieving digital images using the input embedding. For example, in some cases, the act 1810 involves retrieving one or more digital images for provision to the client device utilizing the input embedding.

In some cases, retrieving the one or more digital images using the input embedding comprises retrieving a plurality of digital images using the input embedding. Accordingly, in some embodiments, the search-based editing system 106 further provides the plurality of digital images to the client device; receives a selection of a set of digital images from the plurality of digital images; and generates a composite digital image using the set of digital images. In some embodiments, generating the composite digital image comprises generating the composite digital image having a visual layout that corresponds to a visual layout of the multi-modal search input. In some instances, the search-based editing system 106 further generates an additional input embedding for the composite digital image; and retrieves one or more additional digital images for provision to the client device utilizing the additional input embedding.

To provide an illustration, in one or more embodiments, the search-based editing system 106 receives, from a client device, a multi-modal search input comprising visual input for conducting an image search; generates, utilizing a multi-modal embedding neural network, a plurality of segment-level embeddings for segments of the multi-modal search input; generates, utilizing the multi-modal embedding neural network, an input embedding from the plurality of segment-level embeddings; and retrieves one or more digital images for provision to the client device utilizing the input embedding.

In some cases, receiving the multi-modal search input comprising the visual input for conducting the image search comprises: receiving a first visual input of a first input modal that indicates semantic information for conducting the image search; and receiving a second visual input of a second input modal that indicates layout information for conducting the image search. In some instances, retrieving the one or more digital images for provision to the client device utilizing the input embedding comprises retrieving at least one digital image that corresponds to the semantic information and the layout information utilizing the input embedding.

In some embodiments, receiving the multi-modal search input comprising the visual input for conducting the image search comprises receiving a cropped region of a digital image and at least one of a brush input, a sketch input, or a text input with the cropped region. Further, in one or more embodiments, generating, utilizing the multi-modal embedding neural network, the plurality of segment-level embeddings for the segments of the multi-modal search input comprises: generating a plurality of segment-level semantic embeddings for the segments of the multi-modal search input; and generating a plurality of segment-level layout embeddings for the segments of the multi-modal search input.

In some implementations, generating, utilizing the multi-modal embedding neural network, the input embedding from the plurality of segment-level embeddings comprises generating, utilizing a convolutional neural network of the multi-modal embedding neural network, the input embedding from the plurality of segment-level embeddings. Further, in some embodiments, retrieving the one or more digital images for provision to the client device utilizing the input embedding comprises: determining proximities of a plurality of embeddings corresponding to a plurality of digital images to the input embedding; and selecting the one or more digital images from the plurality of digital images based on the proximities of the plurality of embeddings to the input embedding.

To provide another illustration, in one or more embodiments, the search-based editing system 106 generates an input embedding for a multi-modal search input comprising visual input by utilizing the multi-modal embedding neural network to: determine a plurality of panoptic segments of the multi-modal search input; generate a plurality of segment-level semantic embeddings and a plurality of segment-level layout embeddings for the plurality of panoptic segments; and generate the input embedding using the plurality of segment-level semantic embeddings and the plurality of segment-level layout embeddings. Further, the search-based editing system 106 conducts an image search to retrieve one or more digital images that are responsive to the multi-modal search input utilizing the input embedding.

In some cases, the search-based editing system 106 conducts the image search to retrieve the one or more digital images by: retrieving a first set of digital images that incorporate semantic information and layout information of the multi-modal search input; and retrieving a second set of digital images for generating a composite image that incorporates the semantic information and layout information of the multi-modal search input. In some instances, the search-based editing system 106 receives the multi-modal search input comprising the visual input by receiving at least two of a sketch input, a brush input, or a text input positioned on a blank canvas. In some implementations, the search-based editing system 106 generates the input embedding using the plurality of segment-level semantic embeddings and the plurality of segment-level layout embeddings comprises generating the input embedding via a transformer neural network of the multi-modal embedding neural network.

FIG. 19 illustrates a flowchart of a series of acts 1900 for retrieving a digital image using a weighted combination of a text query and an image query in accordance with one or more embodiments. FIG. 19 illustrates acts according to one embodiment, alternative embodiments may omit, add to, reorder, and/or modify any of the acts shown in FIG. 19. In some implementations, the acts of FIG. 19 are performed as part of a method. For example, in some embodiments, the acts of FIG. 19 are performed as part of a computer-implemented method. Alternatively, a non-transitory computer-readable medium can store instructions thereon that, when executed by at least one processor, cause the at least one processor to perform operations comprising the acts of FIG. 19. In some embodiments, a system performs the acts of FIG. 19. For example, in some embodiments, a system includes at least one memory device comprising a plurality of digital images, a text embedding model, and an image embedding model. The system further includes at least one processor configured to cause the system to perform the acts of FIG. 19.

The series of acts 1900 includes an act 1902 for receiving a text query and an image query for conducting an image search. For instance, in some cases, the act 1902 involves receiving, from a client device, a text query and an image query for conducting an image search.

The series of acts 1900 also includes an act 1904 for determining a weighted combination of the queries. In particular, in some embodiments, the act 1904 involves determining a weighted combination of the text query and the image query.

As shown in FIG. 19, the act 1904 includes a sub-act 1906 for receiving a combination weight for combining the queries. Further, the act 1904 includes a sub-act 1908 for determining the weighted combination using the received combination weight. Indeed, in some embodiments, the search-based editing system 106 receives, from the client device, a combination weight for combining the text query and the image query and determines the weighted combination of the text query and the image query by determining the weighted combination using the combination weight.

In some embodiments, determining the weighted combination of the text query and the image query comprises determining a weighted combination of textual features from the text query and visual features from the image query. In some cases, the search-based editing system 106 generates, within a text-image embedding space, a text embedding for the text query and an image embedding for the image query. Accordingly, in some embodiments, the search-based editing system 106 determines the weighted combination of the text query and the image query by determining a weighted combination of the text embedding and the image embedding. Further, in some cases, retrieving the one or more digital images utilizing the weighted combination of the text query and the image query comprises: determining a position within the text-image embedding space that corresponds to the weighted combination of the text embedding and the image embedding; and retrieving a digital image based on a proximity of an embedding for the digital image to the position that corresponds to the weighted combination within the text-image embedding space. In some cases, determining the weighted combination of the text query and the image query (e.g., of the text embedding and the image embedding) comprises determining a weighted linear combination of the text query and the image query.

The series of acts 1900 further includes an act 1910 for retrieving digital images using the weighted combination of the queries. For example, in some, cases, the act 1910 involves retrieving one or more digital images for provision to the client device utilizing the weighted combination of the text query and the image query.

In one or more embodiments, determining the weighted combination of the text query and the image query comprises weighing the text query higher than the image query. Accordingly, retrieving the one or more digital images utilizing the weighted combination comprises retrieving at least one digital image having a similarity to the text query that is higher than a similarity to the image query based on weighing the text query higher than the image query. Similarly, in some embodiments, determining the weighted combination of the text query and the image query comprises weighing the image query higher than the text query. Accordingly, retrieving the one or more digital images utilizing the weighted combination comprises retrieving at least one digital image having a similarity to the image query that is higher than a similarity to the text query based on weighing the image query higher than the text query.

In one or more embodiments, the search-based editing system 106 further receives, an additional combination weight for combining the text query and the image query; determines, using the additional combination weight, an additional weighted combination of the text query and the image query that differs from the weighted combination; and retrieves one or more additional digital images for provision to the client device utilizing the additional weighted combination. Accordingly, in some cases, the search-based editing system 106 retrieves different digital images using different combination weights for the same text query and image query.

To provide an illustration, in one or more embodiments, the search-based editing system 106 receives, from a client device, a text query and an image query for conducting an image search; generates a text embedding for the text query and an image embedding for the image query; determines a weighted combination of the text embedding and the image embedding; and retrieves one or more digital images for provision to the client device utilizing the weighted combination of the text embedding and the image embedding.

In some cases, determining the weighted combination of the text embedding and the image embedding comprises determining a combination that excludes the image embedding based on a combination weight received from the client device; and retrieving the one or more digital images utilizing the weighted combination comprises retrieving the one or more digital images using the combination that excludes the image embedding. Additionally, in some instances, determining the weighted combination of the text embedding and the image embedding comprises determining a combination that excludes the text embedding based on a combination weight received from the client device; and retrieving the one or more digital images utilizing the weighted combination comprises retrieving the one or more digital images using the combination that excludes the text embedding.

In one or more embodiments, the search-based editing system 106 provides, to the client device, a range of combination weights for combining the text query and the image query; and receives, from the client device, a combination weight selected from the range of combination weights.

In some cases, retrieving the one or more digital images utilizing the weighted combination of the text embedding and the image embedding comprises retrieving the one or more digital images using proximities of embeddings corresponding to the one or more digital images to the weighted combination. Further, in some instances, generating the text embedding for the text query and the image embedding for the image query comprises: generating, utilizing a text embedding model, the text embedding from the text query; and generating, utilizing an image embedding model, the image embedding from the image query.

To provide another illustration, in one or more embodiments, the search-based editing system 106 receives a text query, an image query, and a combination weight for conducting an image search; generates, utilizing the text embedding model, a text embedding for the text query within a text-image embedding space; generates, utilizing the image embedding model, an image embedding for the image query within the text-image embedding space; determines a linear combination of the text embedding and the image embedding utilizing the combination weight; and retrieves at least one digital image from the plurality of digital images based on a proximity of an embedding for the at least one digital image to the linear combination of the text embedding and the image embedding within the text-image embedding space.

In some cases, the search-based editing system 106 determines the linear combination of the text embedding and the image embedding by determining a position within the text-image embedding space that corresponds to the linear combination. In one or more embodiments, the search-based editing system 106 receives the combination weight by receiving a selection of the combination weight from a range of combination weights that varies emphasis on the text query and the image query. Further, in some instances, the search-based editing system 106 receives the text query by receiving text indicating one or more image elements to incorporate within image search results of the image search; and receives the image query by receiving a digital image that indicates one or more additional image elements to incorporate within the image search results of the image search. In some implementations, the search-based editing system 106 retrieves the at least one digital image from the plurality of digital images by: retrieving a first set of digital images that include the one or more image elements from the text query; retrieving a second set of digital images that include the one or more additional image elements from the image query; and retrieving a third set of digital images that include the one or more image elements from the text query and the one or more additional image elements from the image query.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 20:
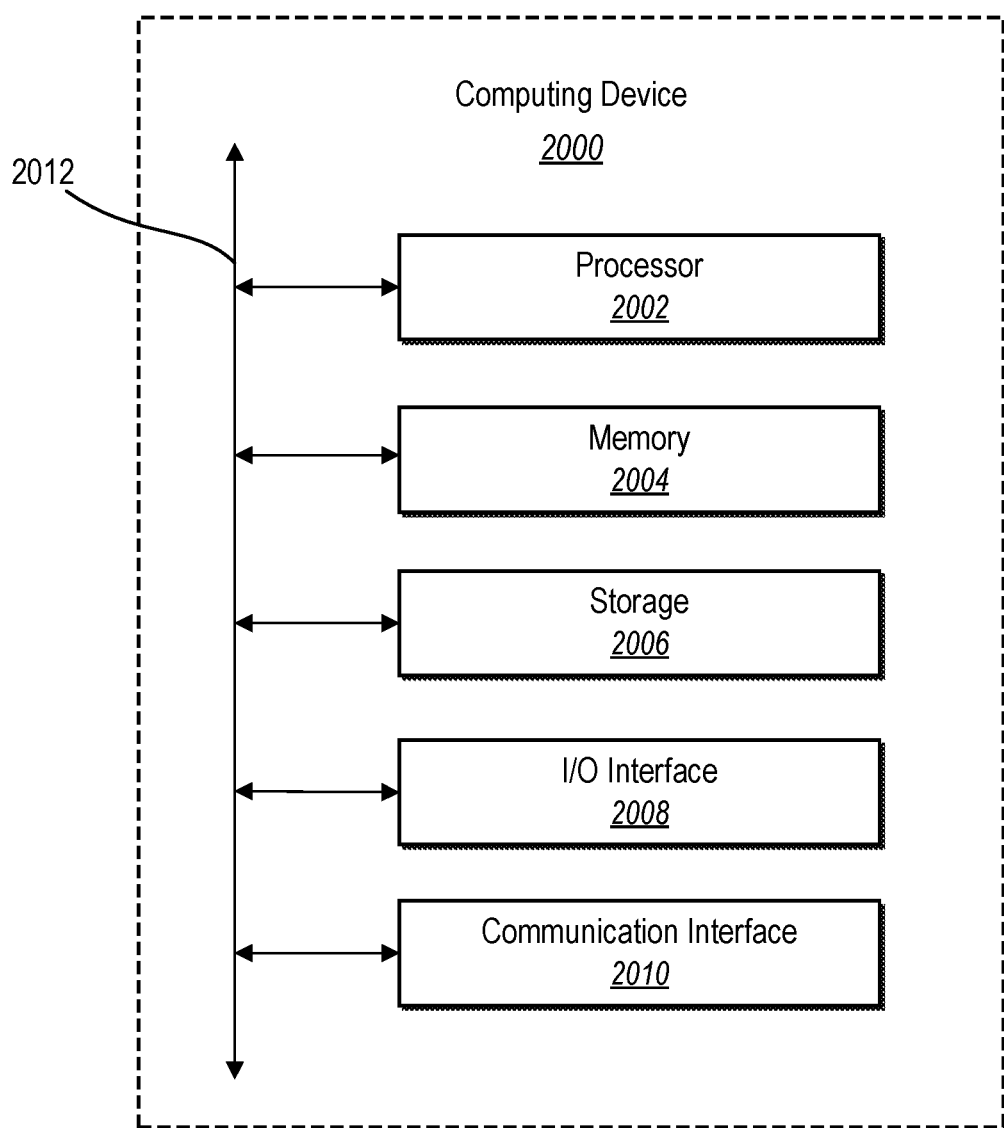
FIG. 20 illustrates a block diagram of an exemplary computing device in accordance with one or more embodiments.

FIG. 20 illustrates a block diagram of an example computing device 2000 that may be configured to perform one or more of the processes described above. One will appreciate that one or more computing devices, such as the computing device 2000 may represent the computing devices described above (e.g., the server(s) 102 and/or the client devices 110a-110n). In one or more embodiments, the computing device 2000 may be a mobile device (e.g., a mobile telephone, a smartphone, a PDA, a tablet, a laptop, a camera, a tracker, a watch, a wearable device). In some embodiments, the computing device 2000 may be a non-mobile device (e.g., a desktop computer or another type of client device). Further, the computing device 2000 may be a server device that includes cloud-based processing and storage capabilities.

As shown in FIG. 20, the computing device 2000 can include one or more processor(s) 2002, memory 2004, a storage device 2006, input/output interfaces 2008 (or "I/O interfaces 2008"), and a communication interface 2010, which may be communicatively coupled by way of a communication infrastructure (e.g., bus 2012). While the computing device 2000 is shown in FIG. 20, the components illustrated in FIG. 20 are not intended to be limiting. Additional or alternative components may be used in other embodiments. Furthermore, in certain embodiments, the computing device 2000 includes fewer components than those shown in FIG. 20. Components of the computing device 2000 shown in FIG. 20 will now be described in additional detail.

In particular embodiments, the processor(s) 2002 includes hardware for executing instructions, such as those making up a computer program. As an example, and not by way of limitation, to execute instructions, the processor(s) 2002 may retrieve (or fetch) the instructions from an internal register, an internal cache, memory 2004, or a storage device 2006 and decode and execute them.

The computing device 2000 includes memory 2004, which is coupled to the processor(s) 2002. The memory 2004 may be used for storing data, metadata, and programs for execution by the processor(s). The memory 2004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 2004 may be internal or distributed memory.

The computing device 2000 includes a storage device 2006 including storage for storing data or instructions. As an example, and not by way of limitation, the storage device 2006 can include a non-transitory storage medium described above. The storage device 2006 may include a hard disk drive (HDD), flash memory, a Universal Serial Bus (USB) drive or a combination these or other storage devices.

As shown, the computing device 2000 includes one or more I/O interfaces 2008, which are provided to allow a user to provide input to (such as user strokes), receive output from, and otherwise transfer data to and from the computing device 2000. These I/O interfaces 2008 may include a mouse, keypad or a keyboard, a touch screen, camera, optical scanner, network interface, modem, other known I/O devices or a combination of such I/O interfaces 2008. The touch screen may be activated with a stylus or a finger.

The I/O interfaces 2008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 2008 are configured to provide graphical data to a display for presentation to a user. The graphical data may be representative of one or more graphical user interfaces and/or any other graphical content as may serve a particular implementation.

The computing device 2000 can further include a communication interface 2010. The communication interface 2010 can include hardware, software, or both. The communication interface 2010 provides one or more interfaces for communication (such as, for example, packet-based communication) between the computing device and one or more other computing devices or one or more networks. As an example, and not by way of limitation, communication interface 2010 may include a network interface controller (NIC) or network adapter for communicating with an Ethernet or other wire-based network or a wireless NIC (WNIC) or wireless adapter for communicating with a wireless network, such as a WI-FI. The computing device 2000 can further include a bus 2012. The bus 2012 can include hardware, software, or both that connects components of computing device 2000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   receiving, from a client device, an input digital image and a search input for conducting an image search;
   retrieving, utilizing one or more search engines and the search input, image search results comprising a plurality of digital images that are responsive to the search input;
   providing, for display within a graphical user interface of the client device, the input digital image, the plurality of digital images of the image search results, and a plurality of selectable options for modifying the input digital image using the image search results, the plurality of selectable options corresponding to various actions for a plurality of editing operations;
   detecting, via the graphical user interface of the client device and from the plurality of digital images of the image search results, user input that selects a digital image for modifying the input digital image;
   detecting, via the graphical user interface and from the plurality of selectable options, additional user input that selects a selectable option for modifying the input digital image via an editing operation that corresponds to the selectable option;
   modifying the input digital image utilizing the digital image selected from the image search results and the editing operation that corresponds to the selectable option selected from the plurality of selectable options; and
   providing, for display within the graphical user interface of the client device, the input digital image, the modified input digital image, and the plurality of digital images of the image search results.

2. The computer-implemented method of claim 1, further comprising:
   determining one or more image characteristics of the digital image selected from the image search results that correspond to the editing operation,
   wherein modifying the input digital image utilizing the digital image selected from the image search results and the editing operation comprises modifying the input digital image utilizing the one or more image characteristics via the editing operation.

3. The computer-implemented method of claim 2, wherein:
   determining the editing operation comprises determining a compositing operation; and
   determining the one or more image characteristics of the digital image that correspond to the editing operation comprises extracting a digital object portrayed in the digital image selected from the image search results using a corresponding segmentation mask.

4. The computer-implemented method of claim 1, further comprising, in response to detecting the user input that selects the digital image from the image search results, providing the digital image for display within the graphical user interface of the client device as a reference image.

5. The computer-implemented method of claim 1, further comprising:
   determining, based on the search input, a search modal for conducting the image search; and
   determining at least one search engine from the one or more search engines that corresponds to the search modal,
   wherein retrieving the image search results utilizing the one or more search engines comprises retrieving the image search results utilizing the at least one search engine that corresponds to the search modal.

6. The computer-implemented method of claim 5, wherein determining the search modal for conducting the image search comprises determining one of a textual-visual search modal, a sketch search modal, or a local search modal.

7. The computer-implemented method of claim 1, wherein retrieving, utilizing the one or more search engines, the image search results comprises retrieving the image search results utilizing a text search engine and an image search engine.

8. The computer-implemented method of claim 1, wherein providing the plurality of digital images of the input digital image, the plurality of digital images of the image search results, and the plurality of selectable options for display within the graphical user interface of the client device comprises providing the input digital image, the plurality of digital images of the image search results, and the plurality of selectable options along with one or more additional selectable options for conducting an additional image search within the graphical user interface of the client device.

9. The computer-implemented method of claim 8,
   further comprising providing, for display within the graphical user interface of the client device, one or more selectable options for selecting at least one image database to use in conducting the image search from a plurality of image databases,
   wherein receiving the search input for conducting the image search comprises receiving a user selection of an image database from the plurality of image databases via the one or more selectable options.

10. A non-transitory computer-readable medium storing instructions thereon that, when executed by at least one processor, cause the at least one processor to perform operations comprising:
   receiving an input digital image and a search input for conducting an image search;
   retrieving, in response to receiving the search input, image search results comprising a plurality of digital images that are responsive to the search input utilizing at least one of a text search engine or an image search engine;
   providing, for display within a graphical user interface of a client device, the input digital image, the plurality of digital images of the image search results, and a plurality of selectable options for modifying the input digital image using the image search results, the plurality of selectable options corresponding to various actions for a plurality of editing operations;
   detecting, via the graphical user interface of the client device and from the plurality of digital images of the image search results, user input that selects a digital image for modifying the input digital image;
   detecting, via the graphical user interface and from the plurality of selectable options, additional user input that selects a selectable option for modifying the input digital image via an editing operation that corresponds to the selectable option;
   determining, based on the additional user input, an image characteristic of the digital image selected from the image search results to apply to the input digital image;
   modifying the input digital image utilizing the image characteristic of the digital image and the editing operation that corresponds to the selectable option selected from the plurality of selectable options; and providing, for display within the graphical user interface of the client device, the input digital image, the modified input digital image, and the plurality of digital images of the image search results.

11. The non-transitory computer-readable medium of claim 10, wherein:

receiving the search input comprises receiving an image query and a text query; and retrieving the image search results utilizing at least one of the text search engine or the image search engine comprises retrieving the image search results utilizing the text search engine and the image search engine.

12. The non-transitory computer-readable medium of claim 10, wherein modifying the input digital image utilizing the editing operation comprises modifying the input digital image utilizing a neural network that corresponds to the editing operation.

13. The non-transitory computer-readable medium of claim 10, wherein determining the image characteristic of the digital image selected from the image search results comprises determining a digital object portrayed in the digital image, at least one color portrayed in the digital image, a tone portrayed in the digital image, or a texture portrayed in the digital image.

14. The non-transitory computer-readable medium of claim 10, wherein:

receiving the search input for conducting the image search comprises receiving a bounding box for the input digital image or a selection of a semantic segment of the input digital image; and retrieving the image search results comprises retrieving the image search results using the bounding box or the semantic segment.

15. The non-transitory computer-readable medium of claim 10, further comprising instructions that, when executed by the at least one processor, cause the at least one processor to perform operations comprising:

generating, for a plurality of digital images searched via image searches using at least one of the text search engine or the image search engine, a plurality of segmentation masks; and storing the plurality of segmentation masks for retrieval in response to determining that a corresponding editing operation is selected to modify input digital images.

16. A system comprising:

at least one memory device; and at least one processor configured to cause the system to:

receive an input digital image and search input for conducting an image search;

determine a search modal associated with the search input;

retrieve, utilizing the search input and a search engine that corresponds to the search modal, image search results comprising a plurality of digital images that are responsive to the search input;

provide, for display within a graphical user interface of a client device, the input digital image, the plurality of digital images of the image search results, and a plurality of selectable options for modifying the input digital image using the image search results, the plurality of selectable options corresponding to various actions of a plurality of editing operations;

detect, via the graphical user interface of the client device and from the plurality of digital images of the image search results, user input that selects a digital image for modifying the input digital image;

detect, via the graphical user interface and from the plurality of selectable options, additional user input that selects a selectable option for modifying the input digital image via an editing operation that corresponds to the selectable option;

modify the input digital image utilizing the digital image selected from the image search results and the editing operation that corresponds to the selectable option selected from the plurality of selectable options; and provide, for display within the graphical user interface of the client device, the input digital image, the modified input digital image, and the plurality of digital images of the image search results.

17. The system of claim 16, wherein the at least one processor is configured to cause the system to:

determine the search modal associated with the search input by determining that the search input is associated with textual-visual search modal; and retrieve, utilizing the search input and the search engine that corresponds to the search modal, the image search results by retrieving the image search results utilizing the search input, a text search engine, and an image search engine.

18. The system of claim 16, wherein the at least one processor is configured to cause the system to provide the input digital image, the plurality of digital images of the image search results, and the plurality of selectable options for display within the graphical user interface of the client device by providing input digital image, the plurality of digital images of the image search results, and the plurality of selectable options along with one or more additional options for conducting an additional image search within the graphical user interface of the client device.

19. The system of claim 18, wherein the at least one processor is further configured to cause the system to further modify the modified input digital image via a second editing operation using an additional digital image from the image search results.

20. The system of claim 16, wherein the at least one processor is further configured to cause the system to modify the input digital image utilizing the digital image selected from the image search results by combining the input digital image with the digital image selected from the image search results to generate a composite image.

* * * * *